(12) United States Patent
Tyzack

(10) Patent No.: US 11,105,357 B2
(45) Date of Patent: Aug. 31, 2021

(54) FIXING DEVICE

(71) Applicant: GRAPPLEFIX LIMITED, London (GB)

(72) Inventor: Hugh Tyzack, Oxford (GB)

(73) Assignee: GRAPPLEFIX LIMITED, London (GB)

( * ) Notice: Subject to any disclaimer, the term of this patent is extended or adjusted under 35 U.S.C. 154(b) by 265 days.

(21) Appl. No.: 16/314,980

(22) PCT Filed: Jul. 5, 2017

(86) PCT No.: PCT/GB2017/051982
§ 371 (c)(1),
(2) Date: Jan. 3, 2019

(87) PCT Pub. No.: WO2018/007811
PCT Pub. Date: Jan. 11, 2018

(65) Prior Publication Data
US 2019/0226515 A1   Jul. 25, 2019

(30) Foreign Application Priority Data

Jul. 5, 2016  (GB) ..................................... 1611728
Jun. 8, 2017  (GB) ..................................... 1709160

(51) Int. Cl.
*F16B 13/08*   (2006.01)

(52) U.S. Cl.
CPC .......... *F16B 13/0808* (2013.01); *F16B 13/08* (2013.01)

(58) Field of Classification Search
CPC ............................. F16B 13/0808; F16B 13/08
(Continued)

(56) References Cited

U.S. PATENT DOCUMENTS 1,845,275 A   2/1932  Hubener
1,849,804 A   3/1932  Pleister
(Continued)

FOREIGN PATENT DOCUMENTS

AU   2004200862 A   9/2004
AU   2012238215 A   10/2012
(Continued)

OTHER PUBLICATIONS

International Search Report and Written Opinion for International Patent Application No. PCT/GB2017/051982, dated Nov. 24, 2017, 17 pages.
(Continued)

*Primary Examiner* — Roberta S Delisle
(74) *Attorney, Agent, or Firm* — Withrow & Terranova, P.L.L.C.; Vincent K. Gustafson

(57) ABSTRACT

A fixing device (1) for attaching an item to a suspended plasterboard wall or ceiling (16). The fixing device includes a plug portion (4) for securing in a hole (14) in the suspended plasterboard wall or ceiling. The plug portion includes an aperture (6) for receiving a fastener that extends and a longitudinal backplate (2). The longitudinal backplate is attached to and projects from diametrically opposite sides of the plug portion and arranged in use to engage with the rear face of the suspended plasterboard wall or ceiling when the plug portion is secured in the hole. The perimeter of the cross section of the plug portion has a minimum bounding circle having a first diameter. The perimeter of the cross section of the fixing device through the plug portion has a minimum bounding circle having a second diameter less than or equal to the first diameter.

18 Claims, 24 Drawing Sheets

(58) Field of Classification Search
USPC .......................................... 411/340, 344, 346
See application file for complete search history.

(56) References Cited

U.S. PATENT DOCUMENTS

| | | | |
|---|---|---|---|
| 1,956,623 A | | 5/1934 | Pleister |
| 2,013,503 A | | 9/1935 | Pleister |
| 2,061,634 A | | 11/1936 | Pleister |
| 2,567,372 A | | 9/1951 | Gelpcke |
| 3,127,808 A | | 4/1964 | Drybread, Sr. |
| 3,211,042 A | * | 10/1965 | Fischer .................. F16B 37/04 411/344 |
| 3,241,420 A | | 3/1966 | Passer |
| 3,244,056 A | * | 4/1966 | Kern ...................... F16B 37/00 411/340 |
| 3,513,746 A | | 5/1970 | Forsberg |
| 4,043,245 A | | 8/1977 | Kaplan |
| 4,196,883 A | | 4/1980 | Einhorn et al. |
| 4,286,497 A | | 9/1981 | Shamah |
| 4,318,651 A | | 3/1982 | Ragen |
| 4,439,079 A | * | 3/1984 | Losada ............... F16B 13/0808 24/16 PB |
| 4,502,826 A | | 3/1985 | Fafard |
| 4,616,968 A | | 10/1986 | Giannuzzi |
| 4,657,461 A | | 4/1987 | Smith |
| 4,971,502 A | * | 11/1990 | Oh ......................... F16B 35/00 411/340 |
| 4,997,327 A | | 3/1991 | Cira |
| 5,007,223 A | * | 4/1991 | Holland ................. A47K 10/10 411/344 |
| 5,044,854 A | * | 9/1991 | Oh ......................... F16B 37/04 411/344 |
| 5,163,796 A | | 11/1992 | Belser |
| 5,209,621 A | | 5/1993 | Burbidge |
| 5,236,293 A | * | 8/1993 | McSherry ........... F16B 13/0808 29/525.02 |
| 5,535,570 A | | 7/1996 | Lynn |
| 5,716,179 A | | 2/1998 | Smith |
| 5,749,687 A | | 5/1998 | Kilgore, III |
| 6,062,785 A | | 5/2000 | McDermott |
| 6,161,999 A | * | 12/2000 | Kaye .................. F16B 13/0808 411/344 |
| 6,203,260 B1 | | 3/2001 | Henline et al. |
| 6,669,420 B2 | * | 12/2003 | Ikuta .................. F16B 13/0808 411/340 |
| 6,679,664 B2 | * | 1/2004 | Ikuta .................. F16B 13/0808 411/346 |
| 10,465,729 B2 | * | 11/2019 | Daly .................. F16B 13/0808 |
| 2002/0015629 A1 | | 2/2002 | Ito |
| 2004/0065795 A1 | | 4/2004 | Levy |
| 2005/0053444 A1 | | 3/2005 | Panasik |
| 2005/0129482 A1 | * | 6/2005 | Wang .................. F16B 13/0833 411/340 |
| 2006/0182515 A1 | | 8/2006 | Panasik et al. |
| 2008/0253860 A1 | | 10/2008 | McDuff et al. |
| 2009/0003962 A1 | | 1/2009 | McDuff et al. |
| 2009/0053007 A1 | | 2/2009 | Rafaeli |
| 2009/0169331 A1 | | 7/2009 | Pilon |
| 2009/0279981 A1 | | 11/2009 | Kinney |
| 2010/0014937 A1 | | 1/2010 | Holscher |
| 2012/0328392 A1 | | 12/2012 | Difante |
| 2013/0223952 A1 | | 8/2013 | Hickey |
| 2014/0017031 A1 | | 1/2014 | Prichard et al. |
| 2015/0043989 A1 | | 2/2015 | Lind |
| 2017/0314600 A1 | | 11/2017 | Daly |
| 2018/0372139 A1 | | 12/2018 | Daly |
| 2019/0107136 A1 | | 4/2019 | Daly |

FOREIGN PATENT DOCUMENTS

| | | |
|---|---|---|
| CH | 516748 A | 12/1971 |
| DE | 577002 A | 5/1933 |
| DE | 1296883 B | 6/1969 |
| DE | 1930994 A1 | 12/1970 |
| DE | 2945859 A1 | 5/1981 |
| DE | 4408341 A1 | 9/1995 |
| EP | 0010833 A1 | 5/1980 |
| EP | 0183882 A1 | 6/1986 |
| EP | 0333953 A1 | 9/1989 |
| EP | 0410124 A2 | 1/1991 |
| EP | 0626522 A1 | 11/1994 |
| EP | 0837254 A1 | 4/1998 |
| EP | 1253331 A2 | 10/2002 |
| EP | 1286061 A1 | 2/2003 |
| GB | 591949 A | 10/1944 |
| GB | 2256249 A | 12/1992 |
| GB | 2460121 A | 11/2009 |
| GB | 2484771 B | 4/2012 |
| WO | 0235104 A1 | 5/2002 |
| WO | 2018007811 A1 | 1/2018 |

OTHER PUBLICATIONS

International Preliminary Report on Patentability for International Patent Application No. PCT/GB2017/051982, dated Jan. 17, 2019, 12 pages.

Search Report for United Kingdom Patent Application No. GB1909595.9, dated Dec. 10, 2020, 3 pages.

Examination Report for European Patent Application No. 17745855.1, dated Jul. 5, 2021, 4 pages.

* cited by examiner

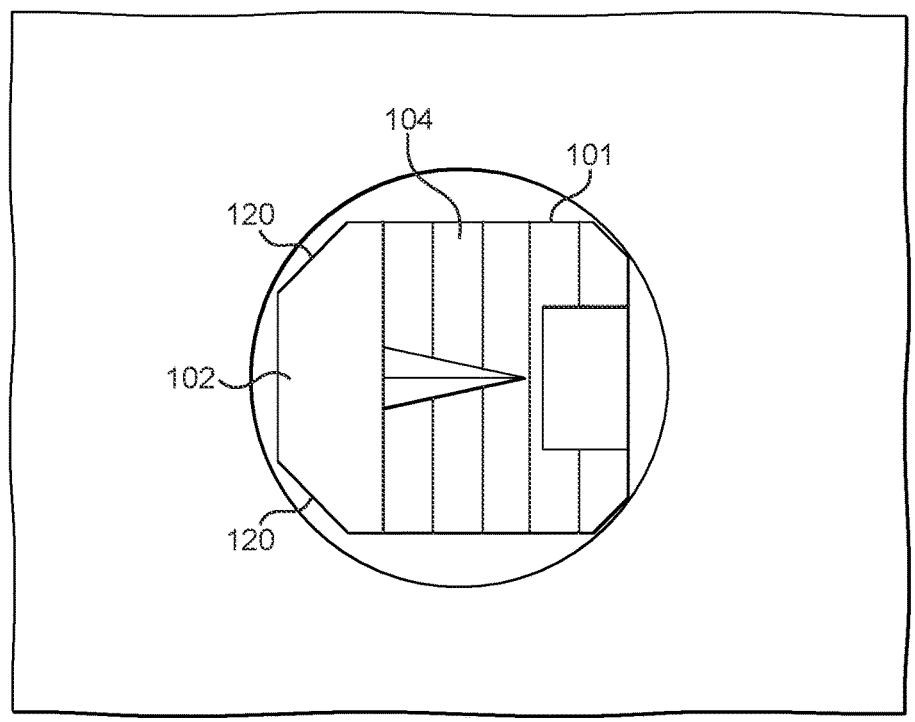
FIG. 13
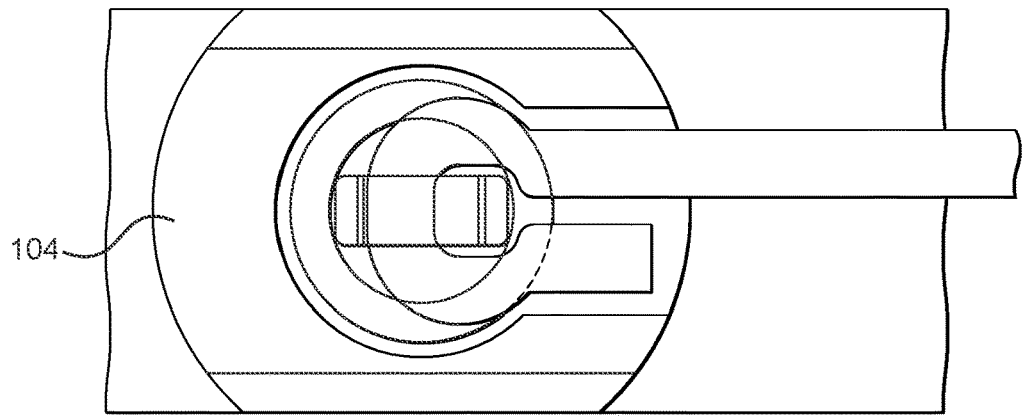
FIG. 14
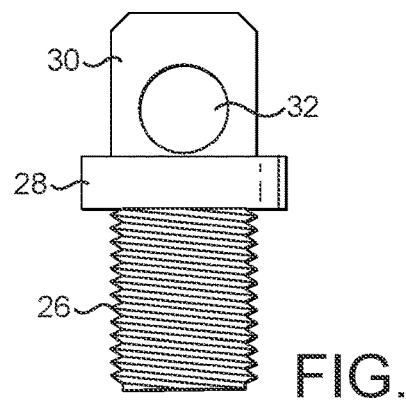   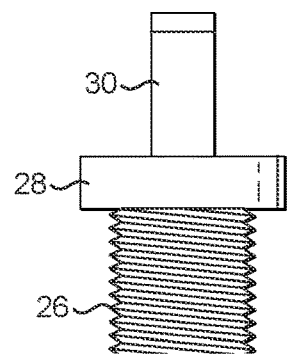
FIG. 15a                FIG. 15b

FIXING DEVICE

This application is a 35 U.S.C. § 371 national phase filing of International Application No. PCT/GB2017/051982 filed on Jul. 5, 2017, claims the benefit of United Kingdom Patent Application No. 1611728.5 filed on Jul. 5, 2016, and claims the benefit of United Kingdom Patent Application No. 1709160.4 filed on Jun. 8, 2017, wherein the contents of the foregoing applications are hereby incorporated by reference herein in their respective entireties.

This invention relates to a fixing device for attaching an item to a suspended plasterboard wall or ceiling and to a method for installing a fixing device in a suspended plasterboard wall or ceiling.

Suspended plasterboard (or "stud partition") walls constructed from plasterboard attached to a timber frame require different fixing devices to attach items to them compared to solid walls. This is because the fixing is attached solely to the plasterboard (unless the very restricted positions of the timber frame are used to screw into) and thus cannot rely on, e.g., bricks behind the plasterboard to secure the fixing owing to the void behind the plasterboard. Conventional wall plugs are therefore inadequate in plasterboard as they work loose when pressure is applied to them.

Fixings such as those described in GB 2 484 771 A provide an anchor point for a bolt, to which fixtures and fittings may be attached. The fixing disclosed in GB 2 484 771 A is placed into a hole drilled in the plasterboard and its rear wings are rotated out behind the plasterboard to retain the fixing such that it provides a mount for the item to be hung on the wall, via the bolt screwed into the central anchor point.

However, owing to the size of the wings being limited by the cross-sectional area of the fixing (and of the hole into which it is placed), these fixings are only suitable for attaching limited weight loads to a wall. They are not, for example, suitable for attaching an item to a suspended ceiling. Another problem of these fixings is that owing to the wings requiring actuation to provide the support behind the plasterboard (with the wings not being visible after the fixings have been inserted into the hole in the plasterboard), it may be difficult to ensure that the wings have been extended fully, thus further reducing the fixings' load capacity. Furthermore, as the wings of the fixing do not lock into place they have a tendency to close over time as the plasterboard deforms under the load attached to the fixing.

The aim of the invention is to provide an improved fixing device.

When viewed from a first aspect the invention provides a fixing device for attaching an item to a suspended plasterboard wall or ceiling, the fixing device comprising:
a plug portion for securing in a hole in the suspended plasterboard wall or ceiling, the plug portion comprising an aperture for receiving a fastener that extends in a first direction;
a longitudinal backplate that extends in a second direction and is attached to and projects from diametrically opposite sides of the plug portion, wherein the backplate is arranged in use to engage with the rear face of the suspended plasterboard wall or ceiling when the plug portion is secured in the hole;
wherein the perimeter of the cross section of the plug portion in a plane perpendicular to the first direction has a minimum bounding circle having a first diameter; and
wherein the perimeter of the cross section of the fixing device through the plug portion in a plane perpendicular to the second direction has a minimum bounding circle having a second diameter less than or equal to the first diameter.

When viewed from a second aspect the invention provides a fixing device for attaching an item to a suspended plasterboard wall or ceiling, the fixing device comprising:
a plug portion for securing in a hole in the suspended plasterboard wall or ceiling, the plug portion comprising an aperture for receiving a fastener that extends in a first direction;
a longitudinal backplate that extends in a second direction and is attached to and projects from diametrically opposite sides of the plug portion, wherein the backplate is arranged in use to engage with the rear face of the suspended plasterboard wall or ceiling when the plug portion is secured in the hole;
wherein the perimeter of the cross section of the plug portion in a plane perpendicular to the first direction has a minimum bounding circle; and
wherein the fixing device is capable of being pushed along the length of the longitudinal backplate in a second direction through a hole in a suspended plasterboard wall or ceiling having a cross section substantially equal to the minimum bounding circle.

When viewed from a third aspect the invention provides a method for installing a fixing device in a suspended plasterboard wall or ceiling, the fixing device as described in the first or second aspect of the present invention, the method comprising:
inserting one end of the longitudinal backplate into a hole in a suspended plasterboard wall or ceiling;
pushing the fixing device fully through the hole and into a void behind the rear face of the suspended plasterboard wall or ceiling while retaining hold of a tool attached to the plug portion; and
using the tool to position the plug portion relative to the hole to allow the aperture to receive a fastener.

The present invention relates to a fixing device for attaching an item to (e.g. hanging an item from) a suspended plasterboard wall or ceiling. The fixing device has a plug portion and a longitudinal backplate that is attached to the plug portion. The longitudinal backplate projects from opposite sides of the plug portion (alternatively expressed, the plug portion projects from the backplate, e.g. in a direction perpendicular to the direction in which the backplate extends longitudinally).

The plug portion, for securing in a hole (e.g. drilled) in the suspended plasterboard wall or ceiling, has an aperture therein for receiving a fastener. Once a fastener (e.g. a bolt or a screw) has been placed in the aperture this allows an item to be attached to (e.g. hung from) the fastener. The aperture extends in a first direction (e.g. the direction in which the plug portion projects from the backplate).

The longitudinal backplate extends in a second direction, e.g. perpendicular to the first direction, and is arranged (in use) to engage with the rear face of the suspended plasterboard wall or ceiling when the plug portion is secured in the hole. This prevents the fixing device from being pulled back through the hole, e.g. when an item is attached to a fastener that has been placed in the aperture of the plug portion which thus exerts a force on the fixing device from the front of the suspended plasterboard wall or ceiling.

The plug portion has a cross section (in a plane perpendicular to the first direction) with a perimeter that has a "minimum bounding" (or "smallest enclosing") circle having a first diameter. This is the smallest circle that encloses (this cross section of) the plug portion and thus the smallest circular hole into which the plug portion is able to be inserted.

The fixing device has a cross section (in a plane through the plug portion that lies perpendicular to the second direction) with a perimeter that has a minimum bounding circle having a second diameter. This is the smallest circle that encloses (this cross section of) the fixing device and thus the smallest circular hole through which the fixing device can be inserted in along the (second) direction in which the longitudinal backplate extends. Thus preferably this cross section of the fixing device is the maximum cross section (thus having the maximum diameter minimum bounding circle) that the fixing device has (in planes perpendicular to the first direction).

The second diameter is less than or equal to the first diameter. Thus, the cross section of the fixing device, in a plane (through the plug portion) that lies perpendicular to the second direction, lies within a circle that is the same size or smaller than the circle within which the cross section of the plug portion (in a plane perpendicular to the first direction) lies. Therefore the fixing device (when oriented with the direction in which the longitudinal backplate extends being parallel with the central axis of a circular hole) is able to be passed through the hole and the plug portion is also able to fit (and thus, e.g., be secured) into this hole. Alternatively expressed, the fixing device, when pushed through the hole axially along the length of the longitudinal backplate, fits through the smallest circle (the minimum bounding circle) that encompasses the plug portion, or that the maximum dimension of the cross section of the plug portion (in a plane perpendicular to the first direction; which is equal to the diameter of the hole into which the plug portion is, e.g., secured) is greater than or equal to the maximum dimension of the cross section of the longitudinal backplate through the plug portion (in a plane perpendicular to the second direction).

This allows (one end of the longitudinal backplate) the fixing device, according to the method of the present invention, to be inserted into a hole in a suspended plasterboard wall or ceiling and pushed fully through into the void behind the suspended plasterboard wall or ceiling. According to the method of the present invention, by retaining hold of a tool attached to the plug portion, the fixing device is prevented from being lost in the void behind the suspended plasterboard wall or ceiling and thus the tool can be used to position the plug portion relative to the hole (e.g. used to pull or screw the plug portion back into the hole thus securing the plug portion in the hole) to allow the aperture in the plug portion to receive a fastener, e.g. through the hole first.

Therefore preferably the plug portion is arranged to receive a tool to position the plug portion relative to the hole to allow the aperture to receive a fastener (e.g. to receive a tool for securing the plug portion in the hole in the suspended plasterboard wall or ceiling). Thus the plug portion of the fixing device is configured to receive a tool that allows the plug portion to be positioned relative to the hole to allow the aperture to receive a fastener (e.g. to be secured in the hole in the suspended plasterboard wall or ceiling).

In one embodiment the longitudinal backplate then engages with the rear side of the suspended plasterboard wall or ceiling, so that the plug portion is secured in the hole and the backplate prevents the plug portion from being pulled out of the hole. The, e.g. secured, fixing device can then be used to receive a fastener which in turn allows an item to be attached to the fastener and therefore to the suspended plasterboard wall or ceiling.

It will thus be appreciated that the fixing device of the present invention has a design that allows it, after being inserted through a hole in a suspended plasterboard wall or ceiling, to be positioned relative to, e.g. secured in, the hole (by means of its plug portion) from the rear side of the suspended plasterboard wall or ceiling. This may enable the fixing device of the present invention to have a much greater area backplate than fixing devices that are secured into place from the front face of the plasterboard, e.g. as disclosed in GB 2 484 771 A in which the area of the rotating wings is limited by the area of the hole.

In turn, this greater area backplate may enable a greater load to be attached (and with greater security) to a fastener inserted into the aperture of the fixing device. This is particularly because the large area longitudinal backplate engages with (and thus exerts a force on) the rear face of the suspended plasterboard wall, which is more likely to be intact than the front face owing to the lack of rendering on the rear face.

Furthermore, because the fixing device is first inserted through the hole in the plasterboard (along the length of the longitudinal backplate), and then the plug portion is positioned relative to (e.g. pulled or screwed back and secured in) the hole using a tool, the fixing device of the present invention does not require any moving parts. This simplifies and thus speeds up the installation of the fixing device (e.g. compared to the fixing device disclosed in GB 2 484 771 A in which the wings have to be actuated into position before a bolt can be screwed into the fixing device), which may not require any further tools or, e.g., depth gauges to be used. It also helps to reduce the risk that the fixing device has not been installed correctly (with the fixing device disclosed in GB 2 484 771 A there is the risk that the wings are not actuated fully, because the wings cannot be seen once the fixing device has been inserted into the hole in the plasterboard).

The geometry of the fixing device, such that the plug portion is arranged to fit in a hole through which the fixing device is able to be passed along the length of the longitudinal backplate, helps to allow for fail-safe installation, i.e. if a hole is drilled in the suspended plasterboard wall or ceiling that the fixing device fits through along the length of the longitudinal backplate, the plug portion will, e.g., generally be able to be secured in the hole.

The fixing device per se preferably does not include any moving parts. This helps to make the fixing device stronger, more reliable (as well as have fewer quality assurance and test variance issues) and cheaper than conventional devices.

The fixing device of the present invention is suitable for use with (i.e. for attaching an item to) any suitable and desired type of suspended plasterboard wall or ceiling. Suspended plasterboard (or "stud partition") walls or ceilings are constructed from plasterboard that is attached to a timber frame. This therefore forms a void behind the plasterboard, e.g. between the rear face of the plasterboard and whatever structure to which the timber frame is attached, e.g. a solid wall or another suspended plasterboard. It is this void that allows the fixing device of the present invention to be pushed fully through the hole in the plasterboard such that the plug portion can then be positioned relative to (e.g. pulled or screwed back so to be secured in) the hole.

Typically the void behind the suspended plasterboard wall or ceiling will be between 75 mm and 100 mm, though, for example, it may be greater than this, e.g. for a suspended plasterboard ceiling. The suspended plasterboard wall or ceiling may have any suitable and desired thickness. In one embodiment the plasterboard is 9.5 mm or 12.5 mm thick.

The plasterboard that forms the suspended plasterboard wall or ceiling may be any suitable and desired type of plasterboard or indeed any suitable and desired type of solid board. The plasterboard may comprise double thickness plasterboard, wall board, soundproof plasterboard, vapour or moisture resistant (e.g. foil-backed) plasterboard, impact resistant plasterboard, foam-backed plasterboard or fire resistant plasterboard. The fixing device of the present invention is also suitable for use with other types of solid board, e.g. plastic board such as aqua board.

The hole in the suspended plasterboard wall or ceiling may be any suitable and desired hole. Preferably the shape and size of the hole is (e.g. chosen or formed to be) suitable for securing the plug portion in the hole. For example, the shape and size of the hole may be substantially the same shape and size as the plug portion of the fixing device, such that the plug portion is able to be, e.g. secured, in the hole.

Preferably the hole is a cylindrical hole, e.g. having a circular cross section. Preferably the axis of rotation of the cylindrical hole is perpendicular to the plane in which the plasterboard lies. The hole may have any suitable and desired size. In a preferred embodiment the circular cylindrical hole has a diameter substantially equal to the first diameter (i.e. the diameter of the minimum bounding circle for the perimeter of the cross section of the plug portion). In one embodiment the circular cylindrical hole has a diameter between 10 mm and 25 mm, e.g. 12 mm, 15 mm or 20 mm.

Embodiments of a fixing device for use with a hole having a diameter as small as 12 mm, for example (which may be smaller than the devices described in GB 2 484 771 A), compromise the strength of the suspended plasterboard wall or ceiling as little as possible (e.g. owing to the hole having approximately only a third of the surface area of a 20 mm hole). This means that the failure of at least some embodiments of the fixing device (when a large load is attached thereto) may be limited only by the strength of the suspended plasterboard wall or ceiling. This compares to conventional devices which are likely to rip through the suspended plasterboard wall or ceiling.

The hole may be provided in the suspended plasterboard wall or ceiling in any suitable and desired way. In a preferred embodiment the hole is drilled in the plasterboard. Therefore preferably the method comprises drilling a (e.g. circular) hole in the suspended plasterboard wall or ceiling.

The plug portion may be any suitable and desired shape and size for securing in a hole in the suspended plasterboard wall or ceiling. The cross section of the plug portion in a plane perpendicular to the first direction is preferably assessed where the plug portion attaches to the longitudinal backplate.

Preferably the plug portion is substantially cylindrical, e.g. has substantially the same cross section in a plane perpendicular to the first direction along the length of the first direction. The shape and size of the plug portion may be substantially the same shape and size as the hole, e.g. have substantially the same cross section in a plane perpendicular to the first direction.

However preferably the cross section of the plug portion (in a plane perpendicular to the first direction) comprises two straight sides (on opposite sides of the plug portion) that each extend in a direction substantially parallel to the second direction and two curved sides (on opposite sides of the plug portion) that extend between the two straight sides (e.g. that together form an outer wall of the plug portion). Preferably the curved sides form an arc of a circle that lies on the minimum bounding circle having the first diameter. Thus preferably the two straight sides each form a chord of the minimum bounding circle having the first diameter, e.g. between the ends of the arcs of the circle. This shape of plug portion (e.g. having flat sides) helps to enable the fixing device to be pushed (e.g. snugly) through the hole in the plasterboard along the length of the longitudinal backplate while having the maximum length circular arcs round the plug portion's perimeter that are able engage with the sides of the hole and thus bear the load of the item attached to the fixing device via the fastener.

In one embodiment the first diameter is between 10 mm and 25 mm, e.g. 12 mm, 15 mm or 20 mm.

For the cross section of the plug portion in a plane perpendicular to the second direction (and thus preferably parallel to the straight sides of the plug portion), preferably the corners of the plug portion remote from the longitudinal backplate are chamfered. This chamfering helps the fixing device to fit through the hole in the plasterboard along the length of the longitudinal backplate while maximising the height that the plug portion projects from the longitudinal backplate (in a direction parallel to the first direction). Maximising this height helps to maximise the area over which the plug portion engages with the sides of the hole in the plasterboard when the plug portion is secured in the hole. This in turn helps to reduce the shearing pressure of the plug portion on the hole in the plasterboard when an item is attached to the fixing device via a fastener in the aperture.

The height by which the plug portion projects from the longitudinal backplate (in a direction parallel to the first direction) may be any suitable and desired dimension, e.g. depending on the depth of the plasterboard in which the fixing device is to be installed. Preferably the height has a dimension such that the plug portion lies flush with or behind the front face of the suspended plasterboard wall or ceiling when the plug portion is secured in the hole, e.g. when the backplate engages with the rear face of the suspended plasterboard wall or ceiling.

A plug portion having such a height, e.g. nearly as high as the thickness of the plasterboard, helps to maximise the length of the aperture through the plug portion and therefore the strength and stability the plug portion is able to provide for a fastener on which an item is to be attached.

It will be appreciated that because the plug portion is pulled or screwed back through the hole from the rear side of the suspended plasterboard wall or ceiling, the plug portion does not require (and thus preferably does not comprise) any protruding flanges to prevent the fixing device being pushed through the hole and falling into the void behind the suspended plasterboard wall or ceiling. This helps to enable items that are to be attached to the suspended plasterboard wall or ceiling to be flush with the plasterboard (rather than any protruding flange). This in turn may help the fixing device to provide a greater load bearing capacity, particularly for items to be attached that have extended plates or mountings that may benefit from being in close contact (e.g. "laminated") to the front face of the suspended plasterboard wall or ceiling. This compares to conventional devices, having a protruding flange that rest next to the (unstable) render (having a thickness of, e.g., 3 mm) on the front face of the plasterboard rather than the more integral plasterboard itself. Thus all such conventional fixing devices suffer from this problem which limits the load able to be supported by such fixings.

In one embodiment, preferably the height that the plug portion projects from the longitudinal backplate (in a direction parallel to the first direction) is greater than 5 mm, e.g. has a maximum of approximately 7 mm when the first diameter is approximately 12 mm and a maximum of approximately 8 mm when the first diameter is approximately 20 mm.

Preferably one side (e.g. of the cylinder) of the plug portion, e.g. on one of the sides from which the longitudinal backplate projects, comprises corrugations (e.g. extending in a direction perpendicular to the first direction) arranged to resist the removal of the plug portion from the hole from the rear side of the suspended plasterboard wall or ceiling when the plug portion has been secured in the hole. When the plug portion comprises two curved sides, preferably the corrugations are provided on one of the curved sides. When the plug portion is secured in the hole, preferably the fixing device is oriented such that the corrugations engage with the top side of the hole.

The corrugations help to increase the friction of the plug portion when it is secured in the hole, e.g. against withdrawal from the rear side of the plasterboard, and help to prevent lateral movement of the plug portion when the fastener (e.g. bolt) is being inserted into the aperture. Preferably the (edges of the) corrugations are angled towards the longitudinal backplate (i.e. away from the front face of the plug portion (the edge of the plug portion distal from the longitudinal backplate)), e.g. the tips of the corrugations point towards the longitudinal backplate. This helps to resist the removal of the plug portion from the hole when it has been secured therein. The (edges of the) corrugations may be arranged to protrude from the minimum bounding circle by between 50 microns and 100 microns, to help to provide a snug fit of the plug portion in the hole. In this embodiment the corrugations may deform at their tips when the plug portion is pulled back to be secured in the hole in the suspended plasterboard wall or ceiling and then relax once in situ such that they engage against the sides of the hole.

In one embodiment the outer wall (e.g. one or more of the (e.g. one or both of the two curved) sides) of the plug portion comprises a screw thread. Such an external screw thread helps to secure the plug portion in the hole in the plasterboard. This is achieved by screwing the plug portion into the hole in the plasterboard to position the plug portion in the hole in the plasterboard. Thus preferably the step of using the tool to position the plug portion relative to the hole to allow the aperture to receive a fastener, in the method of installing the fixing device, comprises using (e.g. rotating) the tool to screw the plug portion into the hole in the plasterboard, e.g. until the longitudinal backplate engages with (e.g. lies flat against) the rear face of the plasterboard. (It should be noted that when considering the minimum bounding circle of the plug portion, this does not include the screw thread that projects from the outer wall of the plug portion, because this will bite into the hole in the plasterboard and thus not be the surface (i.e. the outer wall of the plug portion) that lies against the edges of the hole.)

By screwing the plug portion of the fixing device into the hole in the plasterboard, i.e. such that the screw thread on the outer wall of the plug portion bites into the plasterboard on the inner wall of the hole, this helps to enable the longitudinal backplate to be tightened against the rear face of the plasterboard, e.g. producing a "lock" of the fixing device into the hole and onto the rear face of the plasterboard. This helps to reduce any lateral movement (e.g. wobble) of the fixing device once it has been positioned (e.g. screwed) into the hole in the plasterboard, which thus reduces the likelihood of the fixing device loosening and starting to unscrew.

The screw thread also helps to compensate for variations in the hole in the plasterboard (e.g. up to 1 mm), which may, for example, occur owing to variance in drill bit sizes or holes not being drilled perfectly square to the plane of the plasterboard. This is because, at least in preferred embodiments, the screw thread may extend out to bite into the plasterboard, thus helping to retain the fixing device in the hole in the plasterboard.

It will also be appreciated that in this embodiment the fixing device is being (and thus preferably the screw thread is arranged to allow) screwed into the hole in the plasterboard from the rear of the plasterboard (such that the longitudinal backplate engages with the rear face of the plasterboard). Thus, when installing the fixing device, (as with other embodiments) the fixing device is fed through the hole in the plasterboard, pulled back using the tool and then (when the screw thread engages with the rear face of the plasterboard) screwed into the hole until the longitudinal backplate engages with (e.g. lies flat against) the rear face of the plasterboard.

Preferably the screw thread on the outer wall of the plug portion has a handedness that is opposite to the handedness of the fastener that is to be secured in the aperture of the fixing device. Thus when the aperture of the fixing device is threaded, preferably the screw thread on the outer wall of the plug portion has a handedness that is opposite to the handedness of the screw thread of the threaded aperture. Typically such fasteners (e.g. bolts or screws) may have a right-handed screw thread and thus preferably the screw thread on the outer wall of the plug portion is left-handed. Thus when the aperture of the fixing device is threaded, preferably the screw thread of the threaded aperture is right-handed.

Providing the screw thread on the outer wall of the plug portion with a handedness that is opposite to the handedness of the fastener that is to be secured in the aperture of the fixing device helps to retain the fixing device in the hole in the plasterboard wall, e.g. because screwing a fastener (having an opposite handedness) into the aperture of the fixing device will only act to further secure the fixing device against the rear face of the plasterboard, i.e. once the longitudinal backplate is fully engaged with the rear face of the plasterboard any further rotation of the fixing device in the hole is substantially prevented. This helps to negate the need to provide any further features on the device (e.g. anti-rotational barbs as discussed below) to prevent rotation of the device, e.g. when the fastener is inserted (screwed) into the aperture of the fixing device.

In addition, the rotation prevention of the screw thread on the outer wall of the plug portion may also enable the aperture of the fixing device to receive a self-tapping fastener (e.g. screw or bolt), as this may exert a greater torque on the fixing device than a fastener that is received into a threaded aperture. This is particularly the case when a power screwdriver (which can generate a large torque) is used to screw a fastener into the aperture.

The screw thread on the outer wall of the plug portion may have any suitable and desired pitch (thread angle). In a preferred embodiment the screw thread has a pitch of between 10 degrees and 20 degrees, e.g. (approximately) 15 degrees. Such a pitch may enable the fixing device to be rotated through an angle of between 90 degrees and 180 degrees (e.g. (approximately) 135 degrees) to screw the plug portion into the hole such that the fixing device is fully tightened against the rear face of the plasterboard. However, such a pitch may also be shallow enough to help prevent the fixing device from being unscrewed easily after it has been installed, e.g. owing to a force in a direction perpendicular to the plane of the plasterboard (e.g. from a screwdriver or hammer that is being used to insert a fastener).

The screw thread on the outer wall of the plug portion may have any suitable and desired number of threads. In a preferred embodiment the screw thread comprises a plurality of (e.g. four) independent (e.g. non-overlapping) threads. Multiple threads help to provide additional security for the fixing device when it is installed in the hole in the plasterboard (e.g. against a force in a direction perpendicular to the plane of the plasterboard) and also helps to provide a stable initial platform just before the fixing device is screwed into the hole, owing to the multiple points of contact for each of the plurality of threads with the rear face of the plasterboard. These multiple contact points provided by the multiple threads also help to align the fixing device with the longitudinal backplate parallel to the rear face of the plasterboard before the fixing device is screwed into the hole. However, should the fixing device not be aligned with the longitudinal backplate parallel to the rear face of the plasterboard when the plug portion is beginning to be screwed into the hole in the plasterboard, it will be appreciated that one end of the longitudinal backplate will contact the rear face of the plasterboard first and act to re-align the longitudinal backplate with the rear face of the plasterboard, such that when the plug portion is fully screwed into the hole in the plasterboard, the longitudinal backplate is generally parallel to and fully in contact with the rear face of the plasterboard.

The one or more threads of the screw thread on the outer wall of the plug portion may have any suitable and desired size and shape. In a preferred embodiment the one or more threads (each) have a height of between 1 mm and 1.4 mm (e.g. (approximately) 1.2 mm) in a direction projecting from (i.e. perpendicular to) the outer wall of the plug portion. In a preferred embodiment the one or more threads (each) have a base width of between 0.6 mm and 1 mm (e.g. (approximately) 0.8 mm). In a preferred embodiment the one or more threads (each) have a substantially triangular cross-sectional profile (i.e. in a plane perpendicular to the direction in which the one or more threads extend), preferably with a rounded apex.

The one or more threads of the screw thread on the outer wall of the plug portion may extend all the way from the longitudinal backplate to the front face of the plug portion. In a preferred embodiment the one or more threads of the screw thread on the outer wall of the plug portion are (e.g. each) spaced from the longitudinal backplate (e.g. by approximately 2 mm) and/or from the front face of the plug portion (e.g. by approximately 1.5 mm). The former helps to retain the integrity of the rear face of the plasterboard when the fixing device is installed. The latter helps to locate the plug portion of the fixing device in the hole in the plasterboard before it is screwed into the hole.

The fixing device may (and preferably does) have only a single plug portion. However in one embodiment the fixing device comprises two or more plug portions. Providing multiple plug portions may help to allow an item having multiple fixing points to be attached to a suspended plasterboard wall or ceiling, and may help to further strengthen the fixing device as well as increase its surface area, thus helping to allow it to support a greater load. This allows such a fixing device to be installed and used in a suspended plasterboard ceiling, where currently it is necessary to insert a fastener into, e.g., a joist.

This is considered to be novel and inventive in its own right and thus when viewed from a fourth aspect the invention provides a fixing device for attaching an item to a suspended plasterboard wall or ceiling, the fixing device comprising:

two or more plug portions each comprising an aperture for receiving a fastener that extends in a first direction;
a longitudinal backplate that is attached to and extends in a second direction between the two or more plug portions, wherein the backplate is arranged in use to engage with the rear face of the suspended plasterboard wall or ceiling.

When viewed from a fifth aspect the invention provides a method for installing a fixing device in a suspended plasterboard wall or ceiling, the fixing device as described in the fourth aspect of the present invention, the method comprising:

inserting one end of the longitudinal backplate into a hole in a suspended plasterboard wall or ceiling;
pushing the fixing device fully through the hole and into a void behind the rear face of the suspended plasterboard wall or ceiling while retaining hold of a tool attached to the plug portion; and
using the tool to position one of the plug portions relative to the hole to allow the respective aperture to receive a fastener and to position one or more of the other plug portions relative to one or more respective holes in the suspended plasterboard wall or ceiling to allow the respective one or more apertures to receive one or more respective fasteners.

As will be appreciated by those skilled in the art, this aspect of the present invention can and preferably does include any one or more or all of the preferred and optional features of the invention described herein, as appropriate. For example, preferably one or more of the two or more plug portions are arranged for securing in one or more respective holes in the suspended plasterboard wall or ceiling. Preferably the method comprises drilling two or more holes in the suspended plasterboard wall or ceiling.

The two or more plug portions may be the same size and shape. However in one embodiment one of the two or more plug portions has a different size and/or shape from another of the two or more plug portions. Thus, because the fixing device may be passed through a single hole (e.g. having a diameter of 12 mm, 15 mm or 20 mm) in the suspended plasterboard wall or ceiling, the other holes in the suspended plasterboard wall or ceiling may be smaller (e.g. having a diameter of 4 mm, 6 mm or 8 mm), e.g. to secure a, e.g., smaller sized plug portion or even just to pass a fastener for inserting into the respective aperture, e.g. in the embodiments in which the fixing device is inverted (and thus the plug portions project away from the rear face of the suspended plasterboard wall or ceiling rather than through a hole therein), as will be described below. This helps to preserve the structural integrity of the suspended plasterboard wall or ceiling.

Preferably the perimeter of the cross section of one of the two or more plug portions (e.g. having the largest cross sectional area) in a plane perpendicular to the first direction has a minimum bounding circle having a first diameter; wherein the orthogonal projection of the fixing device in a plane perpendicular to the second direction has a maximum dimension that is less than the first diameter.

Preferably the two or more plug portions are separated from each other along the longitudinal backplate, e.g. positioned towards opposite ends of the longitudinal backplate. The plug portions may be separated from each other by any suitable and desired distance. In one embodiment the apertures of two of the two or more plug portions are separated from each other by between 20 mm and 200 mm apart, e.g. between 30 mm and 150 mm apart, e.g. between 50 mm apart and 100 mm apart.

In one embodiment the two or more plug portions are connected by an integral, e.g. rigid, longitudinal backplate. In another embodiment the longitudinal backplate comprises a hinge, e.g. between two of the two or more plug portions. Preferably the hinge comprises a living hinge. This may allow the fixing device to have two or more plug portions but still be able to be pushed through a hole into a limited depth void behind a suspended plasterboard wall or ceiling, or may allow an even longer longitudinal backplate to be provided. In this embodiment preferably the method comprises folding the fixing device about its hinge (before the fixing device is inserted into the hole).

When the fixing device comprises two or more plug portions, the longitudinal backplate may be any suitable and desired length. In one embodiment the longitudinal backplate has a length of between 70 mm and 250 mm, e.g. between 90 mm and 150 mm, e.g. 95 mm.

When the fixing device comprises two or more plug portions, preferably two or more respective tools are used to install the fixing device in the suspended plasterboard wall or ceiling. Preferably one of the tools is, e.g., as described for the fixing device having a single plug portion, that is arranged to be used to attach to one of the plug portions and to insert the fixing device into (one of) the holes in the suspended plasterboard wall or ceiling, and to position the plug portion relative to (e.g. pull the plug portion back through and secure the plug portion into) the hole (e.g. through which the fixing device was inserted). Preferably another tool is used to position the other plug portion relative to (e.g. pull and secure the plug portion into) another hole in the suspended plasterboard wall or ceiling.

The embodiments of the fixing device with two or more plug portions is particularly suitable for attaching heavier items, e.g. a television bracket, to a suspended plasterboard wall or ceiling. This is because of the possibility to provide a larger longitudinal backplate but also because the, e.g., separated fixing points at the plug portions help to allow the fixing device together with, e.g., a laminated front plate that is attached to the fixing device, to effectively sandwich the suspended plasterboard wall or ceiling therebetween. This helps to prevent deformation of the suspended plasterboard wall or ceiling.

The aperture may be provided in any suitable and desired way. Preferably the aperture extends (in the first direction) parallel to the direction in which the plug portion projects from the longitudinal backplate, e.g. parallel to the cylindrical axis of the plug portion (when the plug portion comprises a cylinder). Preferably the aperture is at the centre of the plug portion, e.g. at the centre of the minimum bounding circle round the cross section of the plug portion. Preferably the aperture is collinear with the cylindrical axis of the plug portion (when the plug portion comprises a cylinder).

Preferably the aperture extends all the way through the plug portion. Preferably the aperture extends all the way through the plug portion and through the longitudinal backplate. In one embodiment the aperture comprises a thread. In one embodiment the aperture is arranged to receive a self-tapping fastener, e.g. the aperture may be straight sided, i.e. may not be threaded. Thus preferably the fastener is a threaded fastener, e.g. a bolt or a screw. Preferably the aperture is arranged to receive an ISO metric M4, M6 or M8 screw thread, e.g. preferably the aperture has a diameter of 4 mm, 6 mm or 8 mm.

The plug portion may (and preferably does) have only a single aperture. However in one embodiment the plug portion comprises two or more apertures. Preferably the plurality of apertures are arranged to extend parallel to each other (i.e. in the first direction) through the plug portion. Providing multiple apertures allows an item to be attached to the fixing device at multiple points using multiple fasteners, e.g. to attach it more securely to the fixing device and/or help prevent it from rotating.

When the plug portion comprises two or more apertures, these apertures may be spaced from each other by any suitable and desired distance. Preferably the centres of the (e.g. adjacent) apertures are spaced from each other by 10 mm, 15 mm or 20 mm.

The longitudinal backplate that projects from diametrically opposite sides of the plug portion may be provided in any suitable and desired way to such that, in use, it engages with the rear face of the suspended plasterboard wall or ceiling when the plug portion is secured in the hole, as well as having a cross section (with the plug portion, in a plane perpendicular to the second direction) that enables the fixing device to be pushed fully along the length of the longitudinal backplate through the hole. In a preferred embodiment the longitudinal backplate comprises a flat face (to which the plug portion is attached) arranged in use to engage with the rear face of the suspended plasterboard wall or ceiling when the plug portion is secured in the hole.

The cross section of the fixing device through the plug portion and the longitudinal backplate in a plane perpendicular to the second direction is preferably the maximum cross section of the fixing device along the length of the longitudinal backplate. Alternatively expressed, the cross section is preferably the orthographic projection (having a projection plane perpendicular to the second direction) of the fixing device.

In one embodiment the longitudinal backplate is longitudinally extended. Thus preferably the length of the longitudinal backplate (in a direction parallel to the second direction) is greater than the width of the longitudinal backplate (in a direction perpendicular to the second direction and perpendicular to the first direction). Preferably the length of the longitudinal backplate is greater than the depth of the longitudinal backplate (in a direction parallel to the first direction).

The longitudinal backplate may have any suitable and desired shape and size, e.g. for being inserted through a hole in a suspended plasterboard wall or ceiling along the length of the longitudinal backplate. Preferably the longitudinal backplate is cylindrical (i.e. having the same cross section in a plane perpendicular to the second direction along substantially all the length of the longitudinal backplate).

Preferably the cross section of the longitudinal backplate comprises a rectangle, preferably having rounded or chamfered corners on the side of the longitudinal backplate opposite to the side from which the plug portion projects (e.g. opposite the flat face of the longitudinal backplate). In one embodiment the side of the longitudinal backplate opposite to the side from which the plug portion projects is rounded, e.g. forms an arc of a circle. As with the chamfers on the corners of the plug portion, this helps the fixing device to fit through the hole in the plasterboard along the length of the longitudinal backplate while maximising the height that the plug portion projects from the longitudinal backplate (in a direction parallel to the first direction).

In a preferred embodiment one or both of the ends of the longitudinal backplate (distal from the plug portion) are rounded, e.g. on the side of the longitudinal backplate from which the plug portion projects. A rounded end helps the longitudinal backplate to slide along the rear face of the plasterboard when the plug portion is pulled back towards the hole in the plasterboard, thus rotating the fixing device into position (i.e. with the longitudinal backplate lying parallel to the rear face of the plasterboard) before the plug portion is positioned in the hole. This is because the rounded end causes the fixing device to contact the rear face of the plasterboard only at a point (rather than a sharp edge), thus helping to minimise the friction between the fixing device and the plasterboard.

Preferably the (e.g. maximum) width of the longitudinal backplate (e.g. at the point at which the longitudinal backplate attaches to the plug portion) is substantially equal to the (e.g. maximum) width (the dimension of the plug portion in a direction perpendicular to both the first direction and the second direction) of the plug portion. Thus when the cross section of the plug portion comprises straight sides (e.g. the plug portion comprises flat sides) preferably the width of the longitudinal backplate is equal to the width between the straight sides of the plug portion.

Preferably the length (the dimension in a direction parallel to the second direction) of the longitudinal backplate is between 50 mm and 100 mm, e.g. 42 mm, 70 mm or 95 mm. Preferably the width (the dimension in a direction perpendicular to the first direction and perpendicular to the second direction) of the longitudinal backplate is between 5 mm and 20 mm, e.g. 9 mm or 16 mm. Preferably the depth (the dimension in a direction parallel to the first direction and perpendicular to the second direction) of the longitudinal backplate is between 2 mm and 10 mm, e.g. 3 mm, 5 mm or 7 mm.

As will be appreciated, the size of the longitudinal backplate and/or the plug portion may determine the size of the aperture for the fastener, e.g. a larger longitudinal backplate and/or a larger plug portion may be more suitable for a larger aperture.

The fixing device may be formed in any suitable and desired way, and thus may be made from any suitable and desired material. In one embodiment the plug portion and the longitudinal backplate, e.g. the whole of the fixing device, are integrally formed. Preferably the fixing device is made of plastic, e.g. acetal or nylon. In one embodiment the fixing device comprises glass fill, e.g. in the plastic. In a particularly preferred embodiment the fixing device is made of nylon (e.g. polyamide 66 or polyphthalamide (PPA)) with glass fill. The fixing device may comprise any suitable and desired fraction of glass fill. In one embodiment the material of the fixing device comprises between 25% and 65% glass fill, e.g. 50% glass fill. Preferably the fixing device is integrally moulded. In another embodiment the fixing device is made, e.g. cast, from metal (e.g. steel). In a further embodiment the fixing device is formed from two or more different materials, e.g. plastic and metal.

Thus preferably, in one embodiment, the plug portion and the longitudinal backplate are movable relative to each other, and, e.g., made from different materials. In one embodiment the plug portion (e.g. made from plastic) is slidably attached to the longitudinal backplate (e.g. made from metal). Preferably the plug portion is arranged to slide in the second direction along the longitudinal backplate. This enables the position of the plug portion along the length of the longitudinal backplate to be changed.

Thus preferably, in one embodiment, the longitudinal backplate comprises one or more (e.g. a pair of) rails extending in the second direction arranged to receive the plug portion. Preferably the longitudinal backplate has a C-shaped cross section, e.g. with one or both sides of the longitudinal backplate in lying in respective planes perpendicular to the first direction, and the plug portion comprises lugs that engage in the curved edges of the longitudinal backplate. The lugs preferably extend in the second direction beyond either side of the part of the plug portion that projects from the longitudinal backplate. This helps to strengthen the fixing device as the extended lugs will extend either side of a hole in which the plug portion is secured and therefore provides support against the suspended plasterboard wall or ceiling. The C-shape longitudinal backplate may provide space for an electrical flex, for example, to be accommodated.

In one embodiment the longitudinal backplate comprises a longitudinally extended aperture that extends in the second direction. This allows access through the longitudinal backplate for the fastener (and, e.g., also the tool) to be inserted in the aperture of the plug portion, even when the plug portion is moved along the longitudinal backplate.

The face of the longitudinal backplate that is arranged to engage with the rear face of the suspended plasterboard wall or ceiling may be completely flat, e.g. devoid of any features. However, in a preferred embodiment the longitudinal backplate comprises one or more (e.g. two) barbs that project from the longitudinal backplate and are arranged to embed into the rear face of the suspended plasterboard wall or ceiling when the plug portion is secured in the hole in the plasterboard. These barbs help to locate the longitudinal backplate on the rear face of the suspended plasterboard wall or ceiling and to retain the position of the longitudinal backplate on the rear face of the suspended plasterboard wall or ceiling. The barbs also help to prevent the longitudinal backplate from deforming (e.g. bending) when a load acts on the fixing device, i.e. from an item that is attached to the fixing device via a fastener in the aperture.

Preferably the longitudinal backplate comprises two barbs positioned either side of the plug portion, e.g. closer to the respective ends of the longitudinal backplate than the plug portion. This spacing of the barbs helps to maximise the leverage of the barbs and therefore to lower the stress from them when they embed into the plasterboard.

Preferably the barbs comprise (e.g. concentric) grooves (e.g. extending in a direction parallel to the plane of the, e.g. flat, face of the longitudinal backplate that engages with the rear face of the plasterboard). The grooves help to retain the barbs embedded in the plasterboard.

Preferably the side of each of the barbs proximal to the plug portion projects perpendicularly from the longitudinal backplate (i.e. perpendicular to the second direction). Preferably the side of each of the barbs distal from the plug portion projects at a non-perpendicular angle from the longitudinal backplate towards the plug portion (i.e. non-perpendicular to the second direction). This triangular shape of the barbs helps to minimise the stress exerted by the barbs on the plasterboard when the longitudinal backplate experiences a load through the fastener and thus to minimise the deformation of the longitudinal backplate.

The plug portion may be arranged in any suitable and desired way to receive a tool for positioning the plug portion relative to (e.g. securing the plug portion in) the hole in the suspended plasterboard wall or ceiling. Preferably the tool is removable from the plug portion. Thus preferably the method comprises the step of attaching the tool to the plug portion, e.g. before the (end of the longitudinal backplate of the) fixing device is inserted into a hole in the plasterboard. Preferably the method comprises the step of removing the tool from the plug portion, e.g. after the tool has been used to position the plug portion relative to (e.g. pull or screw the plug portion into) the hole to, e.g. secure, the plug portion in the hole.

The tool may be (e.g. removably) attached to the plug portion in any suitable and desired way. In one embodiment the tool is received by the aperture in the plug portion. Thus, when the aperture comprises a threaded aperture, preferably the tool comprises a thread arranged to be screwed into the threaded aperture.

In a preferred embodiment the plug portion comprises one or more (e.g. two) recesses (e.g. holes) arranged to receive an end of the tool, e.g. the end of the tool is arranged to clip into the recess(es). When there are two (or more) recesses in the plug portion, preferably two recesses are positioned on opposite sides of the aperture. Having a tool that clips into the plug portion may remove the need to align the tool with the fixing device before inserting the fixing device into the hole, may reduce the time to attach and remove the tool from the plug portion, may allow the same size tool be used for fixing devices of different sizes (e.g. having apertures of different (e.g. thread) sizes), etc., compared to when the tool is threaded and is screwed into a threaded aperture.

When the plug portion comprises one or more recesses arranged to receive an end of the tool, preferably the tool comprises an end having one or more projections (e.g. corresponding to the one or more recesses respectively) arranged to be received by (project into) the one or more recesses. Preferably the tool comprises a sprung wire tool, e.g. a loop of sprung wire, e.g. made from wire having a diameter of between 1.5 mm and 2 mm. Thus preferably the end of the tool (having one or more projections) is simply the end(s) of the wire.

In a preferred embodiment the plug portion comprises (e.g. only) a single recess (e.g. hole) arranged to receive an end of the tool, e.g. the end of the tool is arranged to be inserted into the recess. Preferably the recess is cylindrical. Preferably the recess has a circular cross section. Preferably the diameter of the recess (i.e. the diameter of the circular cross section) is between 3 mm and 5 mm, e.g. (approximately) 4 mm. Thus preferably the end of the tool has a shape that is complementary to the recess. Thus preferably the end of the tool (e.g. the end engaging portion of the tool, as described below) is cylindrical. Preferably the end of the tool has a circular cross section. Preferably the diameter of the end of the tool (i.e. the diameter of the circular cross section) is between 3 mm and 5 mm, e.g. (approximately) 4 mm. This helps to provide a friction fit of the tool in the recess. Preferably the end of the tool has a rounded, bevelled or mitred (e.g. at 45 degrees) tip. This helps to insert the end of the tool into the recess.

In this embodiment preferably the tool comprises (e.g. is wholly formed from) a length of (e.g. metal) wire, e.g. having a diameter between 3 mm and 5 mm, e.g. (approximately) 4 mm. Preferably the tool is made from (e.g. coated mild or low grade stainless) steel. Such a tool is particularly simple to manufacture, quick and easy to use, and cost effective.

In another embodiment the tool is made of plastic, e.g. acetal or nylon. In one embodiment the tool comprises glass fill, e.g. in the plastic. In a particularly preferred embodiment the tool is made of nylon (e.g. polyamide 66 or polyphthalamide (PPA)) with glass fill. The tool may comprise any suitable and desired fraction of glass fill. In one embodiment the material (e.g. plastic) of the tool comprises between 25% and 65% glass fill, e.g. 50% glass fill. Preferably the tool is integrally moulded.

Preferably the tool comprises a handle and an end engaging portion, wherein the end engaging portion is bent relative (e.g. perpendicular) to the handle. Thus preferably the end engaging portion of the tool is arranged for inserting into the recess, to attach the tool to the fixing device, and the handle is used to insert the fixing device through the hole in the plasterboard and then to position the plug portion in the hole in the plasterboard.

This embodiment of the tool is particularly useful when the plug portion comprises an external screw thread. The handle of the tool could be straight, e.g. a straight length of wire or a (e.g. plastic) shaft. However preferably the handle comprises an end handling portion that is bent relative (e.g. perpendicular) to a main portion of the handle (e.g. the end engaging portion of the tool and the end handling portion of the handle of the tool lie either side of the main portion of the handle). The handle may have any suitable and desired dimensions. In one embodiment the main portion of the handle has a circular cross section. Preferably the diameter of the main portion of the handle has a diameter between 5 mm and 7 mm, e.g. (approximately) 6 mm. In one embodiment the diameter of the main portion of the handle decreases (e.g. is graded) from approximately 6 mm at the end at which the main portion of the handle attaches to the end handling portion to approximately 5 mm at the end at which the main portion of the handle attaches to the end engaging portion of the tool. Preferably the main portion of the handle comprises a section (e.g. proximal to the end engaging portion) of constant diameter of approximately 5 mm (e.g. at the point at which the main portion of the handle of the tool is to pass through the notch in the rim of the plug portion of the fixing device). In one embodiment the end handling portion of the handle has a circular cross section. Preferably the diameter of the end handling portion of the handle has a diameter between 5 mm and 7 mm, e.g. (approximately) 6 mm.

In one embodiment, the direction in which the end handling portion of the handle extends makes an angle of between 90 degrees and 180 degrees (e.g. (approximately) 135 degrees) with the direction in which the end engaging portion of the tool (that is to be inserted into the recess) extends (preferably this angle is equal to the angle through which the plug portion is to be rotated to secure the plug portion in the hole in the plasterboard). This helps to allow the fixing device to be oriented at the correct angle before the plug portion is screwed into position in the hole in the plasterboard, such that when the plug portion is screwed into position in the hole in the plasterboard the longitudinal backplate finishes in a vertical position (when the fixing device is used in a plasterboard wall). The angle of the end handling portion to the end engaging portion also helps to give three dimensional control of the fixing device when the end engaging portion is located in the fixing device.

However in a preferred embodiment the end handling portion of the handle and the end engaging portion of the tool lie in the same plane. This helps to simplify the manufacture of the tool.

The end handling portion may be provided in any suitable and desired way. Preferably the end handling portion and the main portion of the handle extend substantially perpendicularly to each other. In one embodiment the end handling portion and the main portion of the handle are configured substantially in an "L" shape, e.g. when the tool is made from a length of wire. In another embodiment the end handling portion and the main portion of the handle are configured substantially in a "T" shape, e.g. the end handling portion extends in substantially opposite directions perpendicularly from the end of the main portion of the handle. This configuration may be provided when the tool is made from plastic. It will be appreciated that a "T"-shaped tool helps with use of the tool for installation of the fixing device, e.g. because the tool is more symmetrical and may be used equally easily by both right and left handed users.

The tool may be made in two (or more) parts, e.g. the end handling portion may be manufactured (e.g. integrally moulded) as a separate component from the main portion and end engaging portion of the tool. This may help with the manufacture, e.g. when the end handling portion and the end engaging portion of the tool lie in different planes, as it may be easier to manufacture these separately.

However in a preferred embodiment (e.g. when the end handling portion and the end engaging portion of the tool lie in the same plane) the tool is made as a single part (e.g. integrally moulded).

The end (e.g. engaging portion) of the tool may be configured to be inserted into the recess of the fixing device in any suitable and desired way. The length of the end engaging portion and, e.g., the bend between the end engaging portion and the main portion of the handle of the tool may be shaped and sized to determine the fit of the end of the tool in the recess. However in a preferred embodiment the end (e.g. engaging portion) of the tool comprises a flange that extends (e.g. circumferentially) around (e.g. the circumference of) at least part of the end of the tool. Preferably at least part of the distal end of the tool projects from the flange. Thus preferably the flange is located proximal to the main portion of the handle of the tool.

The flange may extend all the way around (e.g. the circumference of) the end of the tool. However preferably the flange extends greater than half of (e.g. the circumference of) the end of the tool, e.g. through an angle of greater than 180 degrees, e.g. (approximately) 225 degrees. In a particularly preferred embodiment the flange extends around the (e.g. circumference of the) end of the tool through (e.g. approximately) 225 degrees from a point (e.g. on the circumference) opposite the side to which the (e.g. main portion of the) handle attaches to the end (e.g. engaging portion) of the tool. It will be appreciated that this shape of flange helps to position the end of the tool correctly in the recess of the fixing device and then helps the fixing device to be oriented to the correct angle relative to the handle of the tool (e.g. with the (e.g. main portion of the) handle lying substantially collinear with the aperture of the fixing device) before the plug portion is screwed into position in the hole in the plasterboard.

Preferably the flange has an edge that extends substantially tangentially outwards from the (e.g. circumference of the) end of the tool at the point (e.g. on the circumference) opposite the side to which the (e.g. main portion of the) handle attaches to the end (e.g. engaging portion) of the tool. Preferably the flange has an edge that extends substantially radially outwards from the (e.g. circumference of the) end of the tool at the point (e.g. approximately) 225 degrees around from the point (e.g. on the circumference) opposite the side to which the (e.g. main portion of the) handle attaches to the end (e.g. engaging portion) of the tool.

Preferably the flange has an outer perimeter that is substantially parallel (e.g. concentric) to the (external surface (e.g. circumference) of the) end of the tool, e.g. through (an arc of) approximately 135 degrees around from the edge that extends substantially radially outwards from the end of the tool. Preferably the outer perimeter of the flange is substantially straight and substantially perpendicular from the edge that extends substantially tangentially outwards from the end of the tool, e.g. from the point at which it meets the edge that extends substantially tangentially outwards from the end of the tool to the point at which the flange has an outer perimeter that is substantially parallel to the end of the tool.

It will be appreciated that this shape of flange helps to create a friction fit between the flange and the (e.g. inner surface of the) rim of the fixing device such that the tool is "locked" into position when the fixing device is rotated into position for pulling back into the hole in the plasterboard wall or ceiling (i.e. when the (e.g. main portion of the) handle lies substantially collinear with the aperture of the fixing device). This helps to maintain the perpendicular position of the fixing device to the handle of the tool while the plug portion of the fixing device is located in the hole of the plasterboard wall or ceiling (this aids installation of the fixing device and helps to ensure its correct alignment prior to the fixing device being pulled or screwed back into the hole). This shape of flange may also dispense with the need for an inner projection in the plug portion (as discussed below).

In a preferred embodiment the end of the tool comprises a projection (e.g. a ridge) that is offset from the point (e.g. on the circumference) opposite the side to which the (e.g. main portion of the) handle attaches to the end (e.g. engaging portion) of the tool in a direction opposite to the direction in which the flange extends tangentially from the end of the tool. Preferably the projection has a first edge that extends substantially tangentially outwards from the point (e.g. on the circumference) opposite the side to which the (e.g. main portion of the) handle attaches to the end (e.g. engaging portion) of the tool (i.e. in a direction opposite to the direction in which the flange extends tangentially from the end of the tool) and a second edge that is substantially perpendicular to the first edge. Thus, for example, the projection may simply be a small extension of the flange the other side of the point (e.g. on the circumference) opposite the side to which the (e.g. main portion of the) handle attaches to the end (e.g. engaging portion) of the tool.

This projection helps to create a "snap-in" of the end of the tool when the fixing device is rotated about the end of the tool into the position for pulling or screwing the plug portion of the fixing device into the hole in the plasterboard wall or ceiling. This is because preferably the projection is located such that it comes into contact with the base of the plug portion of the fixing device when the fixing device is rotated about the end of the tool and the fixing device has to be rotated past the projection such that it "snaps" into its correct position for being pulled or screwed back into the hole in the plasterboard. Thus the projection creates a compression (e.g. a small increase in potential energy as the projection is squeezed past the base of the plug portion) which then decreases (such that the energy state is lowered) and the fixing device comes to rest in its correct position.

It will be appreciated that this "snap-in" of the end of the tool (which helps to "lock" the tool into the position for pulling or screwing the plug portion back into the hole in the plasterboard) also helps to provide three dimensional control over the movement of the fixing device, e.g. because the fixing device is unlikely to rotate about the end of the tool when it is "locked" in this position. This therefore helps to enable the tool to have a configuration in a single plane (i.e. the handle and the end), which simplifies manufacture of the tool.

Preferably the projection extends diagonally towards the main portion of the handle of the tool, e.g. circumferentially away from the point (e.g. on the circumference) opposite the side to which the (e.g. main portion of the) handle attaches to the end (e.g. engaging portion) of the tool. This helps to reduce the force required to rotate the fixing device about the end of the tool to overcome the projection and "snap" into position.

In one embodiment the end engaging portion of the tool comprises (e.g. compression, crushable) ribs (e.g. around its external perimeter). In another embodiment the (e.g. internal surface of the) recess in the plug portion (i.e. into which the end of the tool is inserted) comprises (e.g. compression, crushable) ribs. Additionally or alternatively, in one embodiment the end engaging portion of the tool is tapered. Both of these features assist with providing a "keyed" friction fit of the end of the tool in the recess, with matching the tolerances of the recess and the end of the tool, and with guiding the end of the tool into the recess.

In one embodiment the distal end of the tool (i.e. the distal end of the end engaging portion of the tool) comprises a slot (e.g. that extends across the width (e.g. diameter) of the end (e.g. engaging portion) of the tool). The slot may have a depth of approximately 4 mm and a width of approximately 1.2 mm. This may allow the end of the tool to be compressed slightly when the end of the tool is inserted into the recess, thus aiding the friction fit of the end of the tool in the recess.

The width (e.g. diameter) of the recess may increase through the rim of the plug portion in a radially outwards direction, i.e. from the inside of the plug portion to the outside of the plug portion, e.g. from a diameter of approximately 4 mm to a diameter of approximately 4.14 mm (e.g. a draft of approximately 1 degree all around the circumference of the recess). This may help, e.g. when the end of the tool comprises a (e.g. transverse) slot (e.g. through the diameter of the distal end of the tool), to allow the end of the tool to expand as the tool is inserted through the recess, to help to retain the end of the tool in the recess, e.g. owing to the slight pressure that will be required to insert and extract the end of the tool into and from the recess (i.e. from the inside of the plug portion).

Thus preferably the end engaging portion of the tool has a diameter that increases (e.g. from approximately 4 mm) (e.g. at the edge of the flange) towards the distal end of the tool (where, e.g., the diameter is approximately 4.2 mm (e.g. before any rounded, bevelled or mitred end)). Such an oversized distal end of the end engaging portion (e.g. for a recess that has a diameter of 4 mm at the internal side of the rim of the plug portion) thus requires the end of the tool to be compressed slightly (e.g. by approximately 0.1 mm per side) to be inserted into the recess.

However, when the diameter of the recess increases through the rim of the plug portion (but, e.g. by less than the amount by which the diameter of the tool increases (in its uncompressed state)) this allows the end of the tool to expand into the recess but, e.g., maintain friction with the side of the recess while preventing the fixing device from becoming detached from the tool (e.g. the end of the tool may have to be compressed again to pull it out of the recess, which requires a lateral force).

Furthermore, owing to the (e.g. transverse) slot in the distal end of the tool, this may help to provide a partial hinge on the tool (e.g. when the tool is in its "snapped-in" position), which may allow the projection on the bottom of the tool to be overcome without having to use an excessive force. This compliance of the partial hinge may therefore act with the projection to optimise the "snap" of the tool into its "locked" position in the fixing device and may allow the projection to be enlarged slightly.

Such a tool is considered to be novel and inventive in its own right and therefore when viewed from a further aspect the invention provides a tool comprising a handle and an end engaging portion for inserting into a recess having a circular cross section, wherein the handle comprises a main portion and an end handling portion, wherein the end engaging portion of the tool and the end handling portion of the handle of the tool are located at either end of the main portion of the handle, and wherein the main portion of the handle extends perpendicularly to the end engaging portion, and wherein the end engaging portion comprises a flange spaced from the distal end of the end engaging portion and which extends circumferentially through at least 180 degrees, e.g. approximately 225 degrees, around the end engaging portion, e.g. from a point opposite the side of the end engaging portion to which the handle attaches.

It will be appreciated that this aspect of the invention may include one or more or all of the optional and preferable features described herein as appropriate.

Preferably the one or more recesses are positioned on an inward facing surface of the plug portion. Preferably the aperture in the plug portion comprises an opening (at the entrance to the aperture, i.e. distal from the longitudinal backplate) having a cross section (in a plane perpendicular to the first direction) that is greater than the cross section of the rest of the aperture. This entrance opening is arranged to accommodate the tool (e.g. a loop or bend at the end thereof) and preferably the one or more recesses are provided in the entrance opening, e.g. positioned on an inward facing surface thereof.

Preferably the plug portion, e.g. the entrance opening thereof, comprises a rim extending around the face of the plug portion (distal from the longitudinal backplate) at least partially surrounding the entrance (e.g. opening) to the aperture. Preferably the rim comprises the one or more recesses (in the embodiments that comprise one or more recesses), e.g. positioned on an inward facing surface thereof. Preferably the rim has a thickness (e.g. in the radial direction from the aperture) of between 3 mm and 5 mm, e.g. (approximately) 4 mm. This helps to provide the required friction between the fixing device and the tool, as well as the necessary strength for manipulating the fixing device with the tool, so that the tool can be retained in the recess and the fixing device can be positioned (e.g. rotated).

The one or more recesses (e.g. holes) may extend (e.g. from an inward facing surface of the plug portion) at least partially (e.g. fully) through (e.g. the rim) to an outward facing surface of the plug portion. Thus the one or more recesses (e.g. holes) may extend at least partially (e.g. fully) through the rim extending around the plug portion.

In the embodiments in which the plug portion comprises (e.g. only) a single recess, preferably the plug portion (e.g. the rim of the plug portion) comprises a slot (e.g. diametrically opposite the recess) to allow access for the end of the tool to be inserted into the recess. Preferably the slot extends e.g. from an inward facing surface of the plug portion at least partially (e.g. fully) through (e.g. the rim) to an outward facing surface of the plug portion.

When the one or more recesses extend fully through the rim extending (e.g. at least partially) around the plug portion, preferably the plug portion comprises one or more (e.g. toroidal shaped) bosses on the outside of the rim at the respective ends of the one or more recesses. Preferably the one or more bosses project from the outside of the rim by approximately 1 mm. The bosses help to strengthen the recesses that locate the end of the tool, e.g. to help to prevent elongation (or even tearing) of the recesses when a large force is exerted by the tool on the recesses. When the plug portion comprises flat sides (e.g. parallel to the second direction) it will be appreciated that this helps to provide room for the bosses (both when the fixing device is pushed through the hole in the suspended plasterboard wall or ceiling and when the plug portion is pulled back to be secured into the hole).

Preferably the plug portion comprises one or more channels extending (e.g. in the first direction) from the face of the plug portion (distal from the longitudinal backplate) to the one or more recesses respectively. The one or more channels may be recessed into, or be formed by raised (e.g. parallel) walls (e.g. either side of each channel) projecting from, the (e.g. inward facing surface of the) plug portion. These channels may help to assist the attachment and detachment of the tool to and from the one or more recesses in the plug portion and the raised walls also help to reinforce the plug portion. The channels may also help to locate the (e.g. handle of the) tool in the one or more recesses, such that the tool extends in the first direction (with the longitudinal backplate lying perpendicular to the tool) so that the fixing device is held in a position (by the tool lying in the one or more channels) in which it is then able to be positioned relative to (e.g. pulled back into) the hole in the suspended plasterboard wall or ceiling. Preferably the depth of the one or more recesses is greater than the depth of the one or more channels, e.g. such that the end(s) of the tool are guided along the channels to drop into the recess(es).

When the one or more channels are formed by raised parallel walls, preferably the parallel walls of the channels are higher proximal to the respective recesses (and lower distal from the respective recesses). This helps to encourage the (e.g. handle of the) tool into the one or more channels to locate the tool for positioning the fixing device when it is in the void behind the suspended plasterboard wall or ceiling. It will be appreciated that once the tool is located in the one or more channels, the fixing device is in the correct orientation for positioning the plug portion of the fixing device relative to the hole (e.g. pulling the plug portion back into the hole for securing therein).

To allow the depth (the dimension in the first direction) of the plug portion to be maximised (to help maximise the security of the plug portion in the hole in the suspended plasterboard wall or ceiling, and thus the loading on the fixing device) and to aid the insertion of the fixing device into and through the hole, preferably the plug portion comprises a notch (extending in the second direction) in the face of the plug portion (distal from the longitudinal backplate) arranged to accommodate the tool, e.g. such that the tool does not project from (e.g. lies flush with) the face of the plug portion when the tool is attached to the plug portion and oriented (relative to the plug portion) in the second direction. When the plug portion comprises a rim, preferably the notch extends through the rim. When the plug portion comprises corrugations on one side, preferably the notch in the face of the plug portion extends through the side of the plug portion comprising the corrugations.

The notch may have any suitable and desired shape. In one embodiment the notch is cylindrical (having a constant cross section extending in the second direction). The notch may have a rectangular cross section or may have an increasing width (in a direction perpendicular to the first and second directions) away from the longitudinal backplate (in the first direction), e.g. such that the notch has a trapezoid or triangular (V-shaped) cross section.

The notch (particularly when it has a width that increases further away from the longitudinal backplate) in the plug portion preferably acts to bias the (e.g. handle of the) tool, preferably such that the tool stores some energy (it will be seen that this is particularly beneficial when the tool comprises a sprung wire tool, as outlined below), when the tool is attached to the plug portion and oriented in the second direction (e.g. in the configuration for inserting the fixing device into and through the hole in the suspended plasterboard wall or ceiling). It will be appreciated that this aids the rotation of the fixing device relative to the tool (e.g. about an axis perpendicular to both the first and second directions) once the fixing device has been inserted through the hole in the suspended plasterboard wall or ceiling, because the stored energy can then be released (e.g. through the tool being released from the notch). This therefore can act as an auto-release mechanism such that the (e.g. handle of the) tool "pings" out of the notch and rotates the fixing device towards the configuration for positioning the plug portion relative to the hole (e.g. for pulling the plug portion back into the hole).

In a particularly preferred embodiment the plug portion comprises a notch having a width that increases in a direction away from the longitudinal backplate and comprises one or more channels extending from the face of the plug portion to the one or more recesses respectively. It will be appreciated that the act of the notch to bias the tool and thus to store energy therein may (and preferably does) release enough energy to rotate the fixing device relative to the (e.g. handle of the) tool and into the one or more channels (thus positioning the fixing device in the correct orientation (relative to the tool and to the hole in the suspended plasterboard wall or ceiling) for positioning the plug portion relative to (e.g. pulling the plug portion back through) the hole).

When the one or more channels are formed by raised (e.g. parallel) walls, preferably the height of the walls (e.g. that decrease in the first direction away from the longitudinal backplate) form a smooth transition from the notch (e.g. having a cross section with a width that increases away from the longitudinal backplate). This helps the biasing of the tool not to be lost all at once when the tool is released from the notch but before the fixing device has rotated such that the tool is located in the one or more channels. Thus the raised walls assist the transition of the tool from the notch into the one or more channels as they help to maintain the biasing ("pinching") of the tool in its, e.g. compressed, state. It will be appreciated that the raised walls take over from the notch in the controlled energy release from the tool. Thus, preferably, at the transition point between the notch and the raised walls, the notch and the raised walls are shaped to exert an equal bias on the (e.g. handle of the) tool at this point.

In the embodiments in which the plug portion comprises (e.g. only) a single recess and, e.g., the tool comprises an end engaging portion and a handle, preferably the plug portion comprises a notch, e.g. as outlined above, to accommodate the handle of the tool for when the fixing device is pushed through the hole in the plasterboard into the void behind the plasterboard. Preferably the notch is cylindrical (having a constant cross section extending in the second direction), e.g. with a rectangular cross section. Preferably the notch has a depth (i.e. in the first direction, from the face of the plug portion) of between 3 mm and 6 mm, e.g. approximately 4 mm or 5 mm.

In the embodiment in which the plug portion comprises an opening around the aperture, preferably the base of the notch is closer (i.e. in the first direction) to the face of the plug portion than the opening around the aperture. Preferably the base of the notch is closer (i.e. in the first direction) to the face of the plug portion than the side of the recess distal from the face of the plug portion. Thus the notch has a lip that (when the end of the tool is inserted into the recess and the handle of the tool is located in the notch) causes the handle of the tool to form an acute (and preferably non-zero) angle (e.g. between 9 degrees and 18 degrees, e.g. (approximately) 11 degrees or 16 degrees) with the second direction in which the longitudinal backplate extends. This angle helps the fixing device, when the end of the longitudinal backplate engages with the rear face of the plasterboard (i.e. after the fixing device has been inserted through the hole and is pulled back into position), to rotate about the end of the tool in the recess, such that the longitudinal backplate lies in a plane parallel to the plasterboard, thus allowing the plug portion to be positioned in the hole.

It will be appreciated that with the tool forming an angle with the longitudinal backplate, the distance (i.e. in the first direction) between the edge of the longitudinal backplate (on the side opposite the plug portion) and the handle of the tool increases towards the end of the longitudinal backplate. Preferably the distance between the end of the longitudinal backplate (on the side opposite the plug portion) and the handle of the tool is less than or equal to the first diameter (of the minimum bounding circle of the plug portion).

Preferably the notch (which preferably extends through the (rim of the) plug portion in the second direction) is aligned with the aperture, e.g. preferably the second direction through the centre of the notch and the first direction through the centre of the aperture lie in a plane. Preferably the recess is aligned with the aperture, e.g. preferably the direction through the centre of the recess and the first direction through the centre of the aperture lie in a plane. Preferably the recess extends (through the (rim of the) plug portion) in a direction perpendicular to the notch. This arrangement of the recess, the aperture and the notch helps to align the handle of the tool with the aperture (e.g. such that they are collinear) when the fixing device has been inserted through the hole in the plasterboard and into the void behind, and the fixing device has been rotated about the tool in the recess so that the longitudinal backplate lies parallel to the rear face of the plasterboard. This then aids the screwing of the plug portion into position in the hole in the plasterboard (in the embodiments in which the plug portion comprises an external screw thread).

Preferably the plug portion comprises a rounded inner projection (e.g. in the opening around the aperture) between the recess and the notch, e.g. which matches the bend in the end of the tool. This helps to locate the tool in the correct position (e.g. when it is folded down into the notch) to correctly align it with the notch (and thus the aperture). The inner projection also helps to counter the rotational moment created by the tool as near to the centre of the aperture as possible and helps to reduce the stress on the associated distortion of the (e.g. rim of the) plug portion, e.g. as it helps to provide reinforcement of the (e.g. rim of the) plug portion (e.g. when the tool is used to screw the plug portion into the hole in the plasterboard). As will be seen from embodiments described above, the inner projection may not be needed when the tool comprises a flange, as this may provide some of the same functions.

In the embodiments in which the plug portion comprises an external screw thread, preferably (e.g. at least part of) the screw thread is provide on the outer wall of the plug portion either side of the notch, e.g. on one of the curved sides of the plug portion.

The fixing device and the tool may be supplied separately, e.g. owing to the tool preferably being removable and thus able to be used for the installation of multiple fixing devices. In one embodiment, however, the fixing device and the tool are supplied together as a kit. Thus when viewed from a further aspect the invention provides a kit for installing a fixing device comprising a fixing device as described in any previous aspect of the invention and a tool arranged to be received by the plug portion of the fixing device.

The tool is, e.g., long enough to retain hold of the end of the tool (opposite from the end attached to the plug portion) when the fixing device is (and has been) pushed along the length of the longitudinal backplate through the hole in the plasterboard. Thus in a preferred embodiment the tool is between 90 mm and 200 mm in length, e.g. approximately 150 mm.

Preferably the tool is longitudinally extended, i.e. having a length greater than a width and a depth. Preferably the tool has as cross sectional area (in a plane perpendicular to the direction in which the tool is longitudinally extended) that is less than cross sectional area of the hole, e.g. less than the cross sectional area of the notch in the plug portion. Thus preferably the tool, when attached to the plug portion and oriented to a position in which the fixing device is to be passed through the hole, does not substantially increase the cross sectional area of the fixing device through the plug portion (in a plane perpendicular to the second direction).

To aid the tool in being able to push the fixing device through the hole in the suspended plasterboard wall or ceiling, preferably the tool and/or the plug portion are arranged so that the tool attaches to the plug portion in a pivoting manner, e.g. rotating about an axis extending perpendicular to the first direction and to the second direction. This allows the tool to be aligned with the second direction (and thus flattened against the plug portion, e.g. located in the notch therein) so that the fixing device may be pushed through the hole along the length of the longitudinal backplate and then to be rotated relative to the fixing device so that the plug portion may be positioned relative to (e.g. pulled back into) the hole. The pivoting attachment of the tool to the plug portion may be provided in any suitable and desired way.

In one embodiment the tool comprises a hinge, e.g. when the tool comprises a thread. In this embodiment preferably the tool comprises a threaded end arranged to be screwed into the aperture in the plug portion and a handle attached to the threaded end via a hinge. Preferably the hinge comprises a tab having a hole therein through which a loop at the end of the handle passes. Preferably the threaded end comprises a flange arranged to limit the threaded end being screwed into the threaded aperture, e.g. so that the tool is aligned with the fixing device to be pushed through the hole.

In another embodiment the one or more recesses in the plug portion (that receive an end of the tool) are arranged to allow the tool to pivot relative to the plug portion. Preferably the end of the tool comprises one or more (e.g. two) ends of a wire that are arranged to be located (and rotated) in the one or more recesses respectively. Locating the tool in the one or more recesses avoids having to screw the tool into the plug portion, e.g. by a correct number of turns so that the tool is aligned with the fixing device.

Preferably, e.g. owing to the attachment of the tool to the plug portion (e.g. as outlined above), the tool is arranged to be attached to the plug portion such that the fixing device can be rotated about the first direction (e.g. collinear with the aperture) by rotating the (e.g. handle of the) tool, e.g. about the first direction (e.g. collinear with the aperture).

Preferably the tool is able to be biased, e.g. compressed in a direction perpendicular to the direction in which it is longitudinally extended. This helps to secure the tool when attached to the (e.g. one or more recesses in the) plug portion and may also help, e.g. when the plug portion comprises a notch, to rotate the fixing device relative to the tool once fixing device has been passed through the suspended plasterboard wall or ceiling, e.g. as outlined above.

It will be appreciated that when the tool comprises a sprung wire tool, e.g. a loop of sprung wire (e.g. with the ends of the wire arranged to be received by the (e.g. one or more recesses in the) plug portion), this is able to be biased and also easily received in the (e.g. one or more channels in the) plug portion.

In some embodiments, e.g. when the plug portion has a first diameter of 12 mm, the ends of the sprung wire tool are arranged to cross over (to reduce the overall width of the tool) so that they may be received in the (e.g. one or more channels in the) plug portion.

It will be appreciated that the fixing device of the present invention is particularly suited for securing an item to a suspended plasterboard ceiling owing to the ability to provide a longitudinal backplate with a large surface area, which thus helps to distribute the load from an item attached to the fixing device via a fastener across the rear surface of the suspended plasterboard ceiling with which the longitudinal backplate engages.

Preferably the (front) face of the longitudinal backplate from which the plug portion projects is arranged to (and in use preferably does) engage with the rear face of the suspended plasterboard wall or ceiling (i.e. such that the plug portion is secured in the hole in the suspended plasterboard wall or ceiling). However the fixing device may not be positioned in this way using the tool, but in another way so that a fastener may be inserted into the aperture.

Thus in another embodiment the (rear) face of the longitudinal backplate (opposite to the face from which the plug portion projects) is arranged to (and in use preferably does) engage with the rear face of the suspended plasterboard wall or ceiling (i.e. such that the plug portion projects away from the suspended plasterboard wall or ceiling). In this embodiment preferably the tool is arranged to position the aperture relative to the hole (e.g. such that the projection of the hole onto the fixing device covers the aperture) to allow a fastener to be inserted into the aperture through the hole.

This embodiment, in which the fixing device is inverted compared to the previously described embodiments, is particularly suited for the use of the fixing device to attach an item to a suspended plasterboard ceiling, e.g. because the plug portion is not necessarily needed to be secured in a hole in the plasterboard to counter gravity.

It will be appreciated that inverting the fixing device when used to attach at item to a suspended plasterboard ceiling may help to increase the load capability of the fixing device. When an item is attached to the fixing device in this configuration via a fastener, the force exerted by the fastener is first transmitted through the plug portion and then onto the longitudinal backplate. This helps to lower the pressure on the rear (upper) face of the suspended plasterboard ceiling significantly.

Furthermore, when the longitudinal backplate comprises a C-shaped cross section in which the plug portion(s) are held, having the whole length of the rear face of the longitudinal backplate contacting the rear face of the suspended plasterboard ceiling helps to reduce the possibility of the plug portion being pulled out of the C-shaped longitudinal backplate under large loads, e.g. owing to the C-shaped longitudinal backplate opening out. The fixing device has a particular strength in this configuration owing to the lamination between the plug portion, the longitudinal backplate and the suspended plasterboard ceiling. The higher the load on the fixing device the greater the friction between the layers. This helps to reduce any deformation of the fixing device as any deformation would require slippage between the different layers.

When the fixing device is to be used in this inverted way, the plug portion may be offset from the longitudinal backplate owing to the plug portion not having to be pulled back and secured in the hole in the suspended plasterboard wall or ceiling. This configuration may allow the longitudinal backplate to engage with more of the rear face of the suspended plasterboard wall or ceiling (e.g. owing to the longitudinal backplate being offset from the hole in the plasterboard). It may also allow space through the hole for, e.g., an electrical cable.

In these embodiments preferably the method comprises positioning the fixing device with the plug portion projecting away from the suspended plasterboard wall or ceiling (and thus the "rear" face of the longitudinal backplate engaging with the rear face of the plasterboard).

Also, when the fixing device is to be inverted, preferably the tool (e.g. the threaded end thereof) does not comprise a flange or the flange is flush with the threaded end, so that tool is able to pass through the (aperture in) the longitudinal backplate.

In one embodiment the fixing device comprises a disc arranged on the front face of the suspended plasterboard wall or ceiling (i.e. the opposite face to the fixing device) arranged to substantially prevent the ingress of dust and/or vapour. This helps to provide a barrier to prevent dust and/or moisture passing through the hole and into the void behind the suspended plasterboard wall or ceiling. Such a disc may be attached to the fixing device before the item is attached to the fixing device by the fastener(s).

In another embodiment the fixing device comprises an integrated vapour barrier. Preferably the integrated vapour barrier comprises a segment of a circle arranged in a plane perpendicular to the first direction on each side of the plug portion that is perpendicular to the second direction (i.e. the two sides of the plug portion from which the longitudinal backplate does not extend). Preferably the circle has the same radius of curvature as the radius of the curved sides of the plug portion. Preferably the circle has the same radius of curvature as the radius of curvature of the hole, e.g. 20 mm.

Preferably the segments of the circle of the vapour barrier and the curved sides of the plug portion together form a circle, e.g. the minimum bounding circle of the plug portion. Preferably the vapour barrier lies in a plane that passes through the centre of the minimum bounding circle of the perimeter of the cross section of the fixing device through the plug portion in a plane perpendicular to the second direction. This helps the vapour barrier to be maximised in size while still allowing the fixing device to be inserted through the hole in the plasterboard.

When installing the fixing device, one end of the longitudinal backplate of the fixing device may be inserted into a hole in a suspended plasterboard wall or ceiling in any suitable and desired way. The tool for positioning the plug portion relative to (e.g. securing the plug portion in) the hole in the suspended plasterboard wall or ceiling may already be attached to the plug portion of the fixing device, e.g. as supplied in a kit. However preferably the method comprises attaching a tool to the plug portion.

Preferably then the method comprises orienting (e.g. rotating) the (longitudinal backplate of the) fixing device so that the second direction is substantially perpendicular to the plane in which the suspended plasterboard wall or ceiling lies (e.g. such that the second direction is parallel to (e.g. collinear with) the (e.g. central) axis of the (e.g. cylindrical)

hole through the plasterboard (through which the fixing device is to be inserted)). Preferably the method also comprises (e.g. when the fixing device comprises a pivot/hinge or is pivotably/rotatably attached to the plug portion) arranging (e.g. rotating) the tool such that it lies (e.g. in the direction in which it is longitudinally extended) in a direction parallel to the second direction (e.g. collinear with the longitudinal backplate). Preferably the method also comprises (when the plug portion comprises a notch) locating the tool in the notch. This helps the tool to lie flush with the plug portion and to substantially not increase its orthogonal projection.

The fixing device may be pushed (e.g. by the tool) fully through the hole (i.e. along the length of the longitudinal backplate, in a direction parallel to the second direction) and into a void behind the rear face of the suspended plasterboard wall or ceiling in any suitable and desired way. Preferably the method comprises inserting (e.g. using the tool) one end of the longitudinal backplate into the hole in the suspended plasterboard wall or ceiling. The tool is retained hold of (and remains attached to the plug portion) while the fixing device is pushed fully through the hole in the plasterboard.

This then allows the tool to be used to position the plug portion relative to the hole (e.g. to pull the plug portion into the hole to secure the plug portion in the hole), in any suitable and desirable way. Preferably the method comprises aligning the plug portion with the hole in the suspended plasterboard wall or ceiling, e.g. so that the first direction is substantially perpendicular to the plane in which the suspended plasterboard wall or ceiling lies (e.g. such that the first direction is parallel to (e.g. collinear with) the (e.g. central) axis of the (e.g. cylindrical) hole through the plasterboard (through which the fixing device is to be inserted)). Thus preferably the method also comprises using the tool to align plug portion with the hole in the suspended plasterboard wall or ceiling. In some embodiments, e.g. as described above when the plug portion comprises a notch to locate the tool, this alignment of the plug portion with the hole (e.g. owing to a rotation of the fixing device relative to the tool) may occur automatically when the fixing device has been passed through the hole and into the void behind the suspended plasterboard wall or ceiling, e.g. owing to the tool being released from the notch.

The orientation of the longitudinal backplate, in a plane parallel to the plane of the suspended plasterboard wall or ceiling may be any suitable and desired orientation. When the fixing device is being installed in a suspended plasterboard ceiling, the orientation of the longitudinal backplate may not be important. However, when the fixing device is being installed in a suspended plasterboard wall, preferably the method comprises orienting (e.g. using the tool to orient) the longitudinal backplate such that the second direction is substantially vertical. This helps to maximise the load that is able to be placed on the fixing device. When the plug portion comprises corrugations on one of the sides of the plug portion from which the longitudinal backplate projects, preferably the method comprises orienting (e.g. using the tool to orient) the longitudinal backplate such that the side of the plug portion that comprises corrugations faces upwards.

Once the plug portion has been, e.g., aligned with a hole in the suspended plasterboard wall or ceiling, the tool may be used to pull the plug portion back into the hole to secure the plug portion in the hole in any suitable and desired way to allow the aperture to receive a fastener. Preferably the method comprises pulling the plug portion back through the hole to engage the longitudinal backplate with the rear face of the suspended plasterboard wall or ceiling, e.g. such that the one or more barbs embed into the rear face of the suspended plasterboard wall or ceiling.

The plug portion may be pulled back through the hole to engage the longitudinal backplate with the rear face of the suspended plasterboard wall or ceiling by using the tool to pull on the plug portion. Alternatively, e.g. once the plug portion has been partially pulled back through the hole using the tool, a fastener inserted into the aperture may be used to pull the plug portion fully back through the hole (e.g. after the tool has been detached from the plug portion) to engage the longitudinal backplate with the rear face of the suspended plasterboard wall or ceiling. For example, when the aperture and the fastener are threaded, the act of screwing the threaded fastener into the threaded aperture may pull the portion fully back through the hole.

Thus the method preferably comprises detaching the tool from the plug portion. Preferably the method also comprises inserting a fastener into the aperture for attaching an item to a suspended plasterboard wall or ceiling. Thus preferably the method comprises attaching an item to the fastener in the aperture.

It will be appreciated that the fixing device of the present invention may be used to fix any suitable and desired item to a suspended plasterboard wall or ceiling. Examples of such items include curtain rails (light and heavy), Venetian and Roman blinds, mirrors, shelving (large and small), bathroom fixtures and fittings (including grab rails for the disabled), extractor fans, towel rails, radiators, boilers, water heaters, cabinets, cupboards, cooker hoods, light fittings, ceiling fans, projectors, television brackets (e.g. VESA mount), cable trays, etc.

The fixing device of the present invention is preferably reusable, recoverable and/or recyclable. Thus the fixing device may be reused many different times in situ for fixing different items thereto owing to it remaining secured in the hole once the fastener has been removed. Alternatively the fixing device may be recovered using the tool and installed into a different hole in a suspended plasterboard wall or ceiling.

Embodiments of the invention will now be described, by way of example only, with reference to the accompanying drawings, in which:

FIGS. 9-14 show the same views as FIGS. 1-6 for a fixing device according to another embodiment of the present invention;

FIGS. 15a and 15b show side views of part of a tool used to install the fixing device as shown in FIGS. 1-14;

Figure 28A:
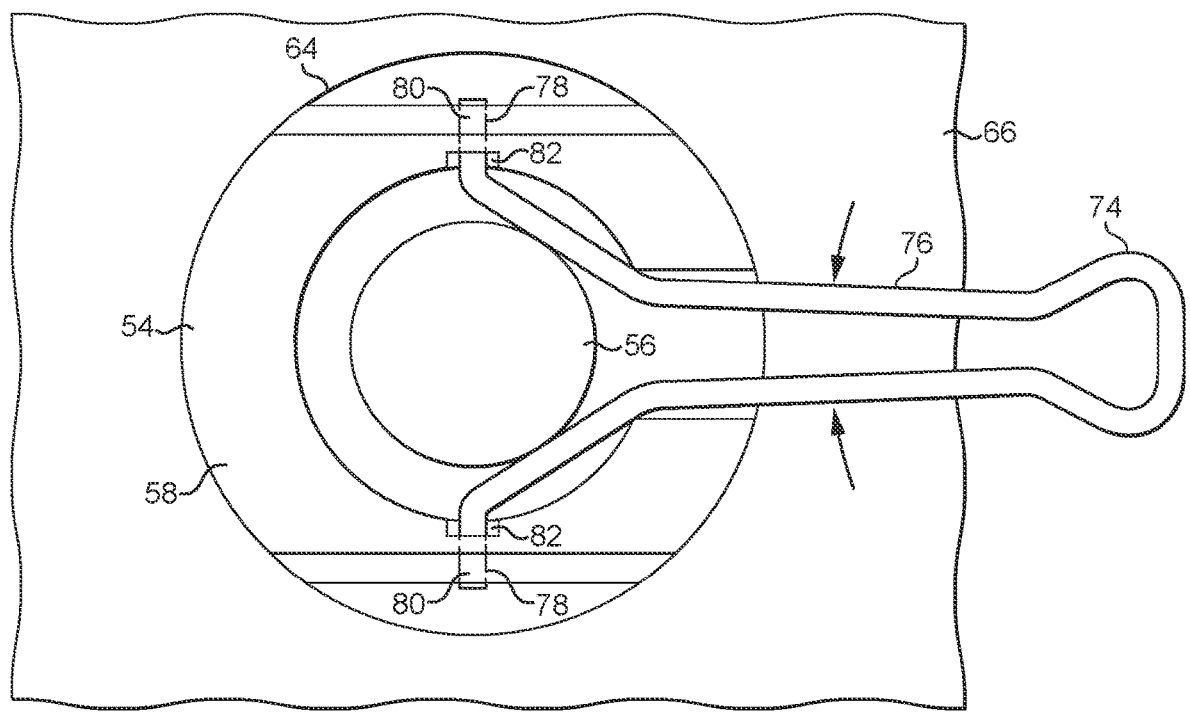
Figure 28B:
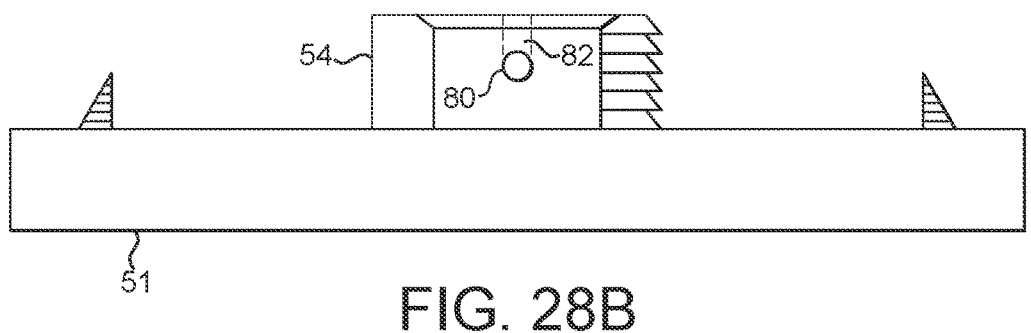
Figure 28C:
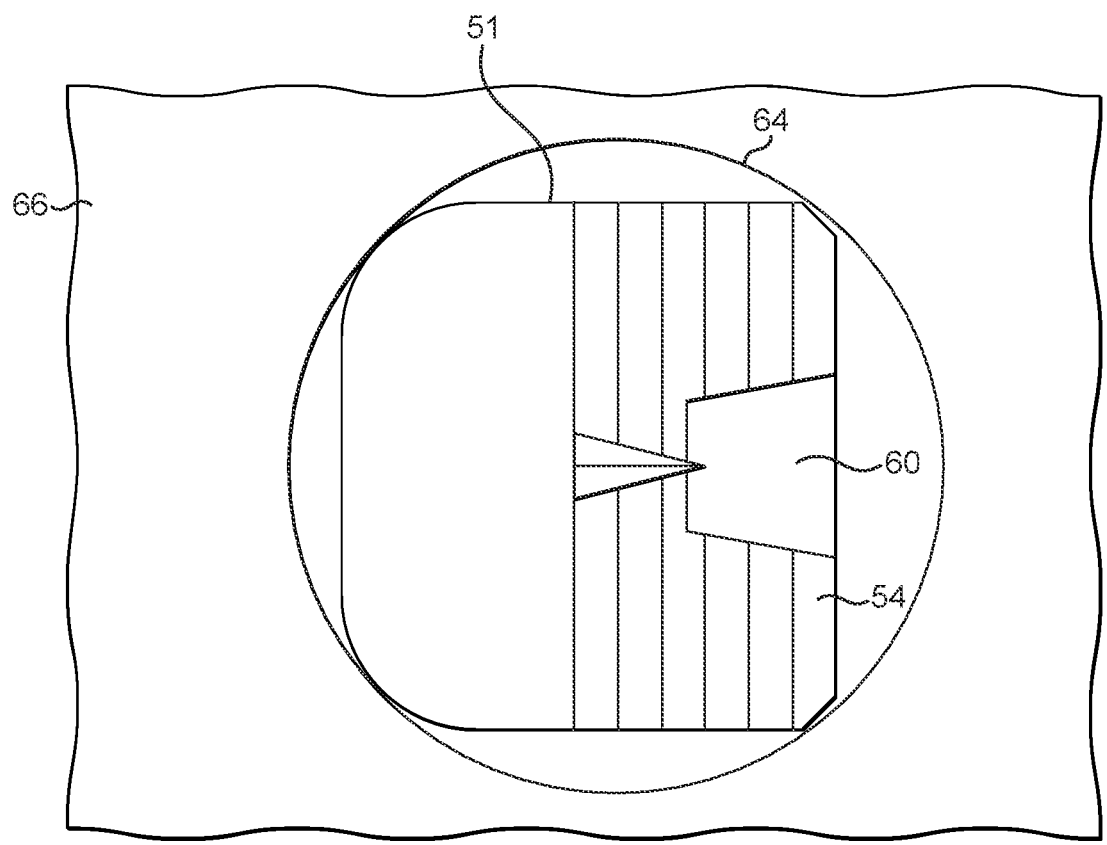
Figure 29:
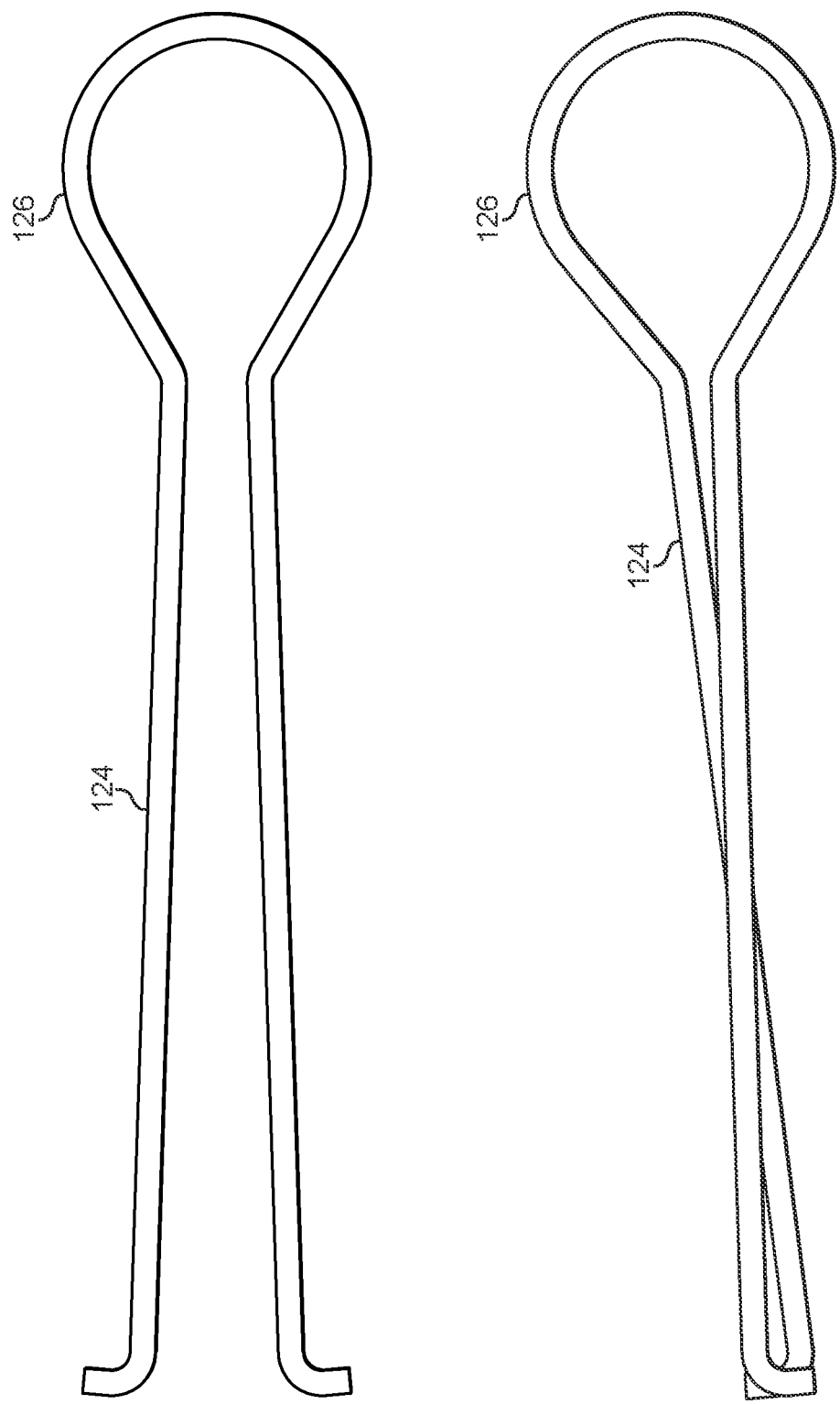
Figure 30A:
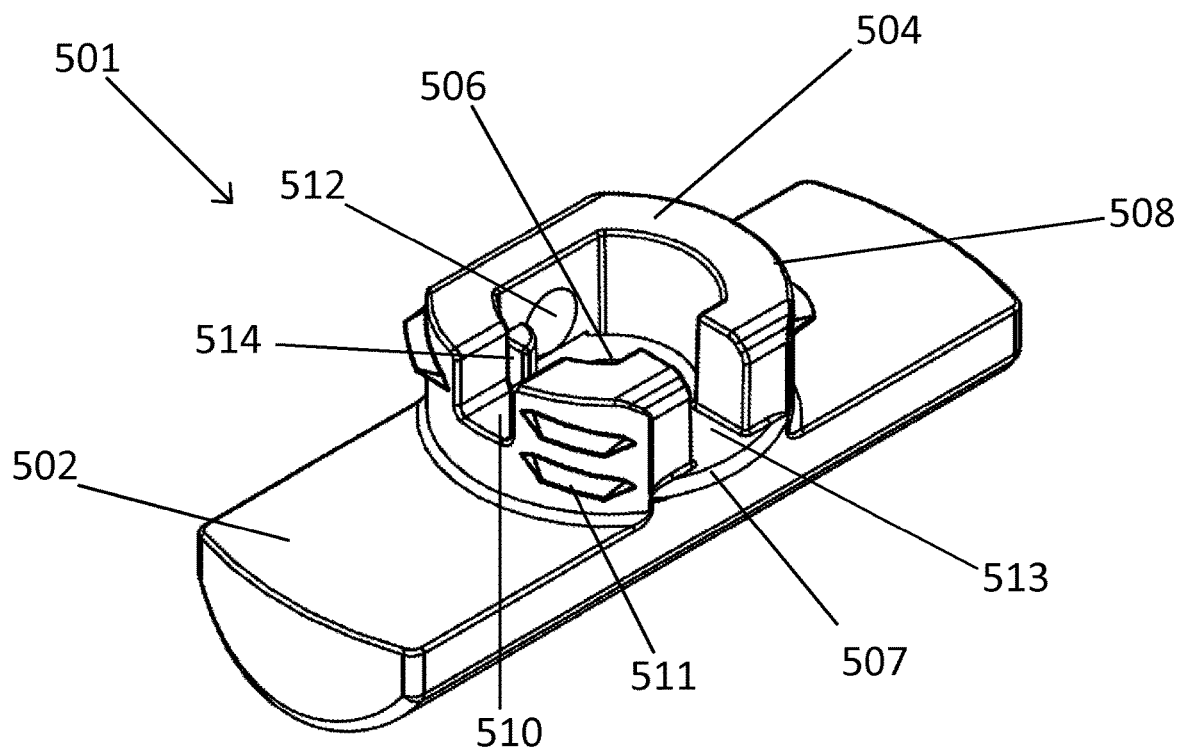
Figure 30B:
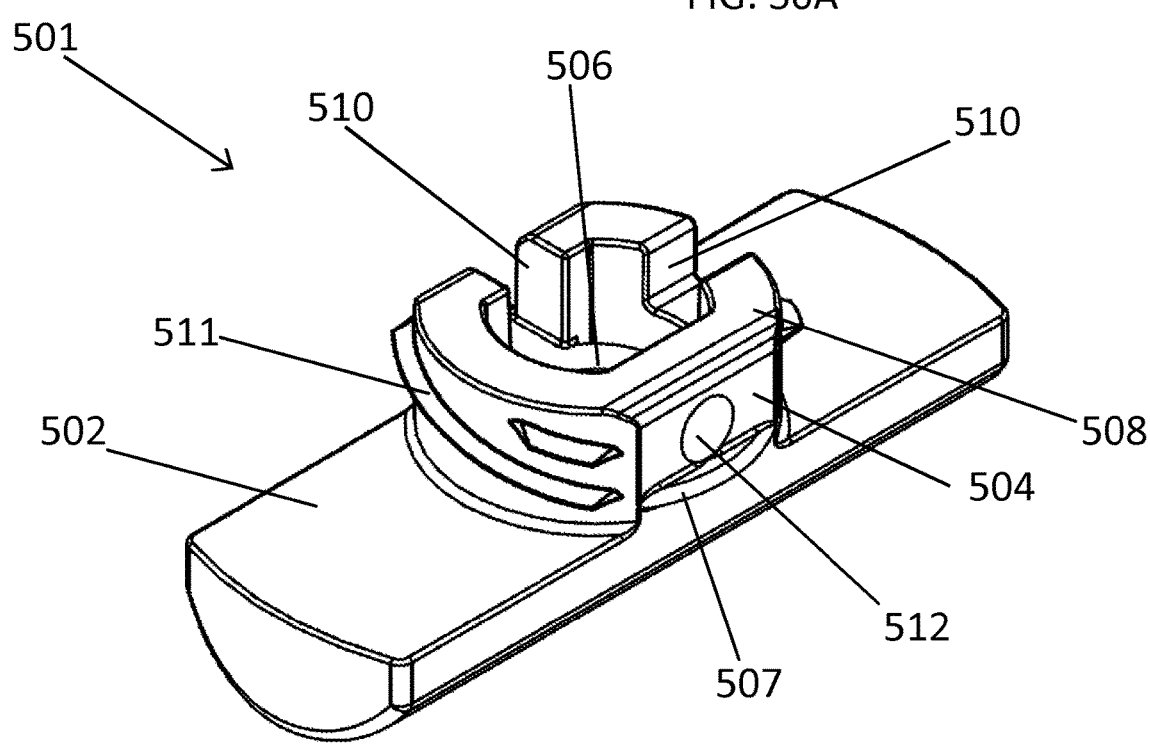
Figure 31A:
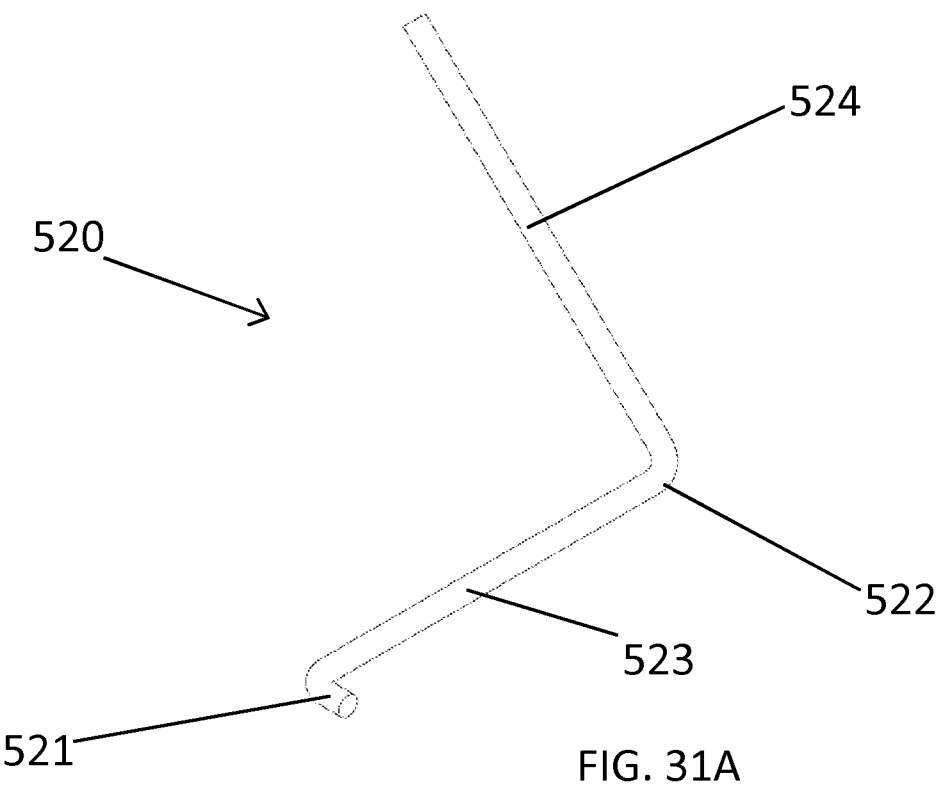
Figure 31B:
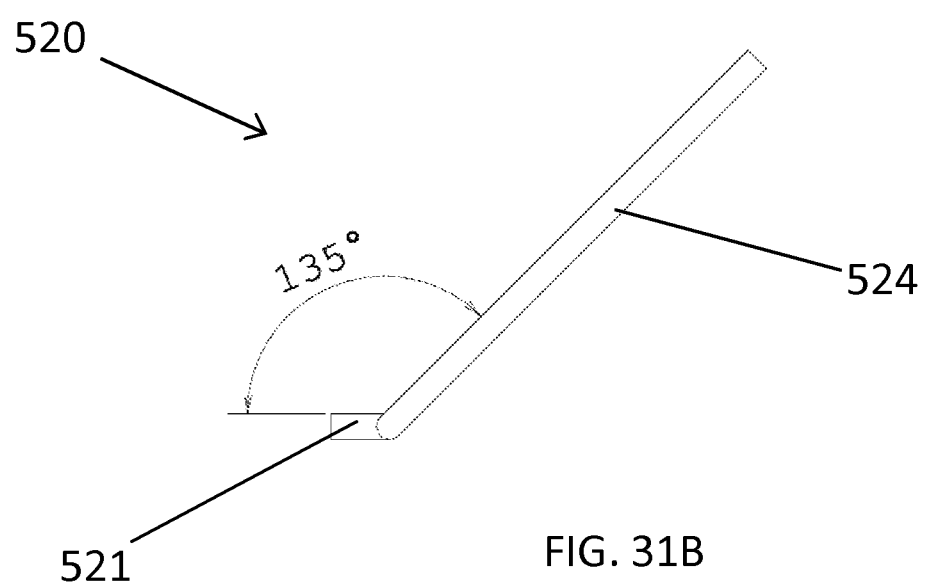
Figure 32A:
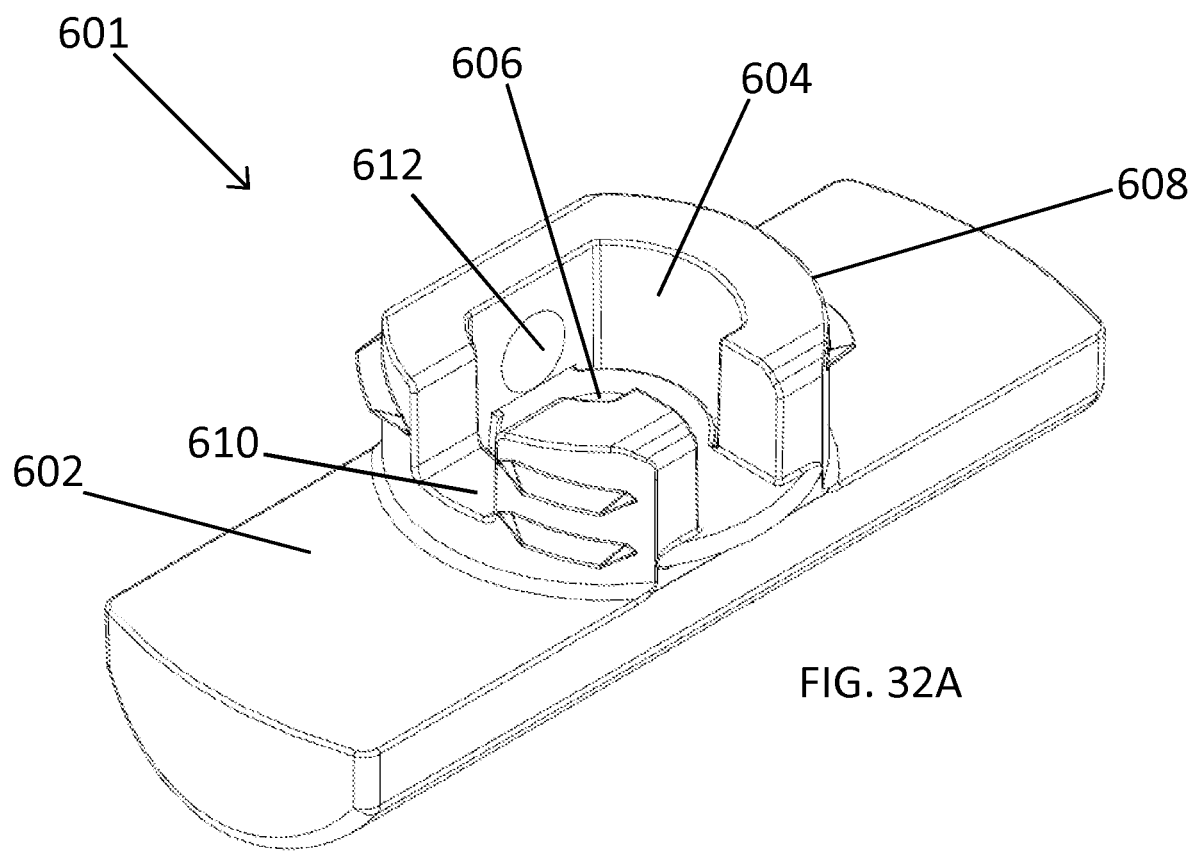
Figure 32B:
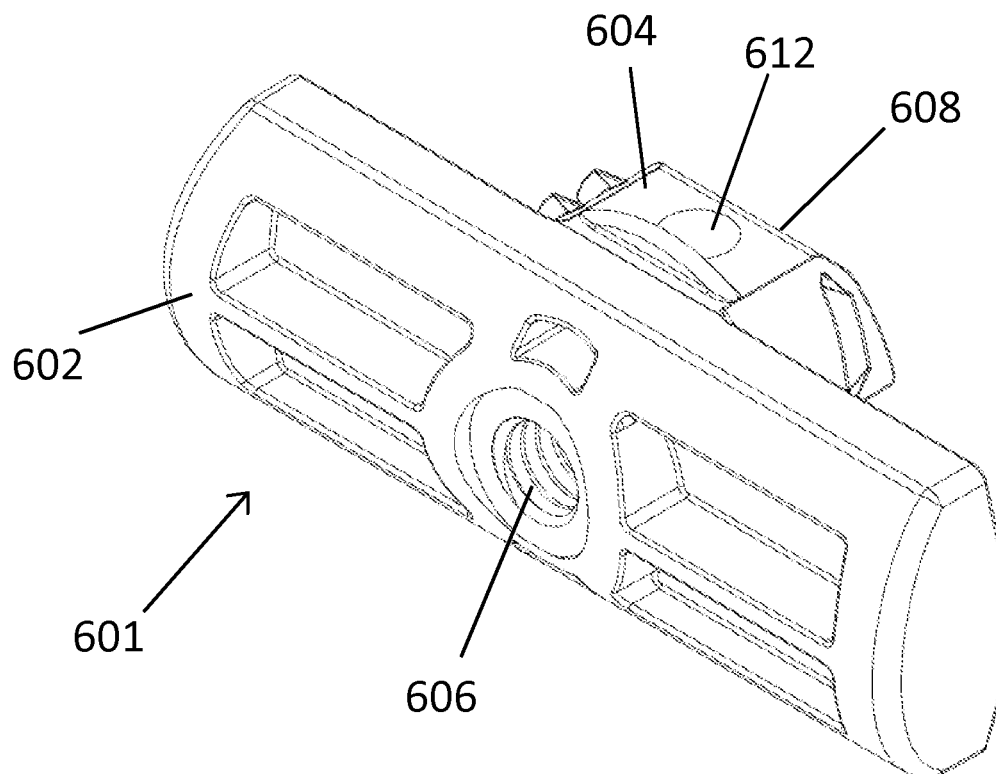
Figure 33A:
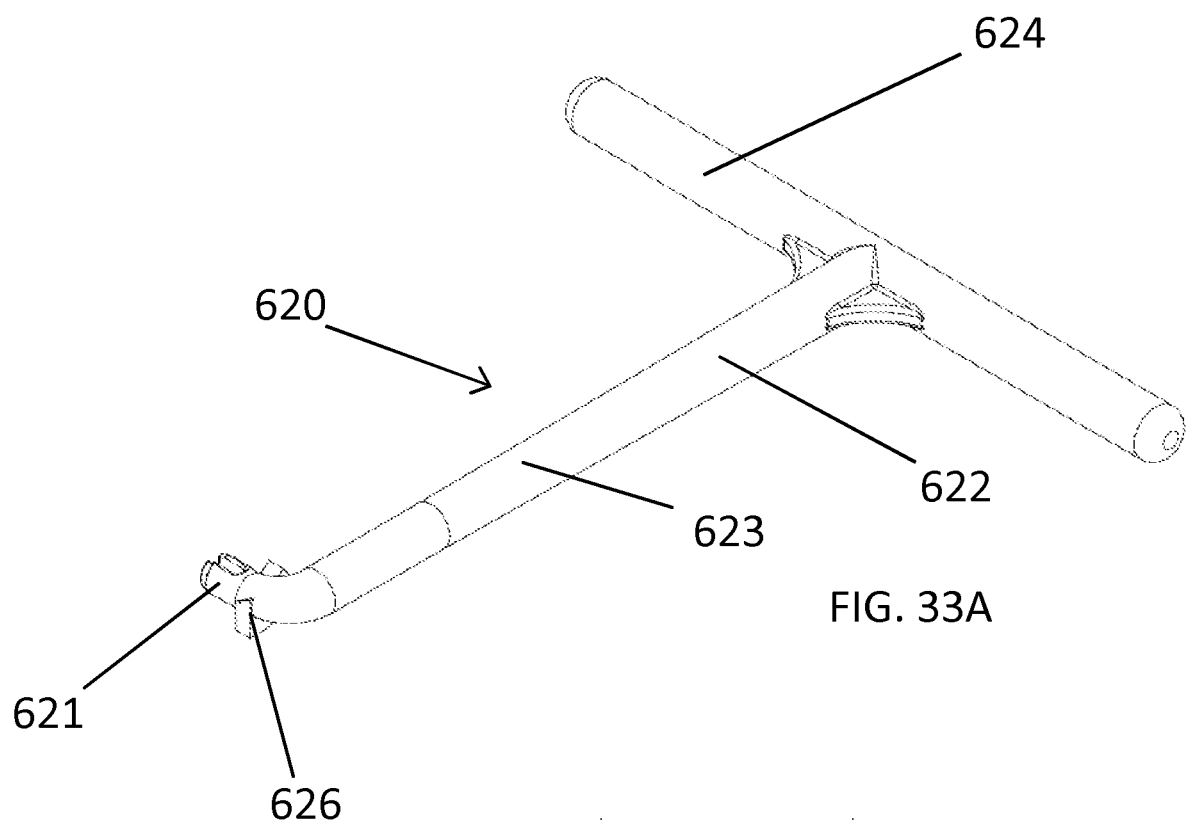
Figure 33B:
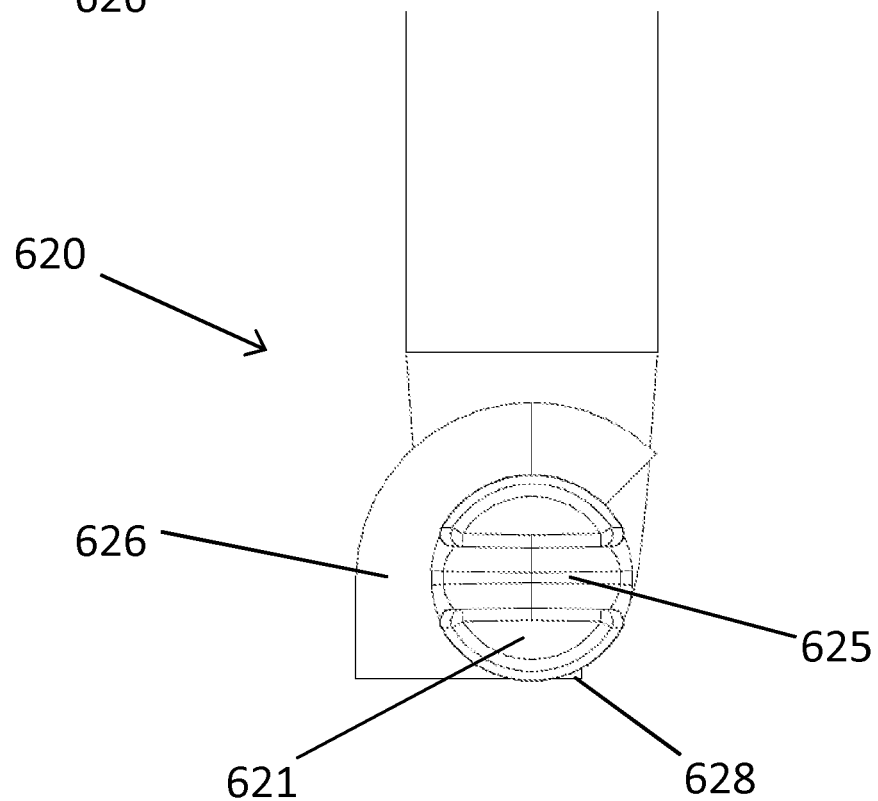

FIGS. 27*a*-27*d* show the fixing device of FIGS. 17-20 and 25 being installed in a hole in a suspended plasterboard wall using a tool;

FIGS. 28*a*, 28*b* and 28*c* show a variation of the embodiment shown in FIGS. 1-8;

FIG. 29 shows a tool for use with the fixing device as shown in FIGS. 9-14;

FIGS. 30*a* and 30*b* show perspective views of a fixing device according to another embodiment of the invention;

FIGS. 31*a* and 31*b* show a tool for use with the fixing device as shown in FIGS. 30*a* and 30*b*;

FIGS. 32*a* and 32*b* show perspective views of a fixing device according to another embodiment of the invention; and FIGS. 33*a* and 33*b* show a tool for use with the fixing device as shown in FIGS. 32*a* and 32*b*.

Suspended plasterboard (or "stud partition") walls constructed from plasterboard attached to a timber frame require different fixing devices to attach items to them compared to solid walls. This is because the fixing is attached solely to the plasterboard (unless the very restricted positions of the timber frame are used to screw into) and thus cannot rely on, e.g., bricks behind the plasterboard to secure the fixing owing to the void behind the plasterboard. Conventional wall plugs are therefore inadequate in plasterboard as they work loose when pressure is applied to them.

Embodiments of the present invention will now be described that provide fixing devices suitable for attaching items to a suspended plasterboard wall or ceiling.

Figure 1:
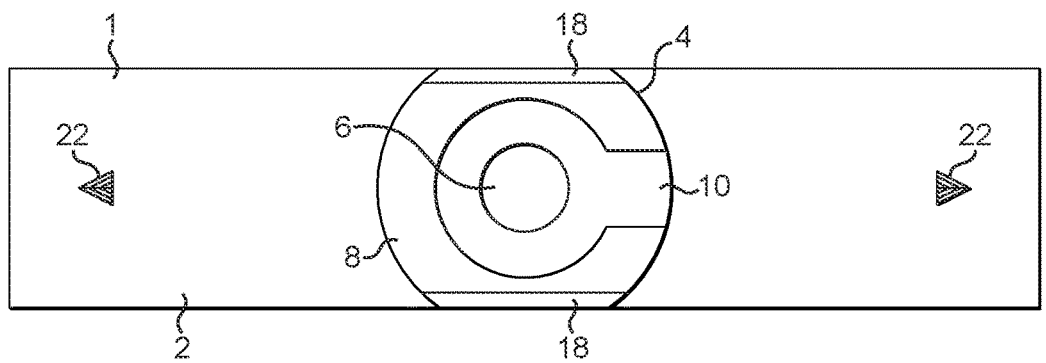
FIGS. 1-3 show different side views of a fixing device according to an embodiment of the present invention.
Figure 2:
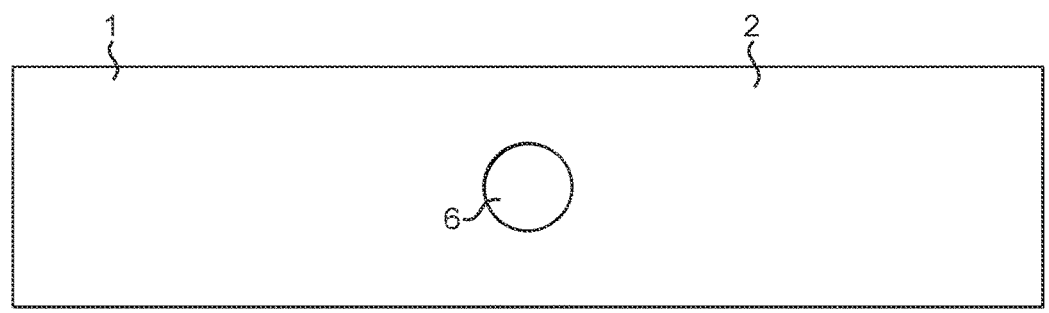
Figure 3:
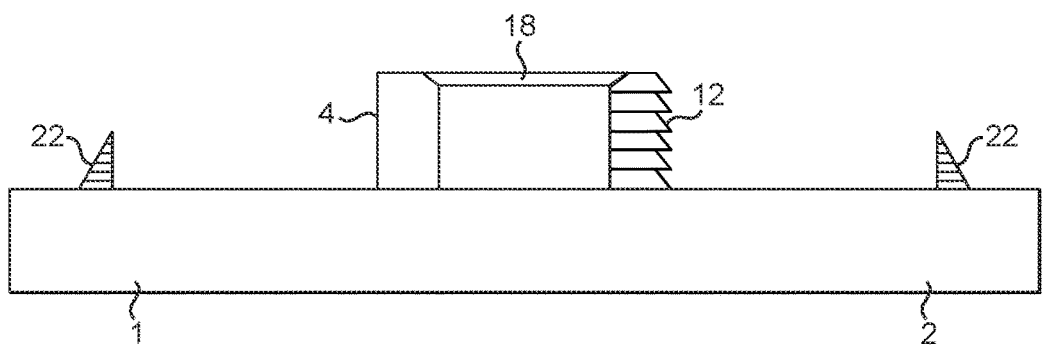
Figure 4:
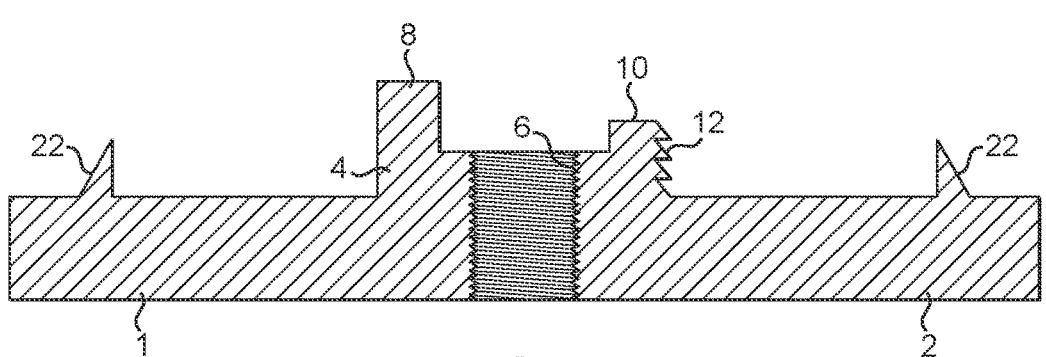
FIG. 4 shows a cross sectional view of the fixing device shown in FIGS. 1-3.

FIGS. 1-3 show different views of a fixing device 1 according to an embodiment of the present invention: FIGS. 1 and 2 show the front and back of the fixing device 1 respectively and FIG. 3 shows a side view of the fixing device 1. The fixing device 1 has a longitudinal backplate 2 that is substantially cuboid and a plug portion 4 that projects from the longitudinal backplate 2. FIG. 4 shows a cross sectional view along the length of the fixing device shown in FIGS. 1-3.

The fixing device 1, which is integrally moulded from nylon, has a threaded aperture 6 that extends in a first direction through the longitudinal backplate 2 and the centre of the plug portion 4. This can be seen from the cross sectional view in FIG. 4 which shows the cross section in a plane through and parallel to the aperture 6 along the length of the longitudinal backplate 2. The plug portion 4 is substantially cylindrical having a cross section (in a plane perpendicular to the first direction) that is circular (centred on the aperture 6) but with two flat opposite sides that are collinear with the edges of the longitudinal backplate 2.

The plug portion 4 has a rim 8 around the entrance to the aperture 6, which creates an opening to the aperture 6 that is shaped to accommodate the tool that is used to install the fixing device 1 in a suspended plasterboard wall or ceiling, as will be explained below. The rim 8 has a radially extending notch 10 therethrough which again is shaped to accommodate the tool. The rounded side of the plug portion 4 through which the notch 10 extends has corrugations 12 that extend circumferentially round the outside of the plug portion 4. The corrugations are angled towards the longitudinal backplate 2.

The plug portion 4 has a maximum diameter of 20 mm and projects by a maximum of 8 mm from the front face of the longitudinal backplate 2. The aperture has a diameter of 6 mm, which is suitable for receiving an M6 threaded bolt.

Figure 5:
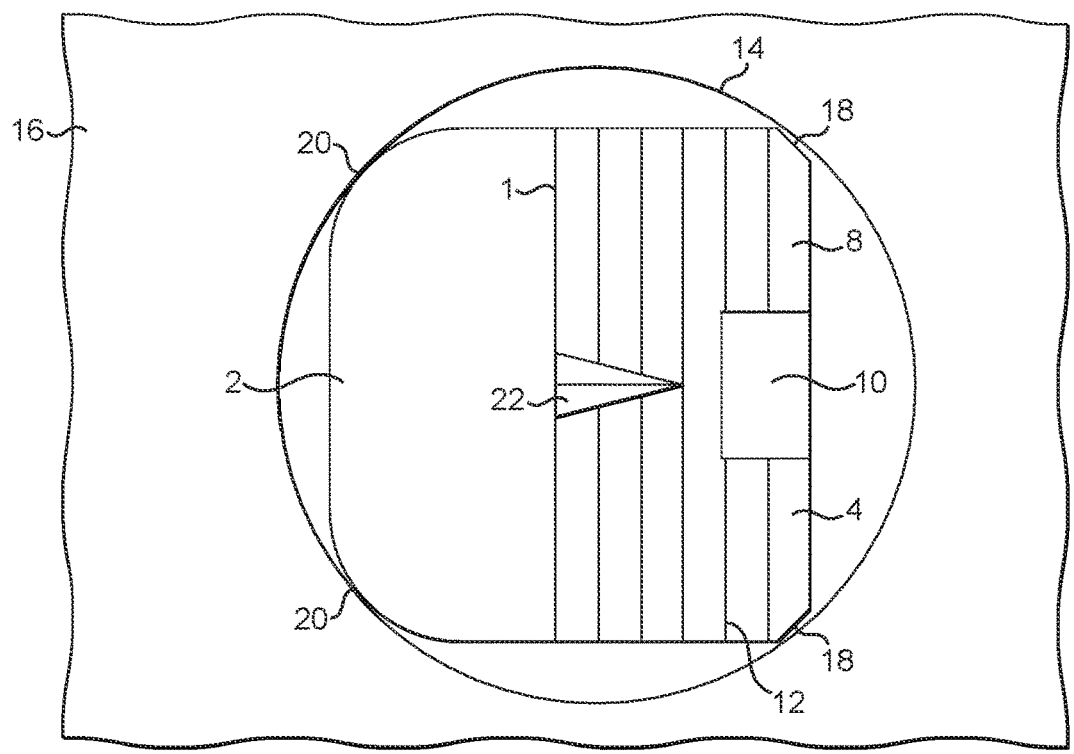
FIG. 5 shows an end view of the fixing device shown in FIGS. 1-4 being pushed through a hole.

FIG. 5 shows an end view of the fixing device shown in FIGS. 1-4 being pushed through a hole 14 in a suspended plasterboard wall or ceiling 16. As can be seen from this view, and from those in FIGS. 1 and 3, the top of the straight edges of the plug portion has a chamfer 18.

The longitudinal backplate 2 has a length of 70 mm (that extends in a second direction, perpendicular to the first direction), a width of 16 mm (that extends perpendicularly to the first direction and to the second direction) that is less than the length and a depth of 7 mm (that extends parallel to the first direction and perpendicularly to the second direction) that is less than the length and the width. The fixing device of this embodiment is thus suitable for use with suspended plasterboard walls and ceilings that have a void of 100 mm (or greater) behind the rear face of the suspended plasterboard wall or ceiling. As can be seen from FIG. 5, the rear side of the longitudinal backplate 2 (opposite the front side to which the plug portion 4 attaches) has rounded corners 20 along its length.

Two barbs 22 are positioned towards each end of the front face of the longitudinal backplate 2. The barbs 22 project outwards from the front face and are shaped with a right angle to the front face of the longitudinal backplate 2 on their inside (closest to the plug portion 4) and at an obtuse angle from the front face of the longitudinal backplate 2 on their outside (furthest from the plug portion 4). The barbs 22 have grooves that run around their perimeter.

Figure 6:
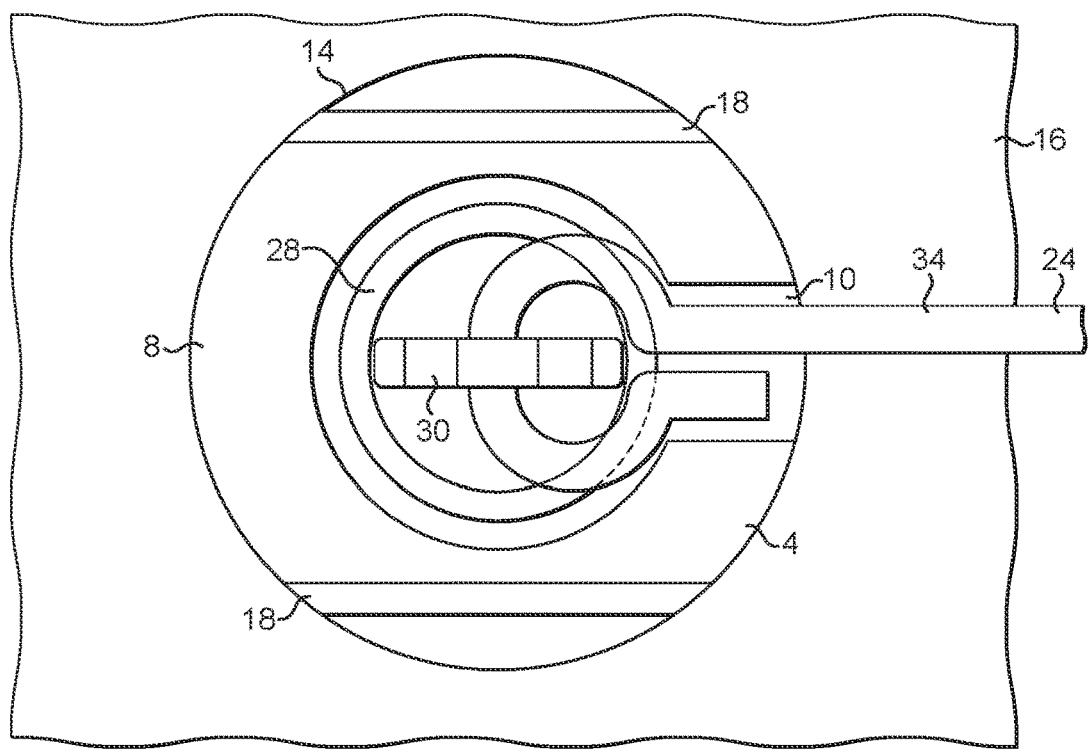
FIG. 6 shows the fixing device shown in FIGS. 1-5 when the fixing device is installed in a hole using a tool.

FIG. 6 shows the fixing device 1 shown in FIGS. 1-5 when the fixing device 1 is installed in a hole 14 in a suspended plasterboard wall or ceiling 16 using a tool 24. It can be seen from FIGS. 5 and 6 that the components of the fixing device 1 are shaped and sized such that the minimum bounding circle around the perimeter of the plug portion 4 is the size of the smallest circular hole 14 (i.e. having a diameter of 20 mm) into which the plug portion 4 may be secured and through which the fixing device (with the tool 24 attached) may be pushed along the length of its longitudinal backplate 2 (i.e. parallel to the second direction.

FIGS. 15*a* and 15*b* show side views of part of a tool 24 used to install the fixing device 1 as shown in FIGS. 1-6. The side views of FIGS. 15*a* and 15*b* are perpendicular to each other. As can be seen from FIGS. 15*a* and 15*b* (as well as from FIG. 6), the tool 24 has a screw thread 26, a flange 28 and tab 30 having a hole 32 therethrough to which is attached a wire handle 34. The flange 28 limits the distance into the threaded aperture 6 that the screw thread 26 can be screwed, such that tab 30 aligns with the notch 10 through the rim 8 of the plug portion 4 and so that the end of the screw thread 26 lies flush with the rear face of the longitudinal backplate 2.

The wire handle 34 is able to rotate in the hole 32 of the tab 30 so that when the screw thread 26 is screwed into the threaded aperture 6 the wire handle 34 is accommodated in the notch 10 (as shown in FIG. 6).

Figure 7:
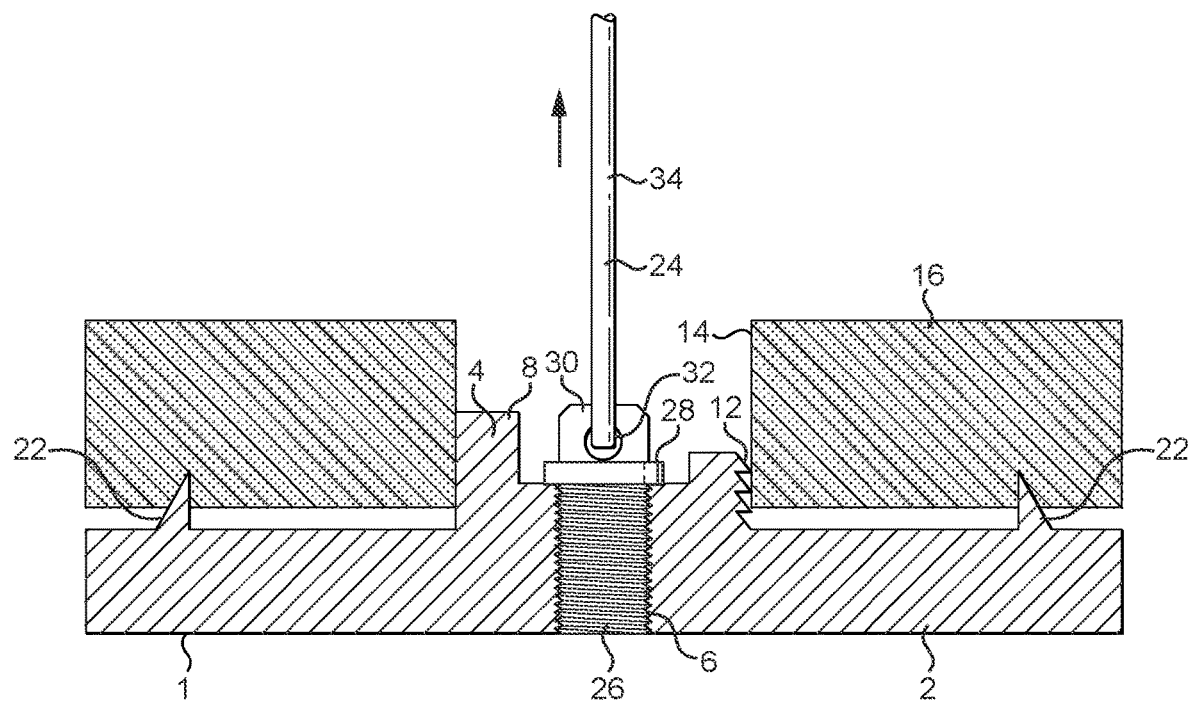
FIG. 7 shows a cross sectional view of the fixing device shown in FIGS. 1-6 while the fixing device is being installed in a hole using a tool.
Figure 8:
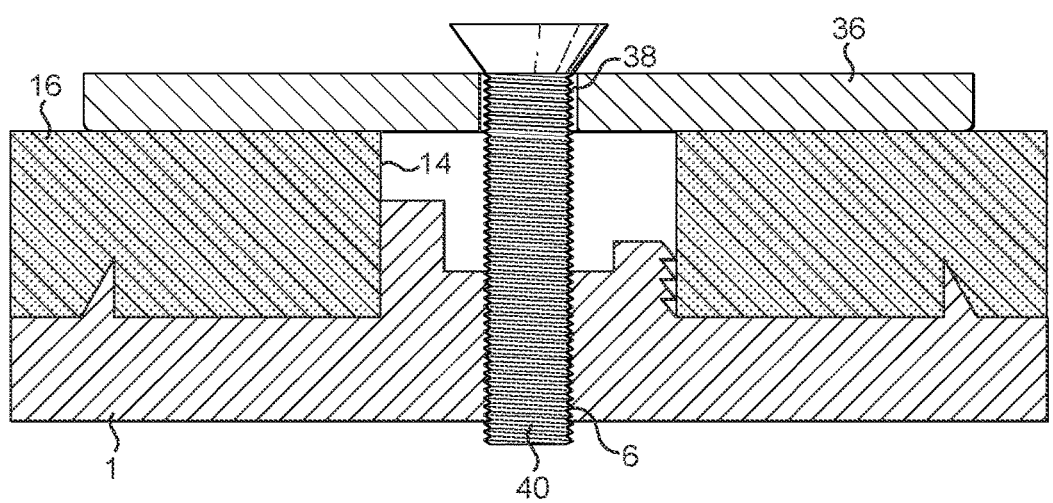
FIG. 8 shows a cross sectional view of the fixing device shown in FIGS. 1-7 once the fixing device has been installed in the hole.
Figure 9:
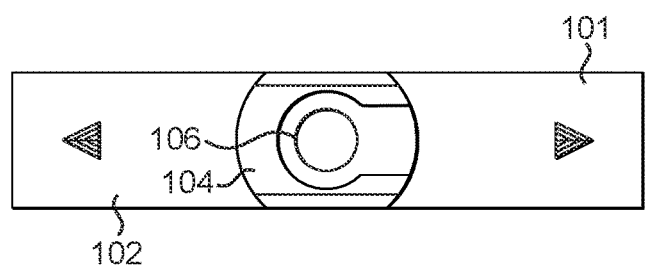
Figure 10:
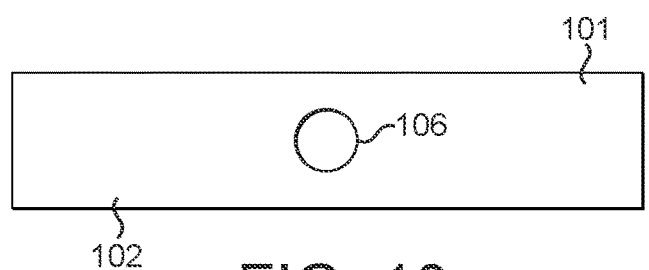
Figure 11:
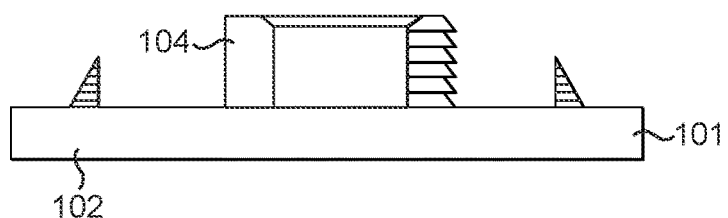
Figure 12:
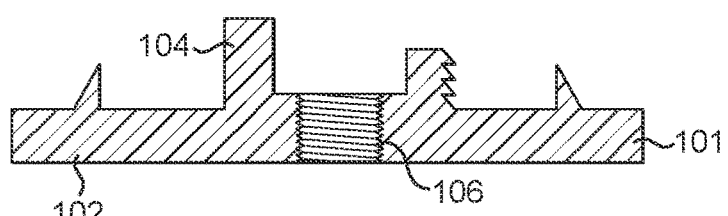

FIG. 7 shows a cross sectional view of the fixing device 1 shown in FIGS. 1-6 while the fixing device 1 is being installed in a hole 14 in a suspended plasterboard wall or ceiling 16 using the tool 24. FIG. 8 shows a cross sectional view of the fixing device 1 shown in FIGS. 1-7 once the fixing device 1 has been installed in the hole 14. FIGS. 16*a*-16*d* show the fixing device 1 of FIGS. 1-8 being installed in a hole 14 in a suspended plasterboard wall or ceiling 16 using the tool 24.

Installation of the fixing device 1 in a hole 14 in a suspended plasterboard wall or ceiling 16 using the tool 24 will now be described with reference to FIGS. 1-8 and 16*a*-16*d*.

First a hole 14 having a diameter of 20 mm is drilled all the way through a suspended plasterboard wall or ceiling 16 to which an item (e.g. a fixture or fitting) is to be attached. The screw thread 26 of the tool 24 is screwed into the threaded aperture 6 of the plug portion 4 of the fixing device 1 until the flange 28 of the tool 24 contacts the top of the threaded aperture 6. At this point the end of the screw thread 26 is flush with the rear face of the longitudinal backplate 2, and the tab 30 and handle 34 of the tool 24 are aligned with the notch 10 through the rim 8 of the plug portion 4 such that the handle 34 can be rotated and located in the notch 10.

Figure 16B:
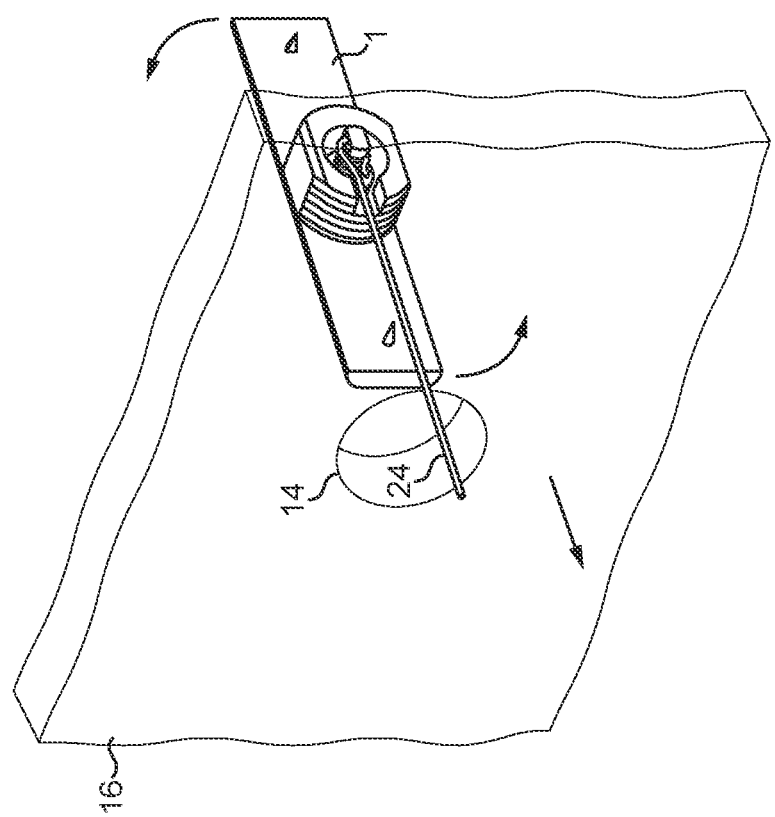
FIGS. 16a-16d show the fixing device of FIG. 1-8 or 9-14 being installed in a hole in a suspended plasterboard wall using a tool.
Figure 16A:
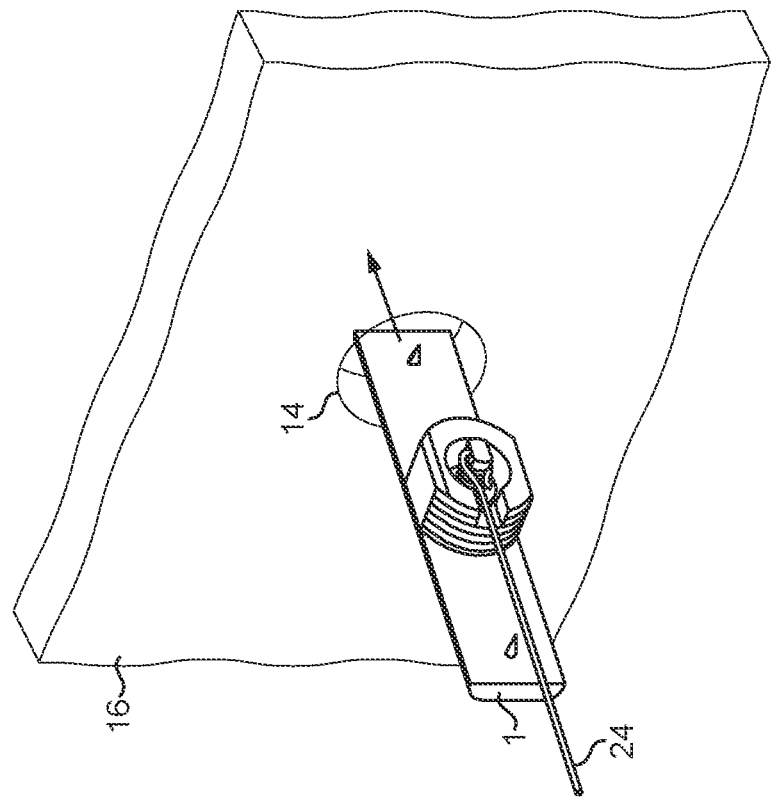
Figure 16D:
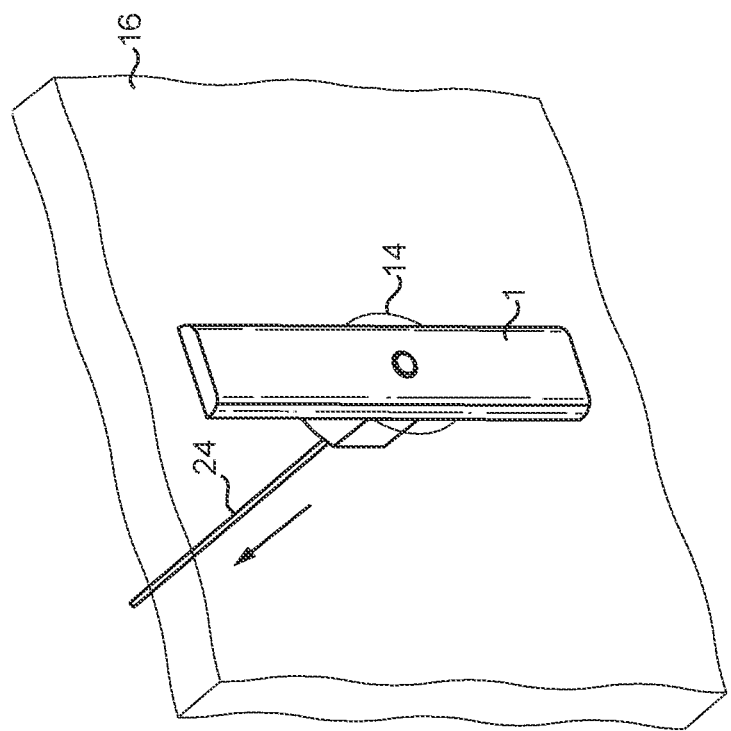
Figure 16C:
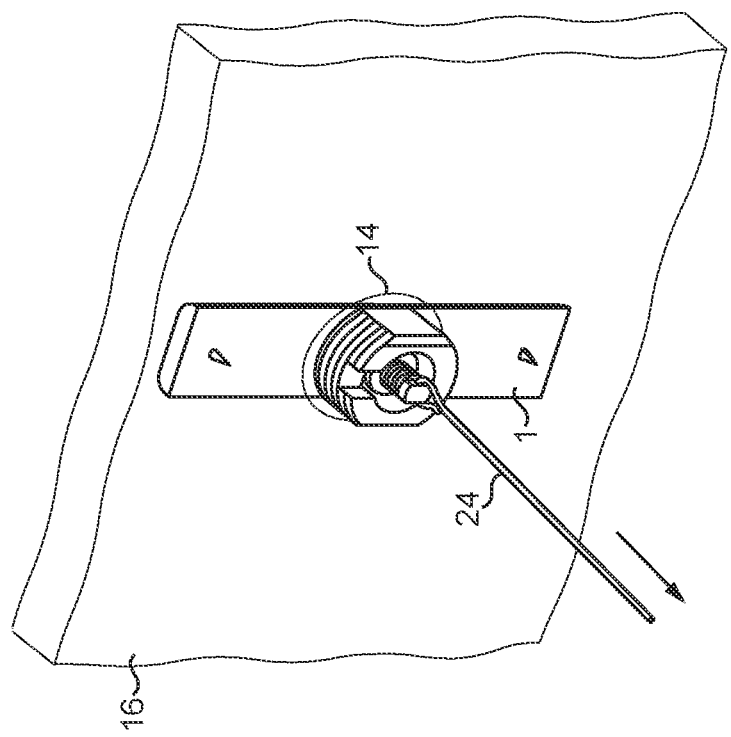

The fixing device 1 is oriented with respect to the hole 14 such that the second direction is perpendicular to the suspended plasterboard wall or ceiling 16 (as shown in FIG. 16*a*). The fixing device 1 is then inserted into and pushed fully through the hole 14 (as shown in FIG. 5, which omits the tool 24 for the purposes of clarity) so that the fixing device 1 is pushed into the void behind the rear face of the suspended plasterboard wall or ceiling 16 (as shown in FIG. 16*b*). At all times, the handle 34 of the tool 24 is retained so that fixing device 1 is not lost into the void behind the suspended plasterboard wall or ceiling 16.

The handle 34 of the tool 24 is then used to rotate the fixing device 1 such that the front face of the longitudinal backplate 2 lies in a plane parallel to the plane of the rear face of the suspended plasterboard wall or ceiling 16. When the hole 14 is in a suspended plasterboard wall 16 (as opposed to a ceiling), the tool 24 is used to rotate the fixing device 1 so that the second direction lies vertically, with the corrugations 12 lying on the upper side of the plug portion 4.

With the fixing device 1 in this position, the tool 24 is used to pull the plug portion 4 back into the hole 14 (as shown in FIGS. 6, 7, 16*c* and 16*d*) so that the barbs 22 embed in the rear face of the suspended plasterboard wall or ceiling 16 and the front face of the longitudinal backplate 2 lies against the rear face of the suspended plasterboard wall or ceiling 16 (in the position shown in FIG. 8). In this position the plug portion 4 is secured in the hole 14.

The tool 24 is then removed by unscrewing the screw thread 26 from the threaded aperture 26. An item 36 can then be attached to the fixing device 1 (and thus to the suspended plasterboard wall or ceiling 16) by screwing an M6 bolt 40 through a hole 38 in the item 36 and into the threaded aperture 6.

In the case that the item 36 is desired to be removed from the suspended plasterboard wall or ceiling 16 and the fixing device 1 reused, the installation method described above may simply be reversed.

FIGS. 28*a*, 28*b* and 28*c* show a variation of the embodiment of the fixing device shown in FIGS. 1-8. FIG. 28*a* (corresponding to FIG. 6) shows a fixing device 51 when the fixing device 51 is installed in a hole 64 in a suspended plasterboard wall or ceiling 66 using a tool 74. FIG. 28*b* (corresponding to FIG. 3) shows a side view of a fixing device 51 in accordance with this variation of the embodiment shown in FIG. 3. FIG. 28*c* (corresponding to FIG. 5) shows an end view of a fixing device 51 in accordance with this variation of the embodiment shown in FIG. 5.

The fixing device 51 shown in FIGS. 28*a*, 28*b* and 28*c* is the same as the fixing device shown in FIGS. 1-8, except that the tool 74 is a different design and attaches to the fixing device 51 in a different way (and thus the plug portion 54 has some slightly different features). In this embodiment the tool 74 comprises a 2 mm sprung wire clip having a handle 76 at one end and projecting ends 78 at the other that project perpendicularly from the handle 76 of the tool 74. These projecting ends 78 of the tool 74 are arranged to engage in the plug portion 54 of the fixing device 51 to allow the tool 74 to be used to insert and secure the fixing device in a hole 64 in a suspended plasterboard wall or ceiling 66.

Thus the fixing device 51 is the very similar to the fixing device shown in FIGS. 1-8, except that it additionally includes two recesses 80 (having a diameter of 2 mm) that extend through the rim 58 of the plug portion 54 on diametrically opposite sides of the aperture 56 in the plug portion 58. The plug portion 54 also includes two channels 82 (having a depth of 0.5 mm) that extend on the inside of the rim 58 from the top face of the plug portion 54 to the two recesses 80 respectively. The other difference is that the notch 60 in the plug portion 54 (as shown in FIG. 28*c*) to accommodate the handle 76 of the tool 74 has a truncated V-shape (a trapezoid).

Installation of the fixing device 51 of FIGS. 28*a* and 28*b* is the same as described for the embodiment shown in FIGS. 1-8, except for the manner in which the tool 74 attaches to the fixing device 51. As shown in FIG. 28*a*, the handle 76 of the tool 74 is squeezed to bring the projecting ends 78 of the tool 74 closer so that they can be inserted into the channels 82 of the plug portion 54 and guided into the recesses 80, into which the projecting ends 78 will be biased owing to the spring of the sprung wire tool 74.

Once the tool 74 has been attached to the plug portion 54 of the fixing device 51, the plug portion is inserted through and secured into the hole 64 in the suspended plasterboard wall or ceiling 66 in the same manner as described for the embodiment shown in FIGS. 1-8.

The notch 60 in the plug portion 54 acts to bias the two wires of the handle 76 of the tool 74 together (as can be seen in FIG. 28*a*). This biasing helps to keep the projecting ends 78 of the tool 74 flush with the outer sides of the plug portion 54 and also helps to store some energy in the sprung tool 74. This aids the rotation of the fixing device 51 relative to the tool 74 once the fixing device 51 has been inserted through the hole 64 in the suspended plasterboard wall or ceiling 66, because the trapezoid-shape of the notch 60 in which the handle 76 of the tool 74 helps to exploit the stored energy and act as an auto-release mechanism such that the fixing device 51 "pings" away from the handle 76 of the tool 74 as the handle 76 of the tool 74 is released from the trapezoid-shaped notch 60. This release of stored energy is sufficient to rotate the fixing device 51 relative to the handle 76 of the tool 74 such that the handle 76 of the tool 74 is located in the channels 82. The plug portion 54 of the fixing device 51 is then in the orientation ready to be pulled back through the hole 64 in the suspended plasterboard wall or ceiling 66.

FIGS. 9-14, showing the same views as FIGS. 1-6, show a fixing device 101 according to another embodiment of the present invention. The fixing device 101 shown in FIGS. 9-14 is very similar to the fixing device shown in FIGS. 1-8, except for some minor details and its dimensions.

The fixing device 101 shown in FIGS. 9-14 (which again is integrally moulded from nylon) has a longitudinal backplate 102 that is 42 mm long, 9 mm wide and 3 mm deep. The plug portion 104 has a maximum diameter of 12 mm and a maximum projecting height (from the front face of the longitudinal backplate 102) of 7 mm. The fixing device 101 shown in FIGS. 9-14 is therefore suitable for use with suspended plasterboard walls and ceilings that have a void of 75 mm (or greater) behind the rear face of the suspended plasterboard wall or ceiling, or when a smaller (12 mm) hole is desired to be used. The aperture 106 in the plug portion 104 has a diameter of 4 mm, which is suitable for receiving an M4 threaded bolt.

In addition to the smaller dimensions of the fixing device 101 in the embodiment shown in FIGS. 9-14, the rear side of the longitudinal backplate 102 (opposite the front side to which the plug portion 104 attaches) has chamfered corners 120 along its length (as seen in FIG. 13).

The installation of the fixing device 101 in the embodiment shown in FIGS. 9-14 is the same as the installation of the fixing device in the embodiment shown in FIGS. 1-8. The only difference is that the screw thread 26 of the tool 24 has a diameter of 4 mm to fit into the threaded aperture 106 of the smaller fixing device 101.

FIG. 29 shows a sprung wire tool 124 to be used with the fixing device shown in FIGS. 9-14, in the embodiment when the plug portion has recesses (e.g. as shown in FIGS. 28a-28c) to receive a sprung wire tool. The sprung wire tool 124 in FIG. 29 is shown in a configuration in which the wires of the handle 126 have been squeezed together to cross the ends of the tool 124 over so that they can fit into the smaller plug portion of the fixing device 101 shown in FIGS. 9-14.

Figure 17:
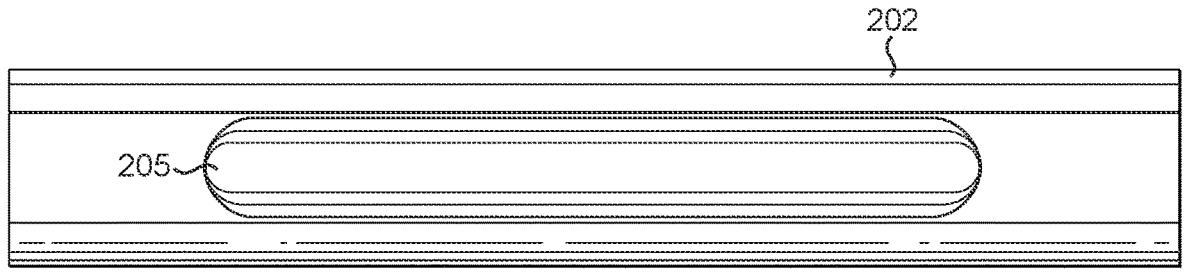
FIG. 17 shows part of a fixing device according to a further embodiment of the present invention.
Figure 18:
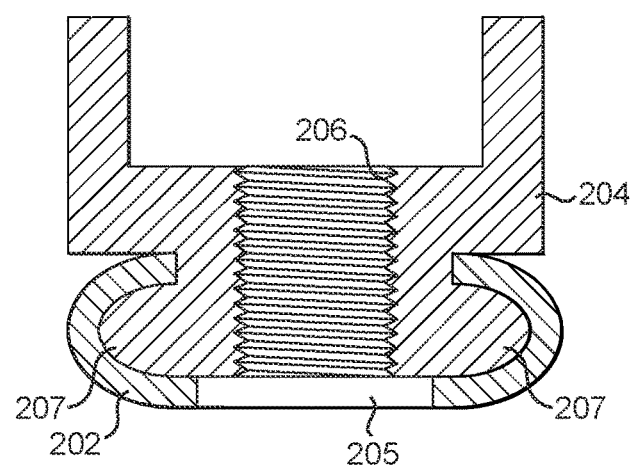
FIGS. 18 and 19 show cross sections of the fixing device shown in FIG. 17.
Figure 19:
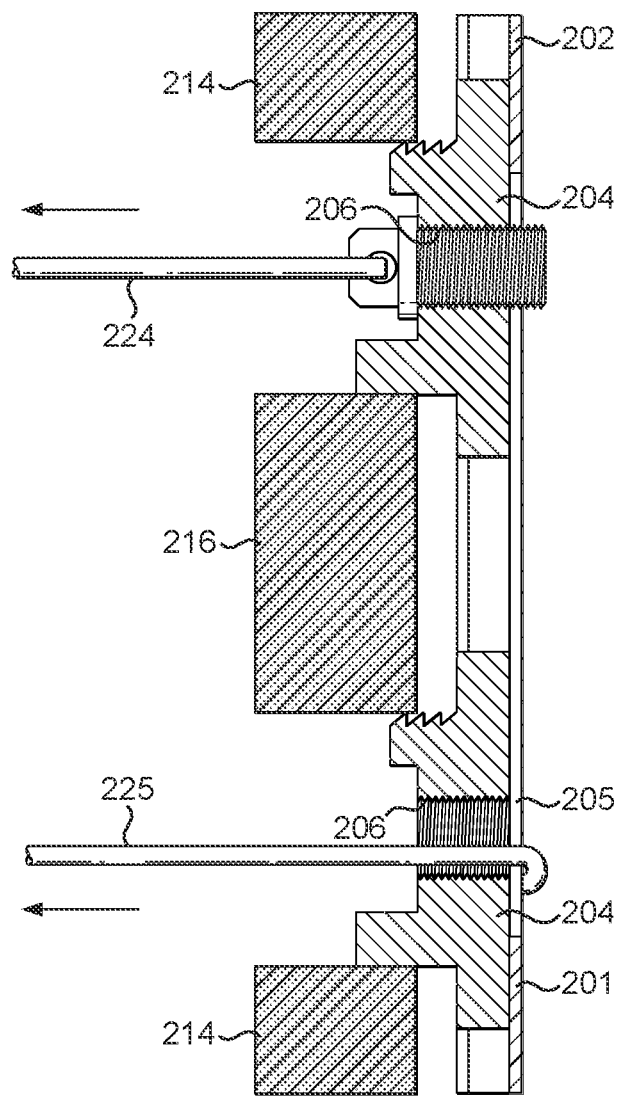
Figure 20:
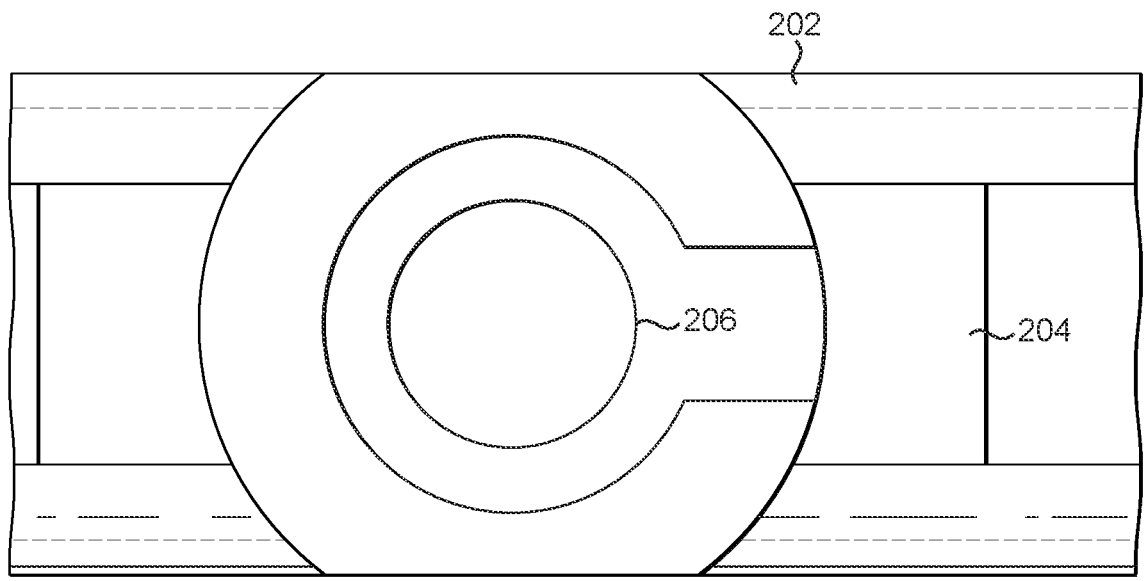
FIG. 20 shows a front view of part of the fixing device shown in FIGS. 17-19.
Figure 25:
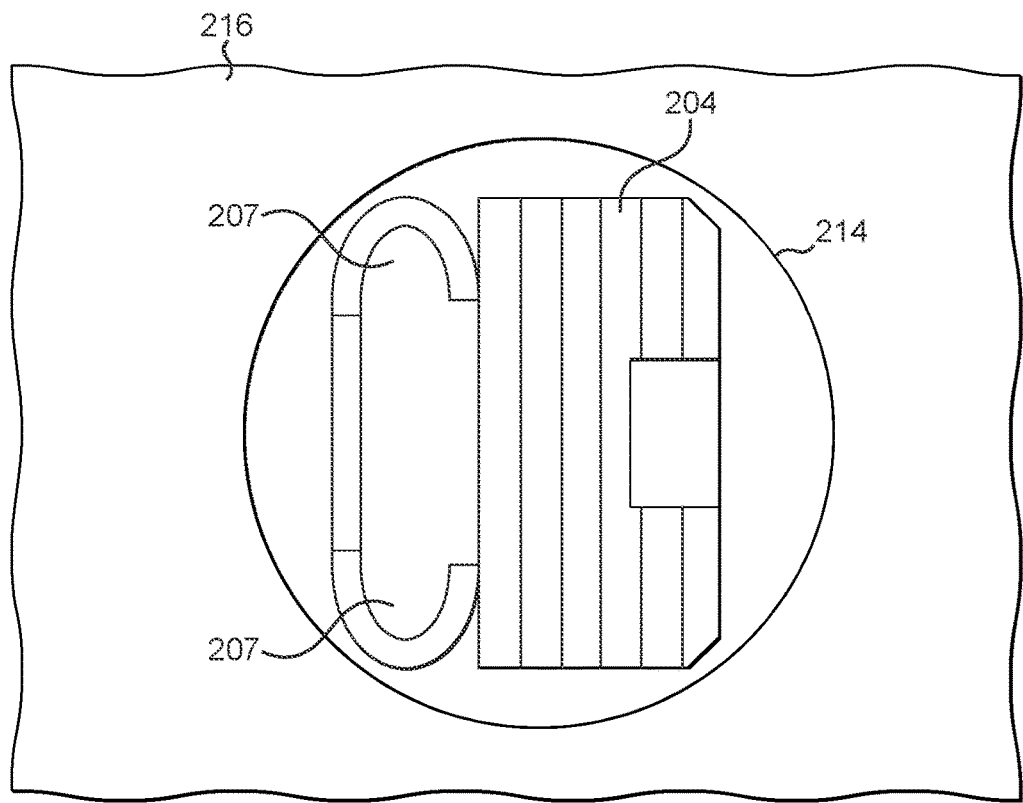
FIG. 25 shows an end view of the fixing device shown in FIGS. 17-20, 23 and 24 being pushed through a hole.

FIGS. 17-20 and 25 show a fixing device 201 according to a further embodiment of the invention. FIG. 17 shows the longitudinal backplate 202 of the fixing device 201; FIG. 18 shows a cross sectional view of the fixing device 201 through a plug portion 204 of the fixing device 201 in a plane perpendicular to the second direction (in which the longitudinal backplate 202 extends); FIG. 19 shows a cross sectional view of the fixing device 201 when it is being installed in holes 214 a suspended plasterboard wall or ceiling 216; FIG. 20 shows a front view of one of the plug portions 204 and the longitudinal backplate 202 of the fixing device 201; and FIG. 25 shows an end view of the fixing device 201.

The fixing device 201 of this embodiment includes a longitudinal backplate 202 that is made from metal and has a C-shaped cross section (as can be seen from FIGS. 18 and 25). The longitudinal backplate 202 has an elongated aperture 205 in its rear face (as can be seen from FIG. 17). The width of the aperture 205 is 8 mm and the dotted lines show apertures for different embodiments in which the aperture 205 is 6 mm or 4 mm.

As shown in FIG. 18, the plug portion 204 of the fixing device 201 is a separate component from the longitudinal backplate 202. The plug portion 204 is slidably attached to the longitudinal backplate 202 by means of lugs 207 that are received by the inside of the C-shaped longitudinal backplate 202. The threaded aperture 206 through the plug portion 204 aligns with the aperture 205 in the longitudinal backplate 202, so that a threaded bolt may pass through both the aperture 206 in the plug portion 204 and the elongated aperture 205 in the longitudinal backplate 202. The front part of the plug portion 204 (distal from the longitudinal backplate 202), that is configured to be secured in a hole in a suspended plasterboard wall or ceiling, has a similar design to the embodiments discussed above (as can be seen in FIG. 20).

In addition to having a metal, C-shaped longitudinal backplate 202, the fixing device 201 of this embodiment has two plug portions 204, as shown in FIG. 19. The plug portions 204 are spaced from each other along the longitudinal backplate 202.

As may also be seen from FIG. 19, the tool 224 used to install the fixing device 201 is the same as used for previous embodiments. In addition, a hook 225 is used to position and pull back the other plug portion 204 into its respective hole 214.

Installation of the fixing device shown in FIGS. 17-20 and 25 will now be shown with reference to FIGS. 17-20, 25 and 27a-27d.

Figure 27A:
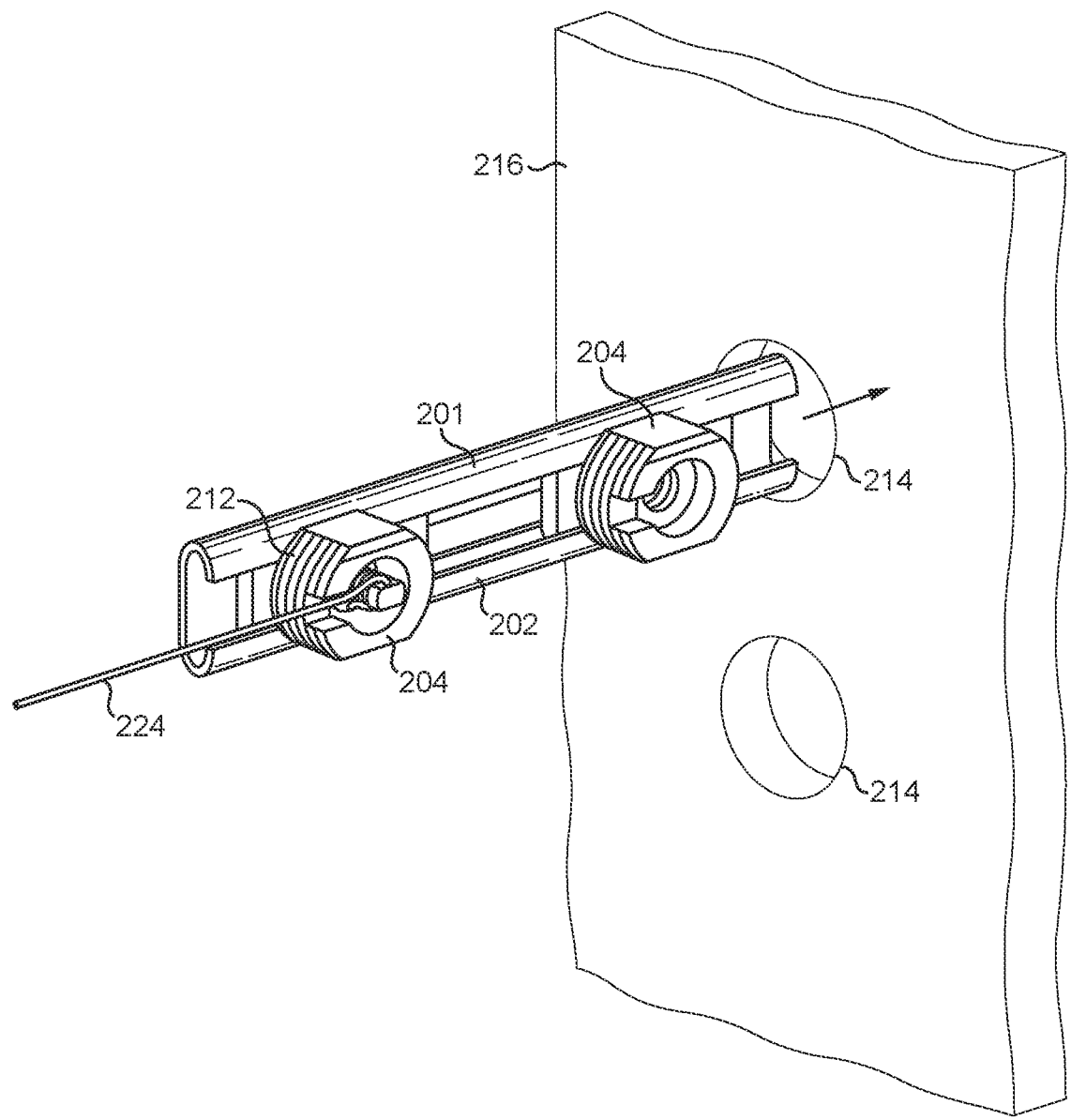

First, two 20 mm diameter holes 214 are drilled in a suspended plasterboard wall or ceiling, their spacing from each other being equal to the spacing of the two plug portions 204 on the longitudinal backplate 202 of the fixing device 201. The tool 224 is then attached to one of the plug portions 204 (e.g. the one that will be arranged uppermost when the fixing device 201 is installed (with the corrugations 212 on the upper side of the plug portion)) as described for previous embodiments. The tool 224 can then be used to insert the fixing device 201 into one of the holes 214 in the suspended plasterboard wall or ceiling 216 (e.g. the uppermost hole 214 as shown in FIG. 27a) and the fixing device 201 is then pushed through the hole 214 into the void behind the suspended plasterboard wall or ceiling 216, while retaining hold of the tool 224.

Figure 27B:
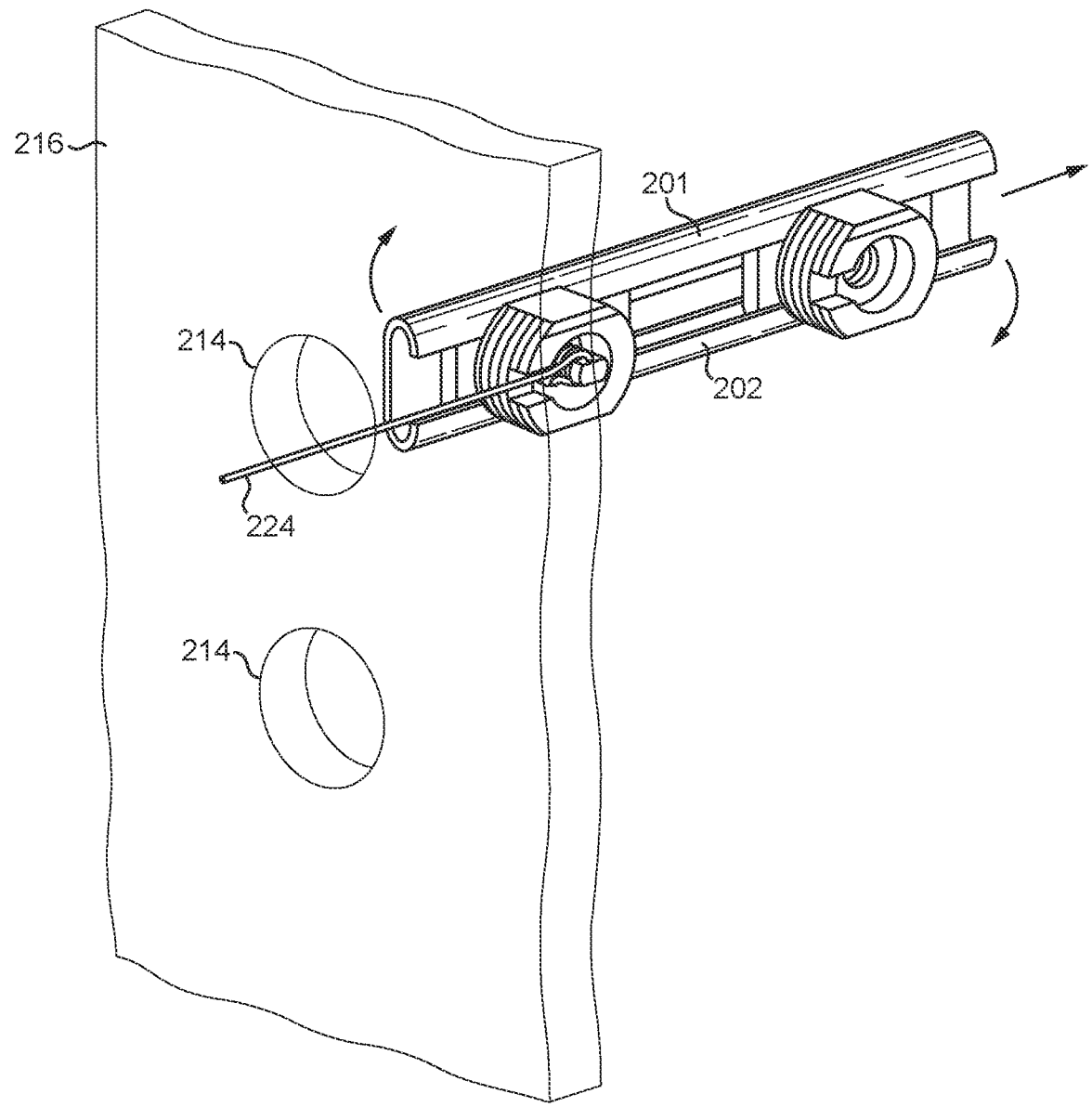
Figure 27C:
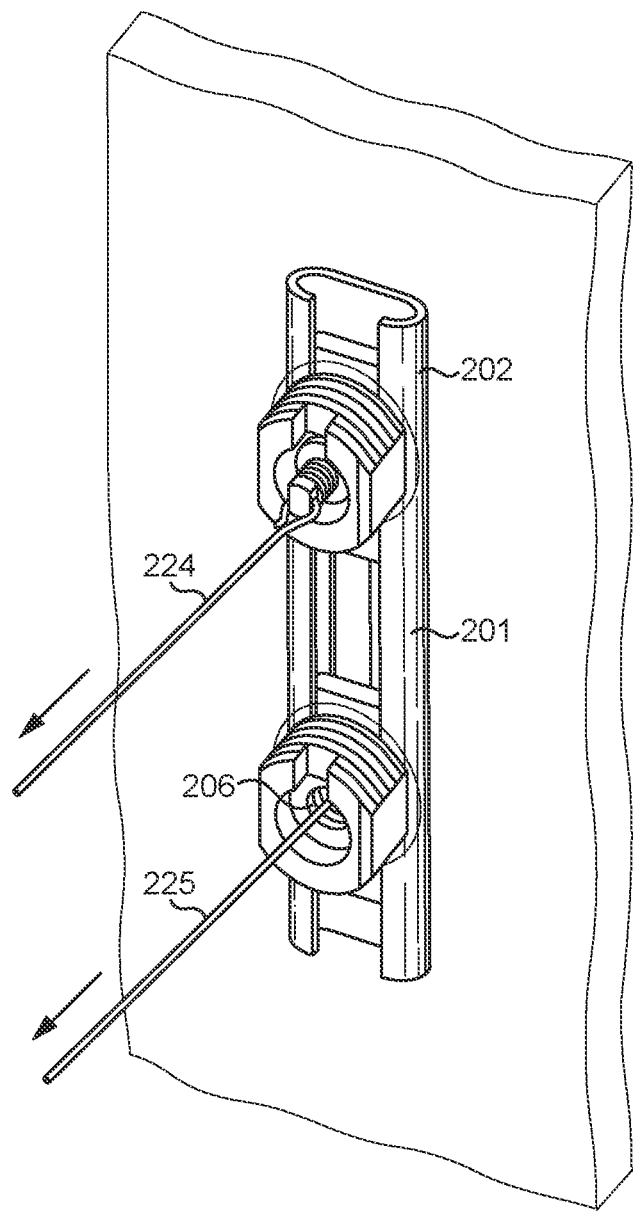
Figure 27D:
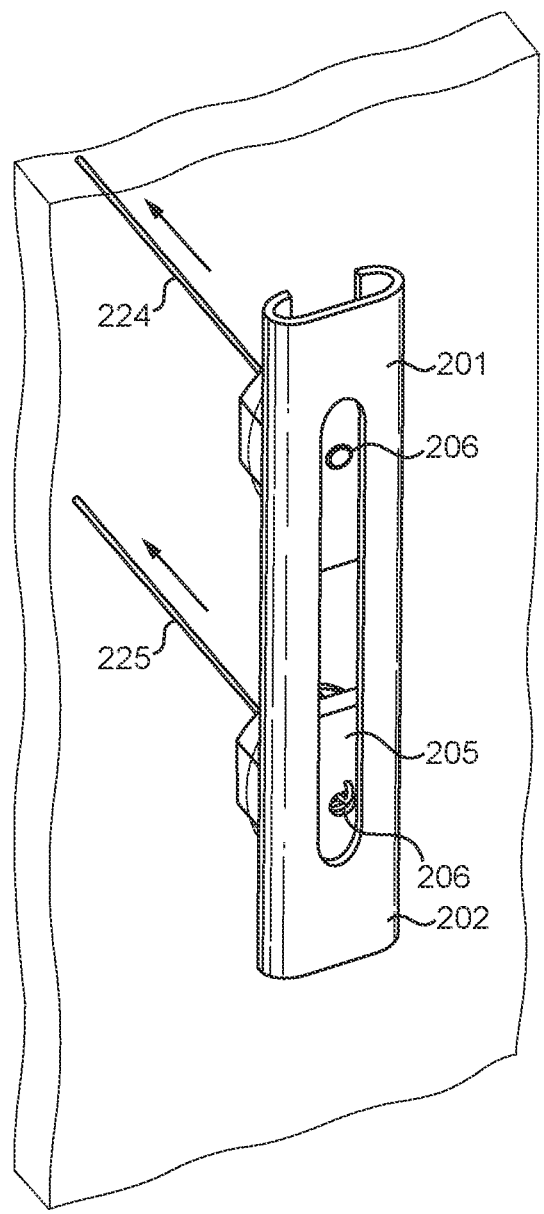

Once the fixing device 201 is in the void behind the suspended plasterboard wall or ceiling 216, the tool is used to rotate the fixing device 201 so that the plug portions 204 are aligned with the holes 214 in the suspended plasterboard wall or ceiling 216 (as shown in FIG. 27b). A hook 225 is then attached to the lower plug portion 204 through its aperture 206, and the hook 225 and the tool 224 are used together to pull the plug portions 204 back into their respective holes 214 such that they are secured in these holes 214 (as shown in FIGS. 19, 27c and 27d).

After the fixing device 201 has been secured in the holes 214, the tool 224 and the hook 225 may be removed. An item, e.g. having two fixing points, may then be attached to the fixing device using two bolts to screw into the apertures 206 in the fixing device 201.

Figure 21:
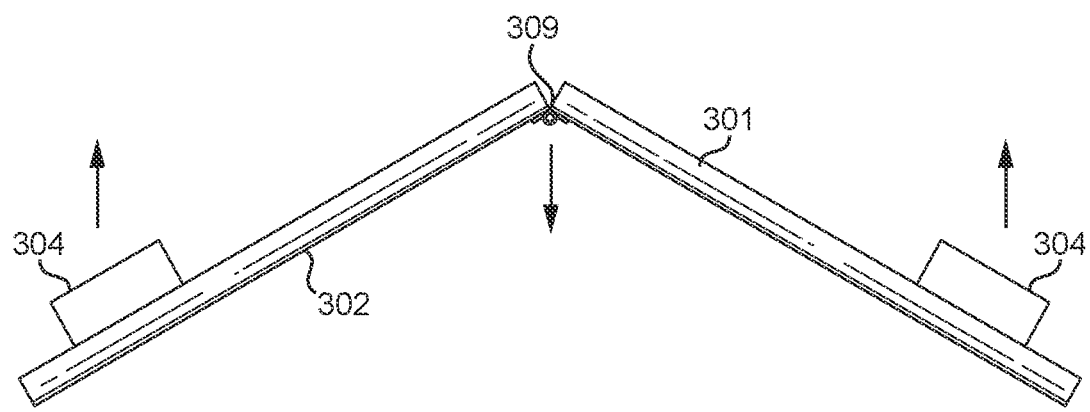
FIG. 21 shows a fixing device according to a further embodiment of the present invention.

FIG. 21 shows a fixing device 301 according to a further embodiment of the present invention. This embodiment is similar to the embodiments shown in FIGS. 17-20, 25 and 27a-27d except that the fixing device 301 has a hinged longitudinal backplate 303, with plug portions 304 being provided on each half of the longitudinal backplate 302 either side of the hinge 309. The hinge 309 in the middle of the longitudinal backplate 303 allows the fixing device 301 to be folded in half to fit through a hole and into a void (that would otherwise not be deep enough to receive the full length of the longitudinal backplate 302) behind the rear face of the suspended plasterboard wall or ceiling.

Once the fixing device 301 has been pushed through the hole and into the void, the longitudinal backplate 302 can be unfolded and the plug portions 304 secured in respective holes in the suspended plasterboard wall or ceiling. This embodiment is particularly suitable for suspended plasterboard walls where a large separation between the fixing points for an item is desired (for ceilings, the void is generally larger and so it may not be necessary to fold the fixing device).

Figure 22:
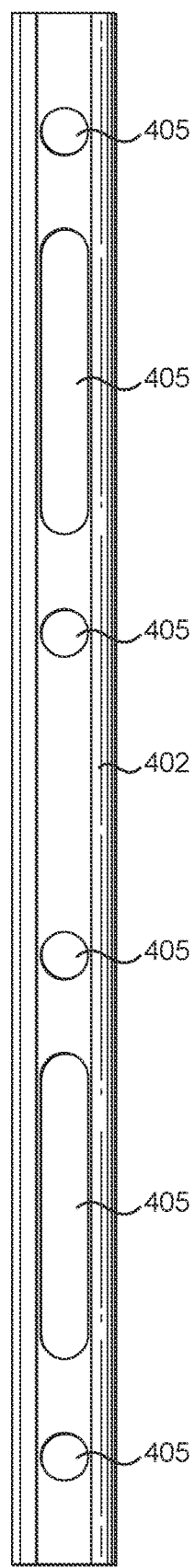
FIG. 22 shows part of a fixing device according to a further embodiment of the present invention.

FIG. 22 shows the longitudinal backplate 402 of a fixing device according to a further embodiment of the present invention. The longitudinal backplate 402 includes both elongated and circular apertures 405 that give flexibility over how many plug portions are attached to the longitudinal backplate and in which positions.

Figure 23:
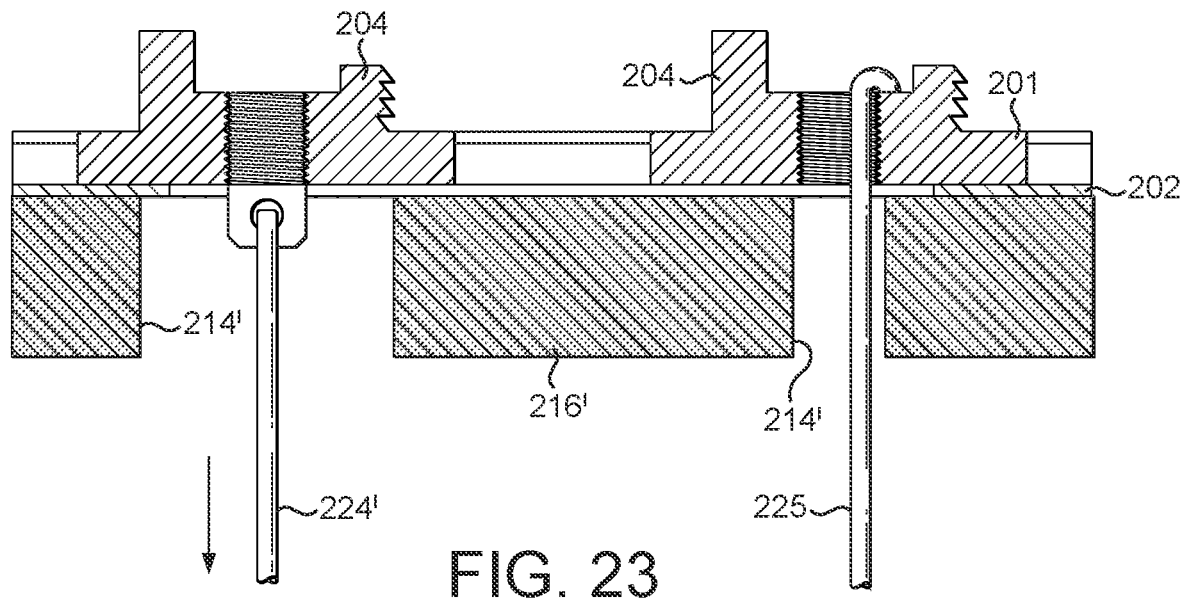
FIG. 23 shows a cross sectional view of the fixing device shown in FIGS. 17-20 while the fixing device is being installed in a hole using a tool.
Figure 24:
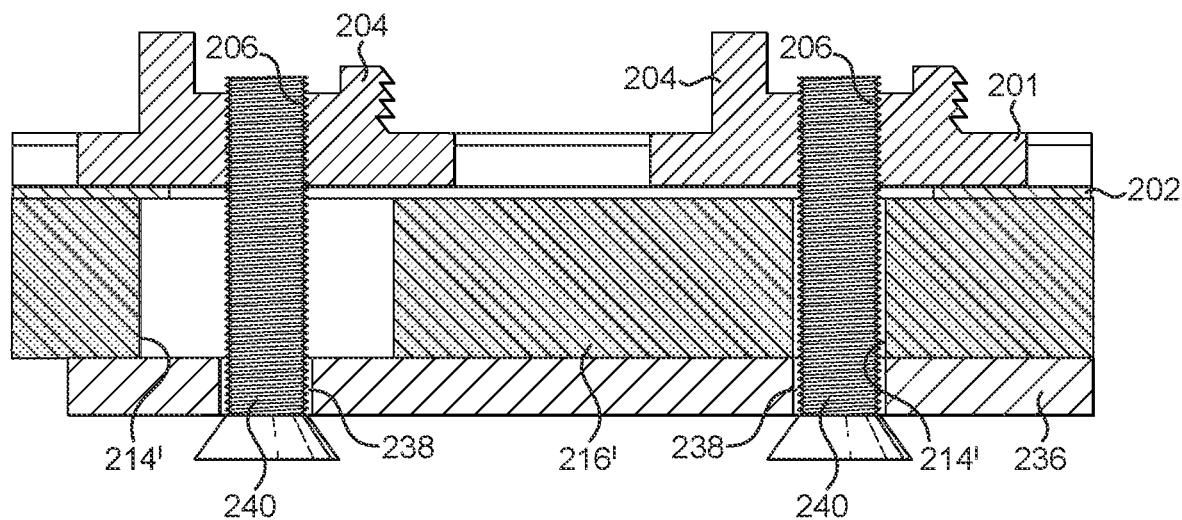
FIG. 24 shows a cross sectional view of the fixing device shown in FIGS. 17-20 and 23 once the fixing device has been installed in the hole.

FIGS. 23 and 24 show cross sectional views of the fixing device 201 shown in FIG. 19 while and once the fixing device 201 is being installed in two holes 214' in a suspended plasterboard ceiling 216' using a tool 224' and a hook 225. Different from previous embodiments, the fixing device 201 is installed using the tool 224' and the hook 225 (similar as to described above), but with the rear face of the longitudinal backplate 202 (opposite to the direction in which the plug portions 204 project) lying flat against the rear face of the suspended plasterboard ceiling 216'. (It will thus be seen that the tool 224' is slightly different to that shown in FIGS. 15a and 15b in that the flange between the tab and the screw thread has the same diameter as the screw thread, to allow it to fit through the longitudinal backplate 202.)

Once the plug portions 204 have been positioned (using the tool 224' and the hook 225), an item 236 can be attached to the fixing device 201 using two bolts 240 that pass through respective holes 238 in the item 236 and are screwed into the apertures 206 in the plug portions 204 to secure the item 236 to the fixing device.

It can be seen from FIGS. 23 and 24 that the left hand hole 214' in the suspended plasterboard ceiling 216 is larger and is used to insert the fixing device 201 therethrough. The right hand aperture 214' is smaller as it simply needs to receive the hook 225 and then the bolt 240.

Figure 26:
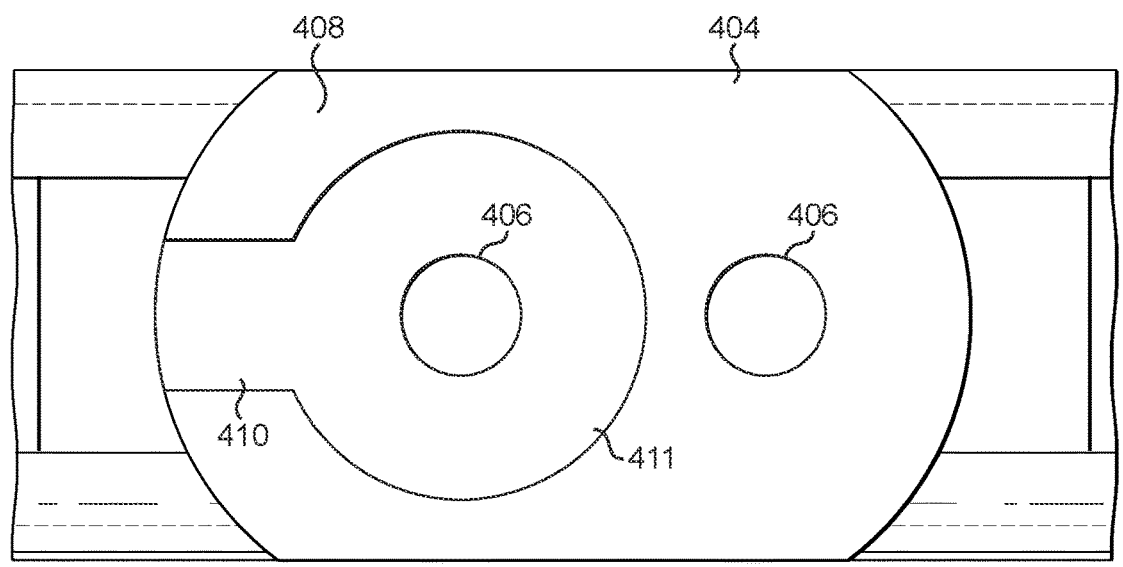
FIG. 26 shows a front view of part of a fixing device according to a further embodiment of the invention.

FIG. 26 shows an embodiment of a plug portion 404 that includes two apertures 406 in the same plug portion 404. The left hand aperture 406 is surrounded by an entrance opening 411 (defined by a rim 408 in the plug portion 404) and has a notch 410 to accommodate a tool. The right hand aperture 406 is simply provided all the way through the plug portion 404.

FIGS. 30a and 30b show perspective views of a fixing device 501 according to another embodiment of the present invention. This embodiment of the fixing device 501 shares a number of common features with the embodiments shown in FIGS. 1-14, 16 and 28, but has a number of key differences. The fixing device 501 has a longitudinal backplate 502 that is substantially flat on a side from which a plug portion 504 projects and is curved on its opposite side. The ends of the longitudinal backplate 502 are also rounded.

The fixing device 501, which is integrally moulded from nylon having 50% glass fill, has a self-tapping aperture 506 that extends in a first direction through the longitudinal backplate 502 and the centre of the plug portion 504. The plug portion 504 is substantially cylindrical having a cross section (in a plane perpendicular to the first direction) that is circular (centred on the aperture 506) but with two flat opposite sides that are collinear with the edges of the longitudinal backplate 502. Two segments of a circle project perpendicularly from each of the flat sides of the plug portion 504 form an integral vapour barrier 507.

The plug portion 504 has a rim 508 around the entrance to the aperture 506, which creates an opening to the aperture 506 that is shaped to accommodate the tool that is used to install the fixing device 501 in a suspended plasterboard wall or ceiling, as will be explained below. On one of the flat sides of the plug portion 504, the rim 508 has a circular recess 512 that extends through the rim 508 in a direction both perpendicular to the first direction and the second direction (in which the longitudinal backplate 502 extends). The circular recess 512 is shaped to receive the end of the tool that is used to install the fixing device 501. On the opposite side of the plug portion 504, the rim 508 has a slot 513 that extends through the rim 508. This slot 513 provides access for the end of the tool to be inserted into the circular recess 512. The rim 508 also has a radially extending notch 510 therethrough which again is shaped to accommodate the tool. The base of the notch 510 sits above the base of the opening to the aperture 506.

On the inside of the rim 508, within the opening of the plug portion 504 to the aperture 506, a rounded inner projection 514 is located between the circular recess 512 and the notch 510. This helps to locate the tool in the correct position when it is inserted into the fixing device 501 and helps to strengthen the plug portion 504 when the tool is used to install the fixing device 501.

The two rounded sides of the plug portion 504 each have an external screw thread 511 (having one shorter portion and one longer portion on each side) projecting therefrom. The longer portion of the screw thread 511 on the rounded side of the plug portion 504 through which the notch 510 extends is interrupted by the notch 510. The screw threads 511 are left handed.

A tool 520 for use with the fixing device 501 shown in FIGS. 30a and 30b is shown in FIGS. 31a and 31b. The tool 520, shown in perspective in FIG. 31a, is made from a length of wire (having a diameter matched to the diameter of the circular recess 512 in the fixing device 501), and has an end engaging portion 521 and a handle 522. The handle 522 has a main portion 523 and an end handling portion 524. The end engaging portion 521 of the tool 520 is bent perpendicularly to the main portion 523 of the handle 522. The end handling portion 524 of the handle 522 is also bent perpendicularly to the main portion 523 of the handle 522. However, as can be seen from FIG. 31b, which is a side view of the tool 520 looking along the length of the main portion 523 of the handle 522, the end handling portion 524 of the handle 522 extends at an angle of 135 degrees to the end engaging portion 521.

Installation of the fixing device 501 of FIGS. 30a and 30b is similar to the embodiments described previously. The end engaging portion 521 of the tool 520 is inserted into the circular recess 512 in the fixing device 501 and the main portion 523 of the handle 522 is located in the notch 510 in the plug portion 504 (the rounded inner projection 514 helps to locate the tool in the correct position such that the main portion 523 of the handle 522 is aligned with the aperture 506 of the fixing device 501).

The tool 520 is then used to push the fixing device 501 through a hole in a suspended plasterboard wall or ceiling and into the void behind it. When the fixing device 501 is fully in the void, the tool 520 can be pulled back to catch the rounded end of the longitudinal backplate 502 of the fixing device 501 on the rear face of the plasterboard. This acts to rotate the fixing device 501 about the tool 520 (i.e. rotates the end engaging portion 521 of the tool 520 in the circular recess 512) until the flat face of the longitudinal backplate 502 is parallel with the rear face of the plasterboard.

With the end handling portion 524 of the handle 522 in the horizontal position (when the fixing device 501 is being installed in a suspended plasterboard wall), the tool 501 can be pulled back to engage the four ends of the screw threads 511 with the rear face of the plasterboard. The tool 501 is then rotated (about the central aperture 506 of the fixing device and the main portion 523 of the handle 522 of the tool 520) to screw the plug portion 504 of the fixing device 501 into the hole in the plasterboard. The pitch of the screw threads 511 is such that the fixing device 501 is rotated through 135 degrees until the flat face of the longitudinal backplate 502 comes into contact with the rear face of the plasterboard, at which point (if the end handling portion 524 of the handle 522 was in the horizontal position to start with) the fixing device 501 is positioned with the longitudinal backplate 502 extending vertically.

FIGS. 32a and 32b show perspective views of a fixing device 601 according to another embodiment of the present invention. This embodiment of the fixing device 601 is similar to the embodiment shown in FIGS. 30a and 30b except that the aperture 606 is threaded (right-handed) and there is no inner projection within the rim 608 of the plug portion 604 (the lack of the need for an inner projection will be understood when the tool to the used with the fixing device 601 of this embodiment is described below).

A tool 620 for use with the fixing device 601 shown in FIGS. 32a and 32b is shown in FIGS. 33a and 33b. The tool 620, shown in perspective in FIG. 33a, is integrally moulded from nylon having 50% glass fill. The tool 620 has an end engaging portion 621 and a handle 622. The handle 622 has a main portion 623 and an end handling portion 624. The shaft of the main portion 623 of the handle 622 has a diameter of 6 mm at its end that connects to the end handling portion 624 and is graded to a diameter of 5 mm at a point 20 mm from the end of the main portion 623, i.e. so that this portion of the handle 622 fits through the notch 610 in the fixing device 601. The end handling portion 624 has a diameter of 6 mm and projects perpendicularly from either side of the end of the main portion 623 of the handle 622.

FIG. 33b shows the end engaging portion 621 of the tool 620 in more detail. The end engaging portion 621 of the tool 620 is bent perpendicularly to the main portion 623 of the handle 622 but lies in the same plane as the main portion 623 and the end handling portion 624 of the handle 622. The distal end of the end engaging portion 621 has a slot 625 across its diameter having a width of 1.2 mm and depth of 4 mm. The end engaging portion 621 also has a flange 626 that extends circumferentially around the circumference of the end engaging portion 621 through an angle of 225 degrees from the bottom end of the tool 620. The flange 626 is spaced from the distal end of the end engaging portion 621 and extends tangentially from the bottom end of the tool 620 and radially from the other end of the flange 626. The end engaging portion 621 of the tool 620 has a diameter of 4 mm at its intersection with the flange 626, increasing gradually to a diameter of 4.2 mm at the start of the bevel at its distal end.

The end engaging portion 621 also has a projection 628, positioned the other side of the bottom end of the tool 620 from the flange 626 (which can be thought of as an extension of the flange 626), which extends diagonally through the width of the flange 626.

Installation of the fixing device 601 of FIGS. 32a and 32b using the tool shown in FIGS. 33a and 33b is similar to the embodiments described previously, particularly the embodiment of FIGS. 30a, 30b, 31a and 31b. The main difference, which will now be described, is how the features of the flange 626 and the projection 628 of the end engaging portion 621 of the tool 620 work with the fixing device 601 to aid its installation.

First, the end engaging portion 621 of the tool 620 is inserted into the recess 612 (which has a diameter of 4 mm at the inside of the rim 608 and a diameter of 4.14 mm at the outside of the rim 608), with the end engaging portion 621 pushed up until the flange 626 prevents it from being pushed any further into the recess 612. The slot 625 in the distal end of the end engaging portion 621 allows the end engaging portion 621 to be compressed slightly when it inserted into the recess 612, with the diameter of the recess 612 increasing slightly towards the edge of the rim 608 of the plug portion 604 of the fixing device 601 such that the end engaging portion 621 can expand slightly to help to retain the tool 601 attached to the fixing device 601.

The main portion 623 of the handle 622 of the tool 620 is inserted into the notch 610 in the rim 608 of the plug portion 604 of the fixing device 601, such that the tool 620 can be used to push the fixing device 601 through a hole in a plasterboard wall or ceiling. When the tool 620 is used to pull the fixing device 601 back towards the tool, such that the longitudinal backplate 602 of the fixing device 601 engages with the rear face of the plasterboard wall or ceiling and rotates the fixing device 601 about the end engaging portion 621 of the tool 620 in the recess 612 of the fixing device, the fixing device 601 is rotated until the base of the plug portion 604 is rotated past the projection 628 of the end engaging portion 621 of the tool 620 such that the fixing device 601 "snaps" into position, with the edge of the flange 626 that projects tangentially from the end engaging portion 621 of the tool 620 coming into contact with the base of the plug portion 604 so that any further rotation of the fixing device is prevented. The projection 628 also prevents the fixing device 601 from rotating back in the opposite direction.

In this "locked" position, in which the main portion 623 of the handle 622 of the tool 620 is perpendicular to the direction in which the backplate 602 of the fixing device 601 extends and collinear with the aperture 606 in the plug portion 604, the tool 620 can be used to pull and screw the fixing device 601 back into the hole in the plasterboard wall, as described above. It will be seen that the flange 626 on the tool 620 thus provides a similar locating and support function to the inner projection in the fixing device 501 shown in FIGS. 30a and 30b. Therefore a similar inner projection is not required in the fixing device 601 shown in FIGS. 32a and 32b.

It will be seen from the above that in at least preferred embodiments, the fixing device of the present invention is able to be secured in a hole in a suspended plasterboard wall or ceiling by pulling it into the hole from the rear of the suspended plasterboard wall or ceiling. The fixing device provides a relative large area backplate and so may allow large loads to be attached to the fixing device. In addition, the fixing device has a plug portion of a size that engages with the sides of the hole in the suspended plasterboard wall or ceiling which may further increase the load bearing capacity of the fixing device.

The geometry of the fixing device, such that the plug portion is arranged to fit in a hole through which the fixing device is able to be passed along the length of the longitudinal backplate, helps to allow for fail-safe installation, i.e. if a hole is drilled in the suspended plasterboard wall or ceiling that the plug portion is able to be secured in the hole, the fixing device will be able to fit through the hole along the length of the longitudinal backplate.

The invention claimed is:

1. A fixing device for attaching an item to a suspended plasterboard wall or ceiling, the fixing device comprising:
   a plug portion for securing in a hole in the suspended plasterboard wall or ceiling, the plug portion comprising an outer wall that comprises a screw thread, and an aperture for receiving a fastener that extends in a first direction; and a longitudinal backplate that extends in a second direction and is attached to and projects from diametrically opposite sides of the plug portion, wherein the longitudinal backplate is arranged in use to engage with a rear face of the suspended plasterboard wall or ceiling when the plug portion is secured in the hole;

wherein a perimeter of a cross section of the plug portion in a plane perpendicular to the first direction has a minimum bounding circle having a first diameter; and wherein a perimeter of a cross section of the fixing device through the plug portion in a plane perpendicular to the second direction has a minimum bounding circle having a second diameter that is less than or equal to the first diameter.

2. The fixing device as claimed in claim 1, wherein the plug portion is arranged to receive a tool to position the plug portion relative to the hole to allow the aperture to receive a fastener, or the plug portion is arranged to receive a tool for securing the plug portion in the hole in the suspended plasterboard wall or ceiling.

3. The fixing device as claimed in claim 1, wherein the plug portion is substantially cylindrical.

4. The fixing device as claimed in claim 1, wherein the cross section of the plug portion comprises two straight sides that each extend in a direction substantially parallel to the second direction and two curved sides that extend between the two straight sides, or wherein the cross section of the plug portion comprises corners remote from the longitudinal backplate that are chamfered.

5. The fixing device as claimed in claim 1, wherein the fixing device comprises two plug portions for securing in respective holes in the suspended plasterboard wall or ceiling, and wherein each plug portion comprises an aperture for receiving a fastener that extends in a first direction.

6. The fixing device as claimed in claim 1, wherein the aperture extends through the plug portion and through the longitudinal backplate.

7. The fixing device as claimed in claim 1, wherein the aperture comprises a thread or is arranged to receive a self-tapping fastener.

8. The fixing device as claimed in claim 1, wherein the longitudinal backplate comprises a longitudinally extended cylinder.

9. The fixing device as claimed in claim 1, wherein the cross section of the longitudinal backplate comprises a rounded edge opposite to the side from which the plug portion projects.

10. The fixing device as claimed in claim 1, wherein the plug portion comprises one or more recesses arranged to receive an end of the tool.

11. The fixing device as claimed in claim 10, wherein the plug portion comprises a slot to allow access for the end of the tool to be inserted into the recess.

12. The fixing device as claimed in claim 1, wherein the plug portion comprises a notch in a face of the plug portion arranged to accommodate the tool.

13. The fixing device as claimed in claim 12, wherein the aperture in the plug portion comprises an opening having a cross section that is greater than a cross section of the rest of the aperture, and wherein a base of the notch is closer to the face of the plug portion than the opening around the aperture.

14. The fixing device as claimed in claim 1, wherein the fixing device is made from integrally moulded plastic.

15. The fixing device as claimed in claim 1, wherein the plug portion is slidably attached to the longitudinal backplate.

16. The fixing device as claimed in claim 15, wherein the plug portion is made from plastic and the longitudinal backplate is made from metal.

17. A fixing device for attaching an item to a suspended plasterboard wall or ceiling, the fixing device comprising:

two or more plug portions each comprising an aperture for receiving a fastener that extends in a first direction; and a longitudinal backplate that is attached to and extends in a second direction between the two or more plug portions, wherein the longitudinal backplate is arranged in use to engage with a rear face of the suspended plasterboard wall or ceiling.

18. A fixing device for attaching an item to a suspended plasterboard wall or ceiling, the fixing device comprising:

a plug portion for securing in a hole in the suspended plasterboard wall or ceiling, the plug portion comprising an aperture for receiving a fastener that extends in a first direction; and a longitudinal backplate that extends in a second direction and is attached to and projects from diametrically opposite sides of the plug portion, wherein the longitudinal backplate is arranged in use to engage with the rear face of the suspended plasterboard wall or ceiling when the plug portion is secured in the hole;

wherein the perimeter of the cross section of the plug portion in a plane perpendicular to the first direction has a minimum bounding circle having a first diameter;

wherein the perimeter of the cross section of the fixing device through the plug portion in a plane perpendicular to the second direction has a minimum bounding circle having a second diameter less than or equal to the first diameter; and wherein the aperture in the plug portion comprises an opening having a cross section that is greater than the cross section of the rest of the aperture.

* * * * *